US011929562B2

(12) United States Patent
Schneider et al.

(10) Patent No.: US 11,929,562 B2
(45) Date of Patent: *Mar. 12, 2024

(54) ANTENNA ASSEMBLIES WITH TAPERED LOOP ANTENNA ELEMENTS

(71) Applicant: Antennas Direct, Inc., Ellisville, MO (US)

(72) Inventors: Richard E. Schneider, Wildwood, MO (US); John Edwin Ross, III, Moab, UT (US)

(73) Assignee: Antennas Direct, Inc., Ellisville, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,947

(22) Filed: Oct. 20, 2022

(65) Prior Publication Data

US 2023/0043120 A1 Feb. 9, 2023

Related U.S. Application Data

(63) Continuation of application No. 17/332,541, filed on May 27, 2021, now Pat. No. 11,482,783, which is a (Continued)

(51) Int. Cl.
*H01Q 7/00* (2006.01)
*H01Q 1/12* (2006.01)
(Continued)

(52) U.S. Cl.
CPC ............. *H01Q 7/00* (2013.01); *H01Q 1/1207* (2013.01); *H01Q 1/1271* (2013.01); *H01Q 7/02* (2013.01); *H01Q 19/10* (2013.01)

(58) Field of Classification Search
CPC ...... H01Q 1/1207; H01Q 1/1271; H01Q 7/00; H01Q 7/02; H01Q 19/10
See application file for complete search history.

(56) References Cited

U.S. PATENT DOCUMENTS 2,060,098 A 11/1936 Norman
2,220,008 A 10/1940 Woodward et al.
(Continued)

FOREIGN PATENT DOCUMENTS

CN 201243084 Y 5/2009
CN ZL2008200072832 5/2009
(Continued)

OTHER PUBLICATIONS

Mao S-G et al., "Time-domain characteristics of ultra-wideband tapered loop antennas" Electronics Letters, IEE Stevenage, GB, vol. 42, No. 22, Oct. 26, 2006; 1262-1264; 2 pages.
(Continued)

*Primary Examiner* — Hoang V Nguyen
*Assistant Examiner* — Amal Patel
(74) *Attorney, Agent, or Firm* — Harness, Dickey & Pierce, P.L.C.; Anthony G. Fussner

(57) ABSTRACT

According to various aspects, exemplary embodiments are provided of antenna assemblies. In an exemplary embodiment, an antenna assembly generally includes at least one antenna element configured to be operable for receiving high definition television signals.

29 Claims, 56 Drawing Sheets

Related U.S. Application Data continuation of application No. 16/840,850, filed on Apr. 6, 2020, now Pat. No. 11,024,968, which is a continuation of application No. 15/685,749, filed on Aug. 24, 2017, now Pat. No. 10,615,501, which is a continuation of application No. 14/308,422, filed on Jun. 18, 2014, now abandoned, which is a continuation-in-part of application No. 13/759,750, filed on Feb. 5, 2013, now Pat. No. 8,994,600, and a continuation-in-part of application No. 29/430,632, filed on Aug. 28, 2012, now abandoned, which is a continuation-in-part of application No. 29/376,791, filed on Oct. 12, 2010, now Pat. No. Des. 666,178, said application No. 13/759,750 is a continuation-in-part of application No. 12/606,636, filed on Oct. 27, 2009, now Pat. No. 8,368,607, which is a continuation-in-part of application No. PCT/US2008/061908, filed on Apr. 29, 2008, and a continuation-in-part of application No. 29/305,294, filed on Mar. 17, 2008, now Pat. No. Des. 604,276, which is a continuation-in-part of application No. 12/050,133, filed on Mar. 17, 2008, now Pat. No. 76,092,222, said application No. 12/606,636 is a continuation-in-part of application No. 12/050,133, filed on Mar. 17, 2008, now Pat. No. 7,609,222, said application No. 12/606,636 is a continuation-in-part of application No. 12/040,464, filed on Feb. 29, 2008, now Pat. No. 7,839,347, said application No. 29/305,294 is a continuation-in-part of application No. 12/040,464, filed on Feb. 29, 2008, now Pat. No. 7,839,347, said application No. 12/050,133 is a continuation-in-part of application No. 29/304,423, filed on Feb. 29, 2008, now Pat. No. Des. 598,433.

(60) Provisional application No. 62/002,503, filed on May 23, 2014, provisional application No. 61/034,431, filed on Mar. 6, 2008, provisional application No. 60/992,331, filed on Dec. 5, 2007.

(51) Int. Cl.
*H01Q 7/02* (2006.01)
*H01Q 19/10* (2006.01)

(56) References Cited

U.S. PATENT DOCUMENTS

| | | | | |
|---|---|---|---|---|
| 2,437,251 | A | 3/1948 | Frische et al. | |
| 2,480,155 | A | 8/1949 | Masters | |
| 2,589,578 | A | 3/1952 | Sabins | |
| D170,203 | S | 8/1953 | Leonard | |
| D171,560 | S | 2/1954 | Ritter | |
| D177,200 | S | 3/1956 | Valiulis | |
| D179,111 | S | 11/1956 | Ballan | |
| 2,821,710 | A | 1/1958 | Hale | |
| 3,015,101 | A | 12/1961 | Turner et al. | |
| 3,123,826 | A | 3/1964 | Durham | |
| 3,161,975 | A | 12/1964 | McMillan | |
| 3,239,838 | A | 3/1966 | Kelleher | |
| 3,261,019 | A | 7/1966 | Lundy | |
| 3,273,158 | A | 9/1966 | Fouts et al. | |
| D209,402 | S | 11/1967 | Burlingame | |
| D211,025 | S | 5/1968 | Callaghan | |
| 3,434,145 | A | 3/1969 | Wells | |
| 3,521,284 | A | 7/1970 | Strom et al. | |
| 3,560,983 | A | 2/1971 | Willie et al. | |
| 3,587,105 | A | 6/1971 | Neilson | |
| 3,721,990 | A | 3/1973 | Gibson et al. | |
| 3,739,388 | A | 6/1973 | Callaghan | |
| 3,828,867 | A | 8/1974 | Elwood | |
| 3,971,031 | A | 7/1976 | Burke | |
| 4,183,027 | A | 1/1980 | Ehrenspeck | |
| 4,184,163 | A | 1/1980 | Woodward | |
| 4,418,427 | A | 11/1983 | Muterspaugh | |
| D310,671 | S | 9/1990 | Weiss | |
| 4,987,424 | A | 1/1991 | Tamura et al. | |
| 5,006,860 | A * | 4/1991 | Schock | H01Q 11/12 343/742 |
| D318,673 | S | 7/1991 | Terk | |
| D327,690 | S | 7/1992 | Ogawa et al. | |
| D332,262 | S | 1/1993 | Borchardt | |
| 5,280,645 | A | 1/1994 | Nguyen et al. | |
| D344,731 | S | 3/1994 | Witzky | |
| 5,313,218 | A | 5/1994 | Busking | |
| 5,943,025 | A | 8/1999 | Benham et al. | |
| D414,495 | S | 9/1999 | Heiligenstein et al. | |
| 5,949,384 | A * | 9/1999 | Ikushima | H01Q 7/02 343/866 |
| 5,959,586 | A | 9/1999 | Benham et al. | |
| 6,002,371 | A | 12/1999 | Mittler | |
| D421,610 | S | 3/2000 | Ghalebi | |
| 6,054,963 | A | 4/2000 | Muterspaugh | |
| 6,239,764 | B1 | 5/2001 | Timofeev et al. | |
| D449,593 | S | 10/2001 | Schultz | |
| 6,590,541 | B1 | 7/2003 | Schultze | |
| 6,593,886 | B2 | 7/2003 | Schantz | |
| D480,714 | S | 10/2003 | Wang | |
| 6,680,708 | B2 | 1/2004 | Yamaki | |
| D501,468 | S | 2/2005 | Wang | |
| 6,885,352 | B2 | 4/2005 | Lee et al. | |
| 6,917,793 | B2 | 7/2005 | Wang | |
| 6,922,179 | B2 | 7/2005 | McCollum | |
| 7,091,925 | B1 | 8/2006 | Wang | |
| 7,126,556 | B1 | 10/2006 | Wang | |
| 7,209,089 | B2 | 4/2007 | Schantz | |
| D544,471 | S | 6/2007 | Wang | |
| 7,239,290 | B2 | 7/2007 | Poilasne et al. | |
| 7,245,266 | B1 | 7/2007 | Szente et al. | |
| D558,189 | S | 12/2007 | Inoue | |
| D581,931 | S | 12/2008 | Pine | |
| D585,883 | S | 2/2009 | Kaneko | |
| D598,433 | S | 8/2009 | Schneider et al. | |
| D598,434 | S | 8/2009 | Schneider et al. | |
| 7,609,222 | B2 | 10/2009 | Schneider et al. | |
| D604,276 | S | 11/2009 | Schneider et al. | |
| D611,460 | S | 3/2010 | Chao | |
| 7,693,570 | B2 | 4/2010 | Green et al. | |
| D624,531 | S | 9/2010 | Fleck et al. | |
| 7,839,347 | B2 | 11/2010 | Schneider et al. | |
| 7,839,351 | B2 | 11/2010 | Schadler et al. | |
| 7,898,496 | B2 | 3/2011 | Olsen et al. | |
| 7,936,311 | B2 | 5/2011 | Rowser et al. | |
| 7,990,335 | B2 | 8/2011 | Schneider et al. | |
| 8,144,069 | B2 | 3/2012 | Sadowski et al. | |
| 8,174,457 | B1 | 5/2012 | Lam | |
| D666,178 | S | 8/2012 | Schneider et al. | |
| 8,368,607 | B2 | 2/2013 | Schneider et al. | |
| 8,736,500 | B1 | 5/2014 | Lam | |
| 8,994,600 | B2 | 3/2015 | Schneider et al. | |
| D837,769 | S | 1/2019 | Yang | |
| D838,697 | S | 1/2019 | Yang | |
| D847,798 | S | 5/2019 | Yang | |
| D849,722 | S | 5/2019 | Yang | |
| D850,425 | S | 6/2019 | Yang | |
| D867,347 | S | 11/2019 | Ross, III et al. | |
| D872,714 | S | 1/2020 | Yang | |
| 10,615,501 | B2 * | 4/2020 | Schneider | H01Q 7/00 |
| 11,024,968 | B2 * | 6/2021 | Schneider | H01Q 7/00 |
| 11,482,783 | B2 * | 10/2022 | Schneider | H01Q 7/00 |
| 2002/0158798 | A1 | 10/2002 | Chiang et al. | |
| 2003/0071757 | A1 | 4/2003 | Yamaki | |
| 2004/0090379 | A1 | 5/2004 | Fourdeux et al. | |
| 2004/0090385 | A1 | 5/2004 | Green | |
| 2004/0113841 | A1 | 6/2004 | Louzir et al. | |
| 2004/0217912 | A1 | 11/2004 | Mohammadian | |
| 2005/0088342 | A1 | 4/2005 | Parsche | |
| 2005/0162332 | A1 | 7/2005 | Schantz | |
| 2005/0259023 | A1 | 11/2005 | Wang | |
| 2005/0280582 | A1 | 12/2005 | Powell et al. | |

(56) References Cited

U.S. PATENT DOCUMENTS

| | | | |
|---|---|---|---|
| 2006/0033665 | A1 | 2/2006 | Yang |
| 2006/0055618 | A1 | 3/2006 | Poilasne et al. |
| 2006/0077115 | A1 | 4/2006 | Oh et al. |
| 2006/0103577 | A1 | 5/2006 | Lee |
| 2006/0164304 | A1 | 7/2006 | Huang et al. |
| 2007/0069955 | A1 | 3/2007 | McCorkle |
| 2007/0200769 | A1 | 8/2007 | Nakano et al. |
| 2008/0040464 | A1 | 2/2008 | Chia |
| 2008/0094291 | A1 | 4/2008 | Bystrom et al. |
| 2008/0211720 | A1 | 9/2008 | Hansen |
| 2008/0258980 | A1 | 10/2008 | Chen et al. |
| 2008/0291345 | A1 | 11/2008 | Schneider |
| 2009/0058732 | A1 | 3/2009 | Nakano et al. |
| 2009/0073067 | A1 | 3/2009 | Soler Castany et al. |
| 2009/0146899 | A1 | 6/2009 | Schneider et al. |
| 2010/0085269 | A1 | 4/2010 | Sadowski et al. |
| 2014/0292597 | A1 | 10/2014 | Schneider et al. |

FOREIGN PATENT DOCUMENTS

| | | | |
|---|---|---|---|
| CN | ZL2008301199963 | | 5/2009 |
| CN | 101453057 | A | 6/2009 |
| CN | ZL2008301199978 | | 7/2009 |
| CN | ZL2008300091398 | | 9/2009 |
| CN | 203707328 | U | 7/2014 |
| EM | 000946587 | | 5/2008 |
| EP | 1555717 | A1 | 7/2005 |
| EP | 1653560 | A1 | 5/2006 |
| EP | 1753080 | A1 | 2/2007 |
| GB | 2263360 | A | 7/1993 |
| JP | D1213590 | | 6/2004 |
| TW | M249233 | U | 11/2004 |
| TW | D112283 | | 8/2006 |
| TW | D119092 | | 9/2007 |
| TW | 200926506 | A | 6/2009 |
| TW | D129744 | | 7/2009 |
| TW | D129745 | | 7/2009 |
| TW | D129746 | | 7/2009 |
| WO | WO-2009073249 | A1 | 6/2009 |

OTHER PUBLICATIONS

European Search Report dated Apr. 24, 2014 for EP application No. 14153878.5 which claims priority to the instant application; 9 pages.

IEEE Spectrum: Antennas for the New Airwaves, http://www.spectrum.ieee.org/print/7328, Published Feb. 2009, 9 pages, Authors Richard Schneider and John Ross.

Antenna Engineering Handbook, 3rd Edition, Edited by Richard C. Johnson, McGraw Hill, 1993, pp. 5-13 to 5-16.

One-Element Loop Antenna with Finite Reflector, B. Rojarayanont and T. Sekiguchi, Electronics & Communications in Japan, vol. 59-B, No. 5, May 1976, p. 68.

Frequency-and Time-Domain Modeling of Tapered Loop Antennas in Ultra-Wideband Radio Systems, Shiou-Li Chen and Shau-Gang Mao, Graduate Institute of Computer and Communication Engineer, pp. 179-182, IEEE copyright notice 2006.

Planar Miniature Tapered-Slot-Fed Annular Slot Antennas for Ultrawide-Band Radios, Tzyh-Ghuang Ma, Student Member, and Shyh-Kang, Jeng, Senior Member, IEEE, IEEE Transactions on Antennas and Propagation, vol. 53, No. 3, Mar. 2005, pp. 1194-1202.

Self-Mutual Admittances of Two Identical Circular Loop Antennas in a Conducting Medium and in Air, K. Iizuka. Senior Member, IEEE, R. W. P. King, Fellow, IEEE, and C. W. Harrison, Jr., Senior Member, IEEE, IEEE Transactions on AntennasandPropagation, vol. AP014, No. 4, Jul. 1966, pp. 440-450.

A Broadband Eccentric Annular Slot Antenna, Young Hoon Suh and Ikmo Park, Department of Electrical Engineering, Ajou University, pp. 94-97, IEEE copyright notice 2001.

A Printed Crescent Patch Antenna for Ultrawideband Applications, Ntsanderh C. Azenui an H.Y.D. Yang, IEEE Antennas and Wireless Propragation Letters, vol. 6, 2007, pp. 113-116.

Design of Compact Components for Ultra Wideband Communication Front Ends, Marek Bialkowski, Amin Abbosh, and Hing Kan, School of Information Technology and Electrical Engineering, The University of Queensland, four pages.

Nonfinal Office Action dated Apr. 17, 2012 from design U.S. Appl. No. 29/376,791 which is a continuation of the instant application; 8 pages.

Tofel, Kevin C., HD Picture frame antenna, Aug. 11, 2005, http://hd.engadget.com/2005/08/11/hd-picture-frame-antenna, 1 page.

Antennas Direct, PF7 Picture Frame Antenna, Oct. 1, 2005, Antennas Direct, http://web.archive.org/web/20051001002653/http://antennasdirect.com/PF7.su- b .--antenna.html, 1 page.

United States Office Action dated Sep. 13, 2011, issued in U.S. Appl. No. 12/126,593, which shares a common inventor with the instant application, 13 pages.

European Search Report dated Jan. 17, 2011, issued by the European Patent Office for European Patent Application No. EP 10193159.0 which is related to the instant application through a priority claim; (5 pages).

European Supplementary Search Report and Opinion dated Oct. 7, 2010, issued by the European Patent Office for European Patent Application No. EP 08747115 (6 pages).

Clearstream. TM. 2V; http://www.antennasdirect.com/cmss.sub.--files/attachmentlibrary/pdf/C2-V- . sub.--QS.sub.--FINAL.sub.--20120702.pdf; Jul. 2, 2012; 2 pgs.

Chinese office action dated Nov. 4, 2015 for Chinese application No. 2014101113505 filed Feb. 7, 2014, published as CN103972657 on Aug. 6, 2014, which names the same inventors, Richard E. Schneider and John Edwin Ross III, as the instant applicationbut is not related through a priority claim; 7 pages.

C. M. Shah, S. Siriam, M. Bhaskaran and A. Mitchell, "Large area metal-silicone flexible electronic structures," 2010 Conference on Optoelectronic and Microelectronic Materials and Devices, Canberra, ACT, 2010, pp. 187-188.

Antenna Theory: a. Review, Balanis, Proc. IEEE vol. 80 No. 1 Jan. 1992, 17 pages.

"Television Antenna", Wikipedia: The Free encyclopedia. Wikimedia Foundation, Inc. Mar. 13, 2017. Web. Mar. 15, 217, 6 pages.

"Analog High-Definition Television System", Wikipedia: the Free Encyclopedia. Wikimedia Foundation, Inc. Oct. 12, 2016. Web. Mar. 16, 2017, 5 pages.

Notice of Allowance for design U.S. Appl. No. 29/671,595 which is the parent application to the instant application; dated Oct. 8, 2019, 6 pages.

* cited by examiner

ANTENNA ASSEMBLIES WITH TAPERED LOOP ANTENNA ELEMENTS

CROSS-REFERENCE TO RELATED APPLICATIONS

This application is a continuation of U.S. patent application Ser. No. 17/332,541 filed May 27, 2021 (published as US2021/0288406 on Sep. 16, 2021 and issuing as U.S. Pat. No. 11,482,783 on Oct. 25, 2022).

U.S. patent application Ser. No. 17/332,541 is a continuation of U.S. patent application Ser. No. 16/840,850 filed Apr. 6, 2020 (published as US2020/0235476 on Jul. 23, 2020 and issued as U.S. Pat. No. 11,024,968 on Jun. 1, 2021).

U.S. patent application Ser. No. 16/840,850 is a continuation of U.S. patent application Ser. No. 15/685,749 filed Aug. 24, 2017 (published as US2017/0352956 on Jul. 23, 2020 and issued as U.S. Pat. No. 10,615,501 on Apr. 7, 2020).

U.S. patent application Ser. No. 15/685,749 is a continuation of U.S. patent application Ser. No. 14/308,422 filed Jun. 18, 2014 (now abandoned, published as US2014/0292597 on Oct. 2, 2014), which, in turn, claimed the benefit and priority of U.S. Provisional Patent Application No. 62/002,503 filed May 23, 2014.

U.S. patent application Ser. No. 14/308,422 was a continuation-in-part of the following two applications:

(1) U.S. Design patent application No. 29/430,632 filed Aug. 28, 2012, which, in turn, was a continuation-in-part of U.S. Design patent application No. 29/376,791 filed Oct. 12, 2010 (now U.S. Design Pat. D666,178 issued Aug. 28, 2012); and (2) U.S. patent application Ser. No. 13/759,750 filed Feb. 5, 2013 (published as US2013/0162487 on Jun. 27, 2013 and issued as U.S. Pat. No. 8,994,600 on Mar. 31, 2015), which, in turn, was a continuation-in-part of U.S. patent application Ser. No. 12/606,636 filed Oct. 27, 2009 (published as US2010/0045551 on Feb. 25, 2010 and issued as U.S. Pat. No. 8,368,607 on Feb. 5, 2013).

U.S. patent application Ser. No. 12/606,636 was a continuation-in-part of the following four applications:

(1) U.S. patent application Ser. No. 12/050,133 filed Mar. 17, 2008 (published as US2009/0146900 on Jun. 11, 2009 and issued as U.S. Pat. No. 7,609,222 on Oct. 27, 2009), which, in turn, was a continuation-in-part of U.S. Patent Design Pat. application No. 29/304,423 filed Feb. 29, 2008 (now U.S. Design Patent D598,433 issued Aug. 18, 2009) and also claimed the benefit of U.S. Provisional Patent Application No. 60/992,331 filed Dec. 5, 2007 and U.S. Provisional Patent Application No. 61/034,431 filed Mar. 6, 2008; and (2) U.S. patent application Ser. No. 12/040,464 filed Feb. 29, 2008 (published as US2009/0146899 on Jun. 11, 2009 and issued as U.S. Pat. No. 7,839,347 on Nov. 23, 2010), which, in turn, claimed the benefit of U.S. Provisional Patent Application No. 60/992,331 filed Dec. 5, 2007; and (3) U.S. Design patent application No. 29/305,294 filed Mar. 17, 2008 (now U.S. Design Pat. D598,434 issued Aug. 18, 2009), which, in turn, was a continuation-in-part of U.S. patent application Ser. No. 12/040,464 filed Feb. 29, 2008 (now U.S. Pat. No. 7,839,347 issued Nov. 23, 2010) and also a continuation of U.S. patent application Ser. No. 12/050,133 filed Mar. 17, 2008 (now U.S. Pat. No. 7,609,222 issued Oct. 29, 2009); and (4) PCT International Application No. PCT/US08/061908 filed Apr. 29, 2008 (WO009/073249 published on Jun. 11, 2009), which, in turn, claimed priority to U.S. Provisional Patent Application No. 60/992,331 filed Dec. 5, 2007, U.S. Provisional Patent Application No. 61/034,431 filed Mar. 6, 2008, U.S. patent application Ser. No. 12/040,464 filed Feb. 29, 2008 (now U.S. Pat. No. 7,839,347 issued Nov. 23, 2010), and U.S. patent application Ser. No. 12/050,133 filed Mar. 17, 2008 (now U.S. Pat. No. 7,609,222 issued Oct. 29, 2009).

The entire disclosures of the above applications are incorporated herein by reference.

FIELD

The present disclosure generally relates to antenna assemblies configured for reception of television signals, such as high definition television (HDTV) signals.

BACKGROUND

The statements in this section merely provide background information related to the present disclosure and may not constitute prior art.

Many people enjoy watching television. Recently, the television-watching experience has been greatly improved due to high definition television (HDTV). A great number of people pay for HDTV through their existing cable or satellite TV service provider. In fact, many people are unaware that HDTV signals are commonly broadcast over the free public airwaves. This means that HDTV signals may be received for free with the appropriate antenna.

DRAWINGS

The drawings described herein are for illustration purposes only and are not intended to limit the scope of the present disclosure in any way.

Figure 43:
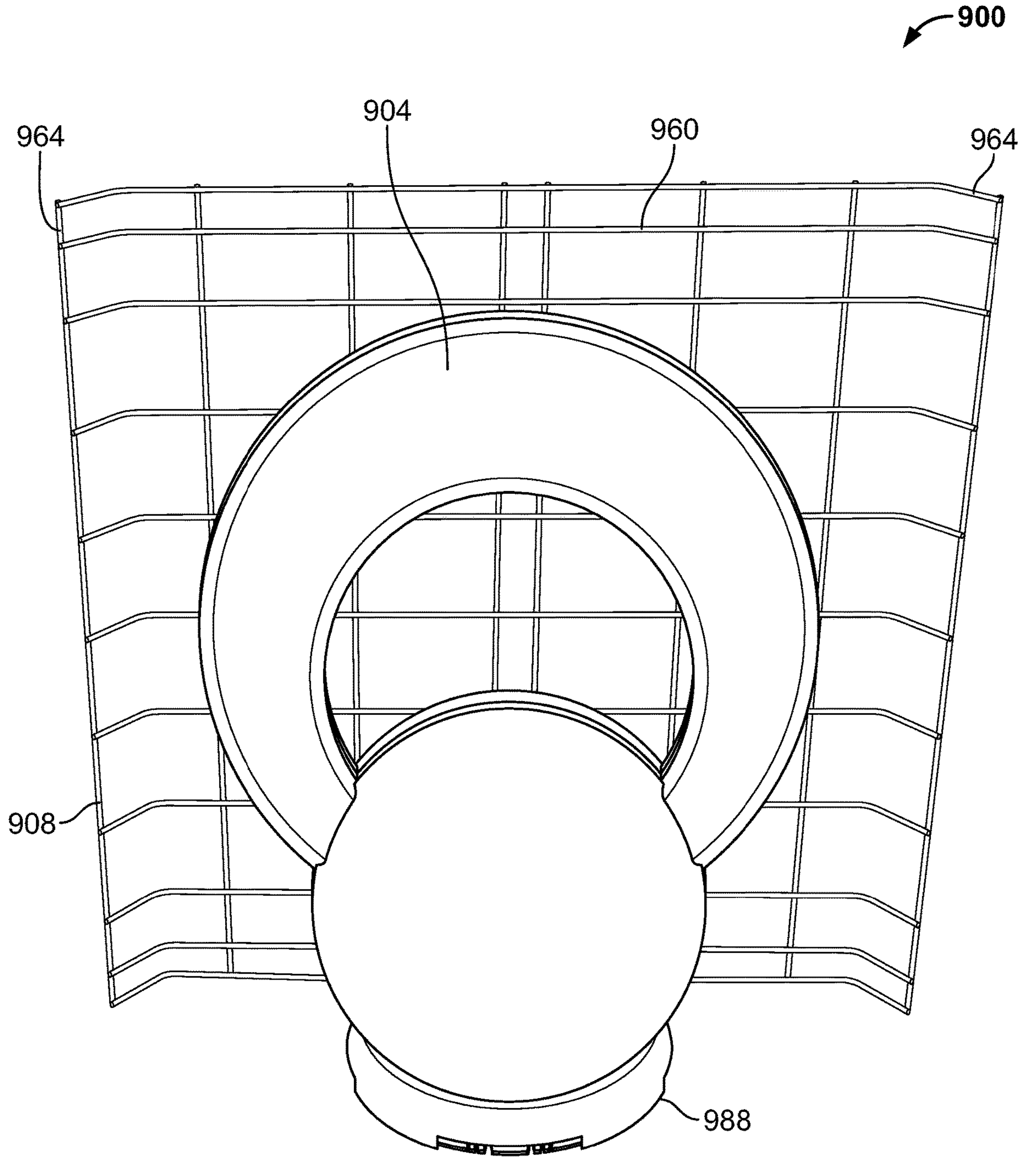
Figure 44:
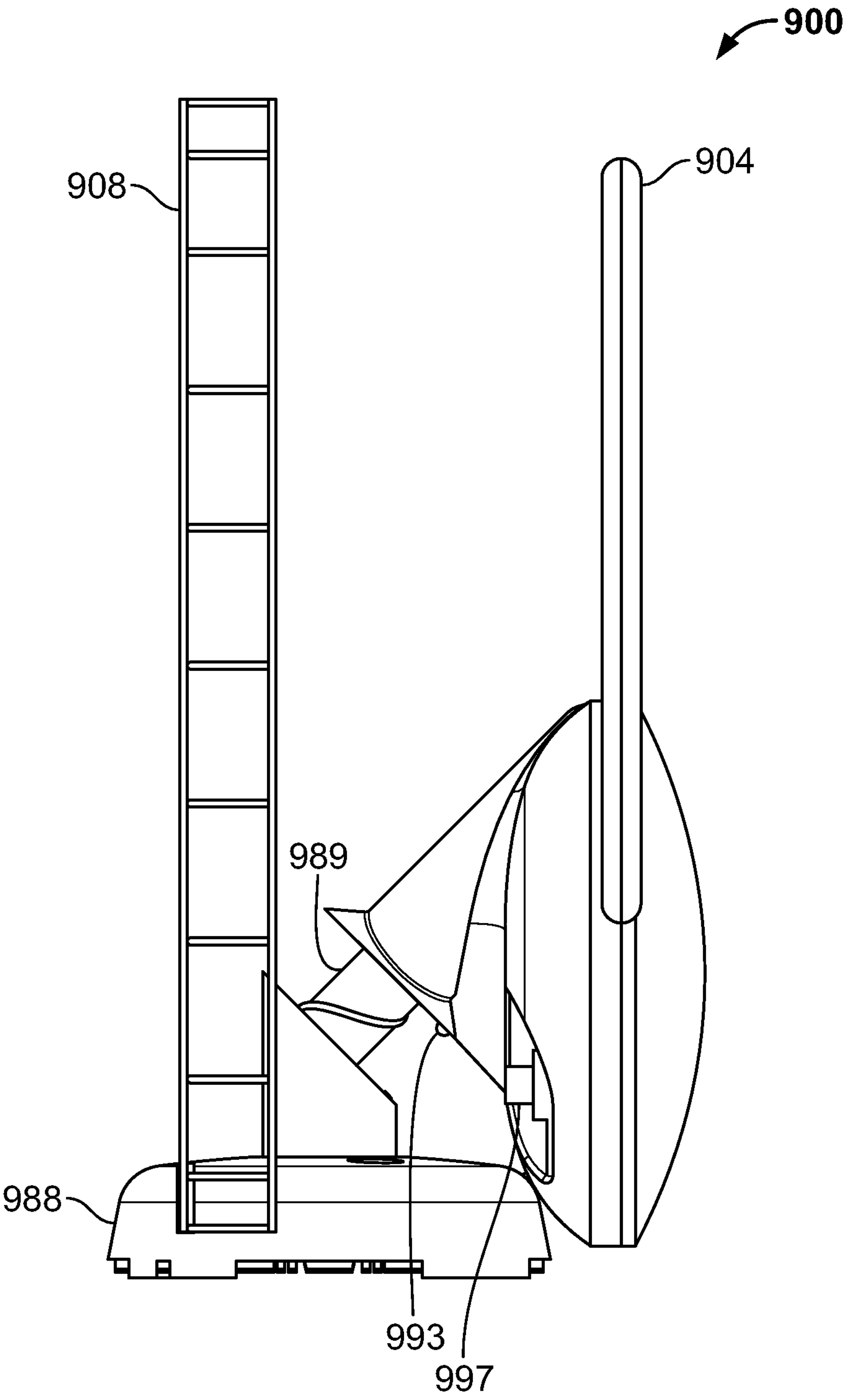
Figure 45:
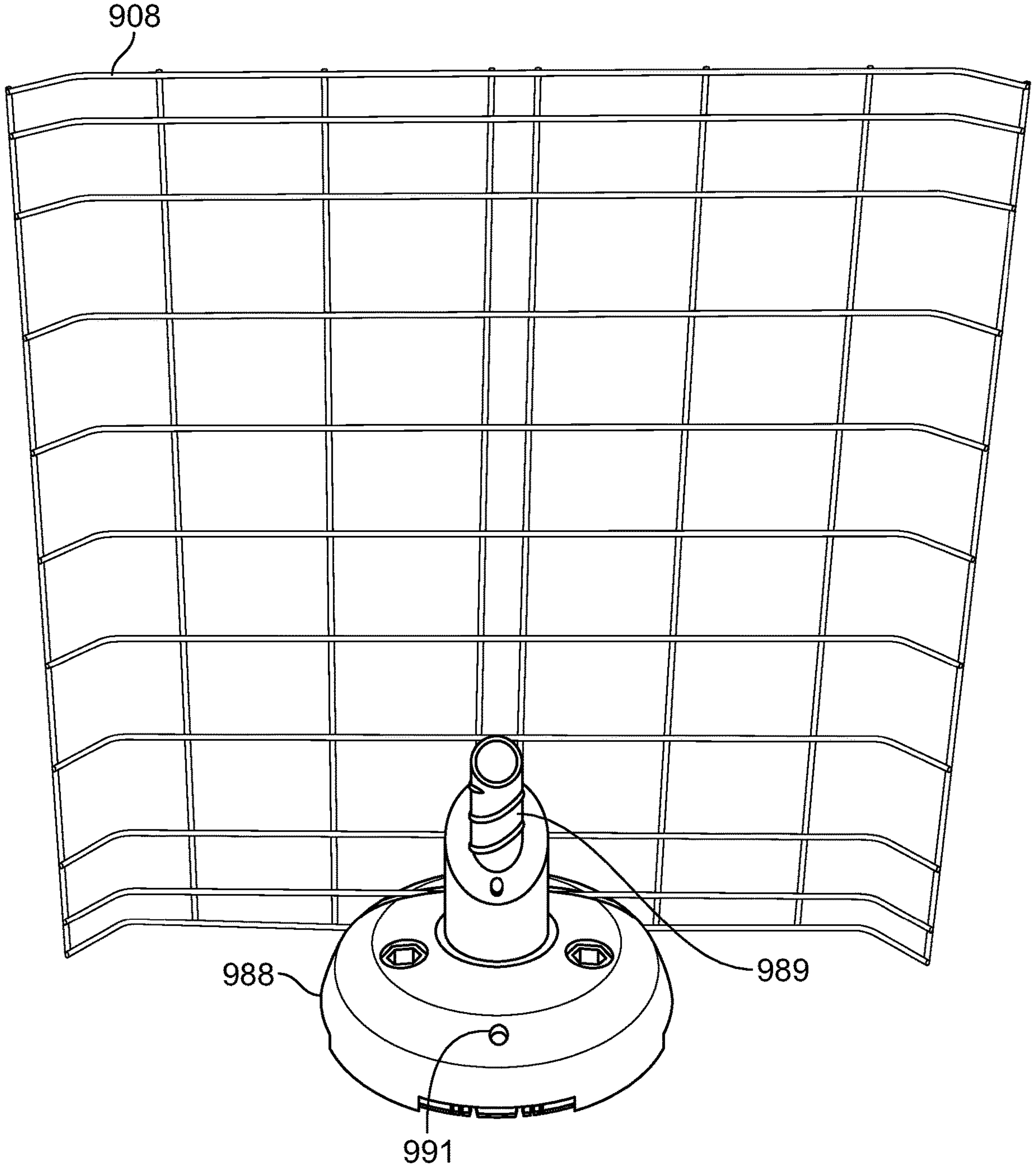
Figure 46:
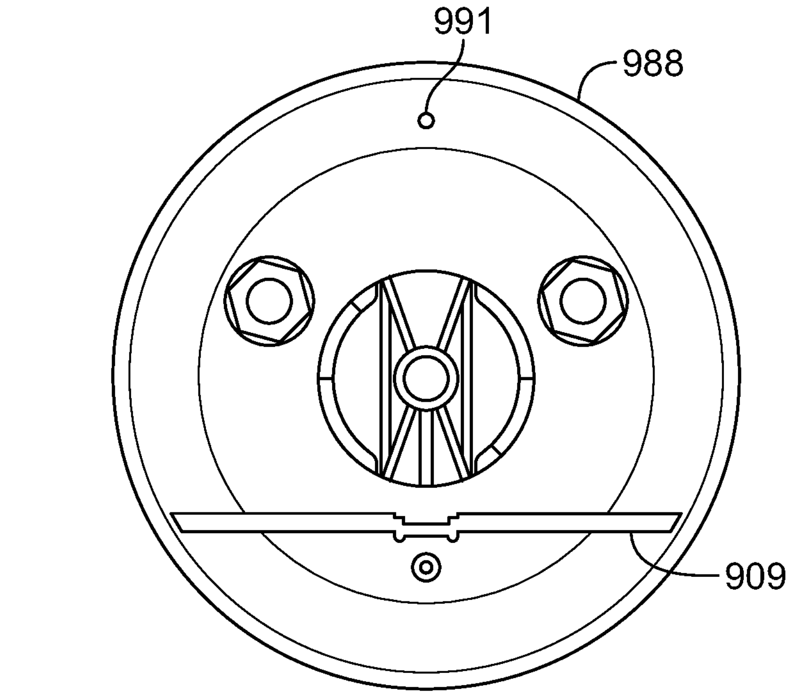
Figure 47:
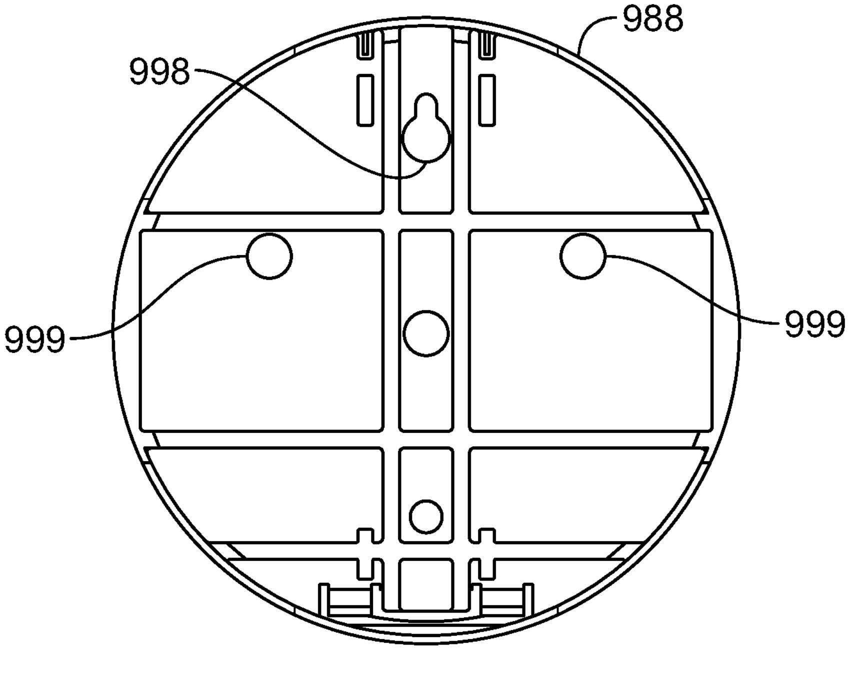
Figure 48:
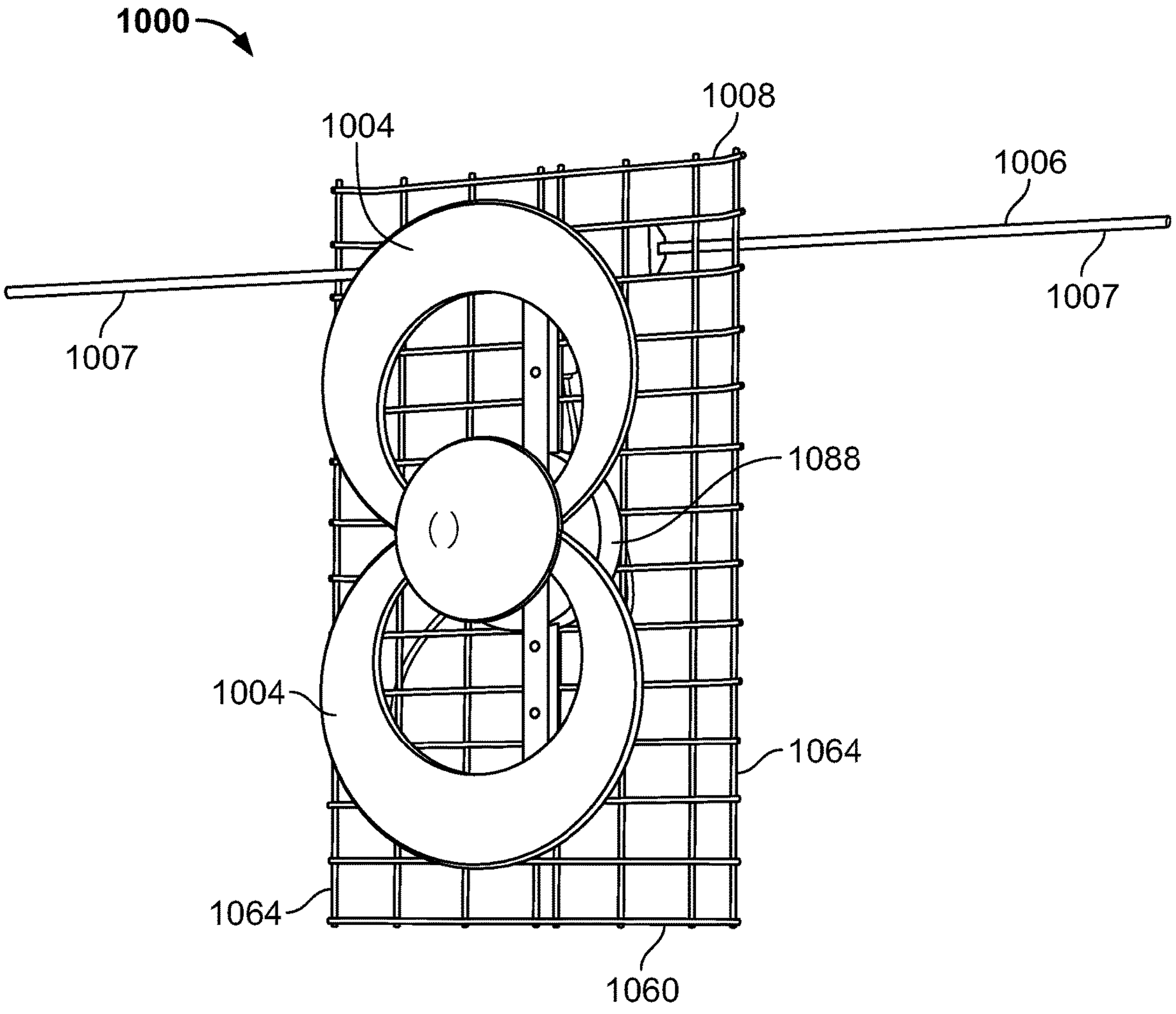
Figure 49:
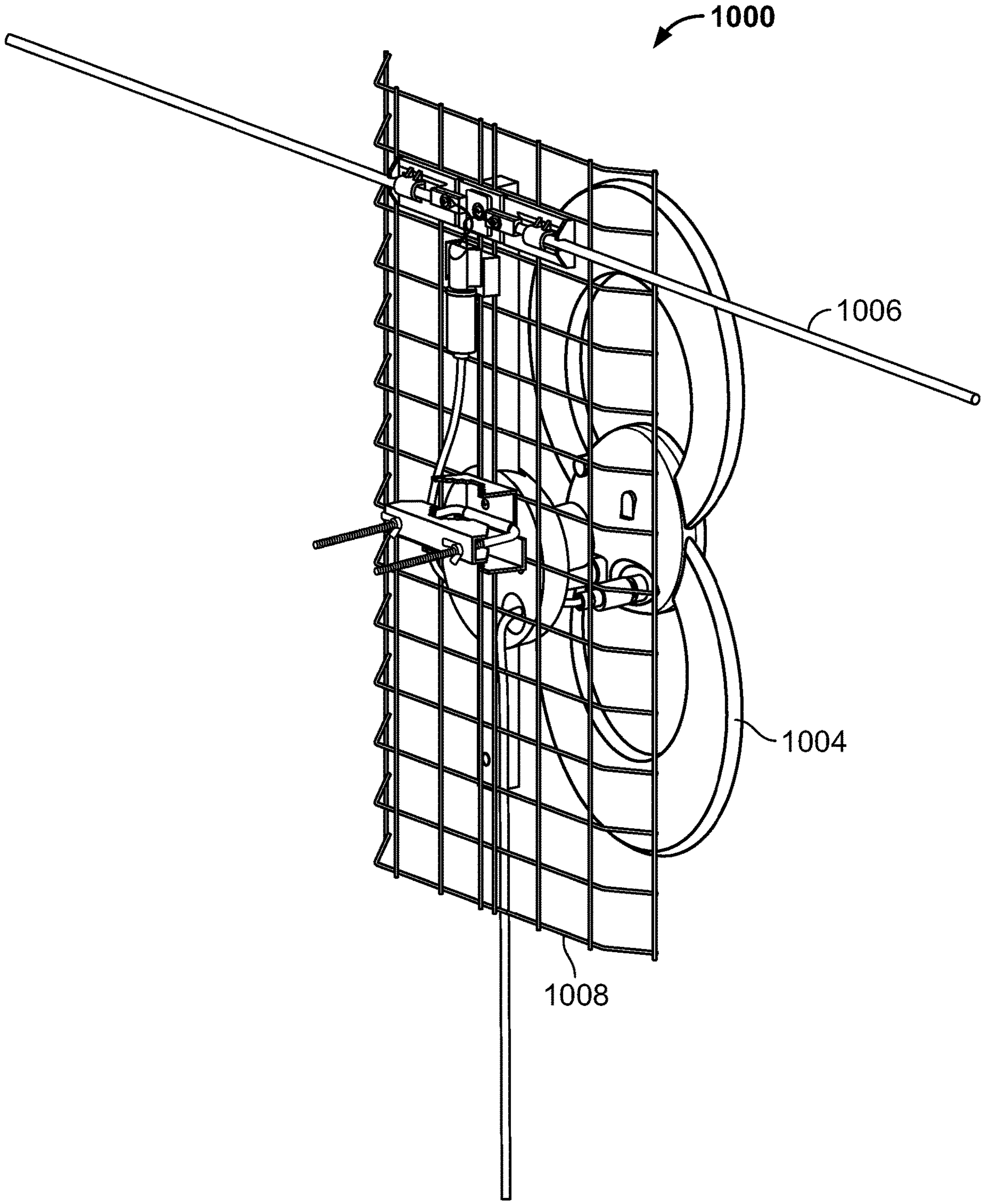
Figure 50:
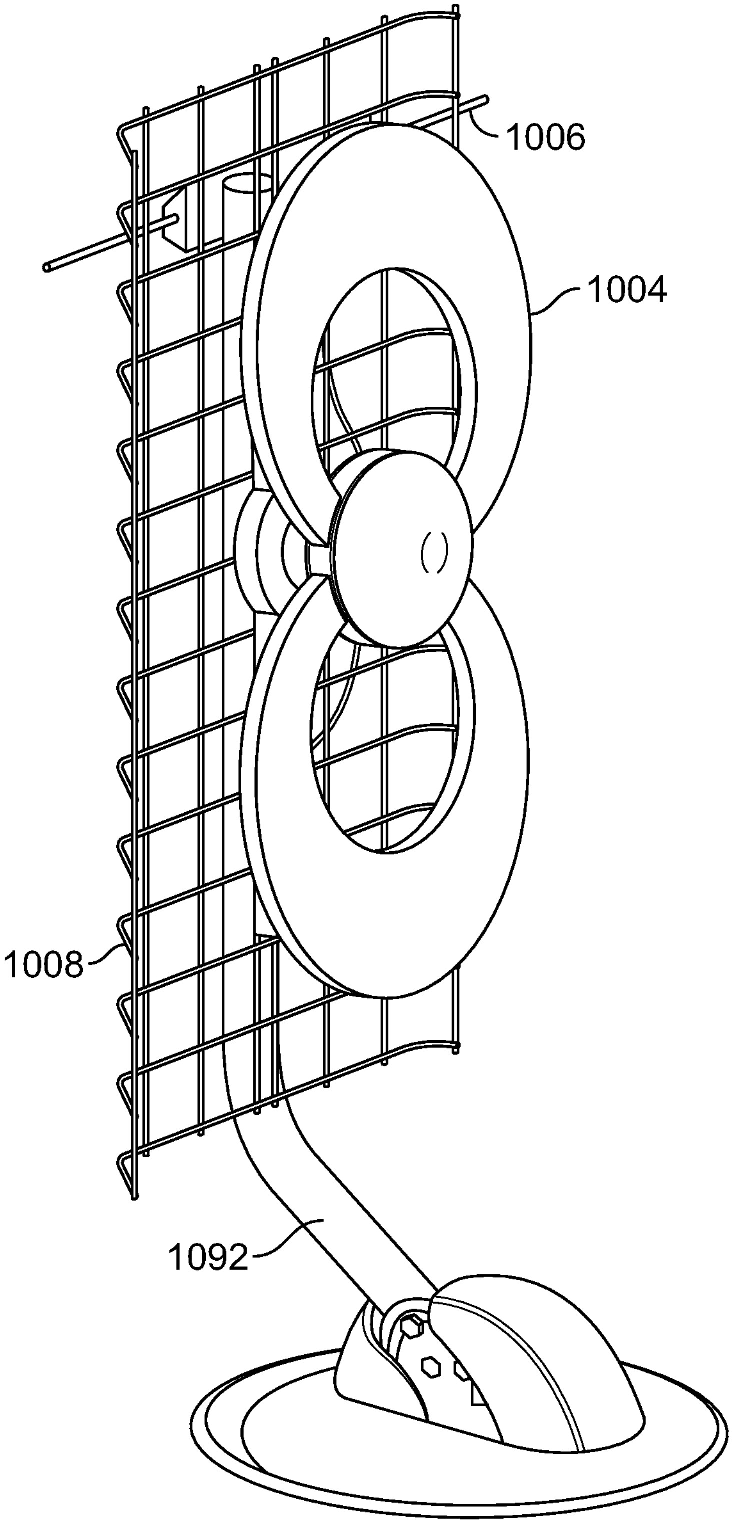

FIG. 43 is a perspective view of another exemplary embodiment of an antenna assembly having a tapered loop antenna element and a support that is rotatably convertible between a first configuration for supporting the antenna assembly on a horizontal surface and a second configuration for supporting the antenna assembly from a vertical surface, where the rotatably convertible support is shown in the first configuration with a reflector mounted within a slot or groove of the rotatably convertible support;

FIG. 44 is a left side view of the antenna assembly shown in FIG. 43;

FIG. 45 is a front perspective view of the antenna assembly shown in FIG. 43 with the tapered loop antenna element removed from the support and illustrating the reflector mounted within the slot of the support;

FIG. 46 is a top view of the support of the antenna assembly shown in FIG. 43 with the threaded stem portion removed;

FIG. 47 is a bottom view of the support of the antenna assembly shown in FIG. 43;

FIG. 48 is a perspective view of another exemplary embodiment of an antenna assembly having two tapered loop antenna elements and a reflector, where the antenna assembly further includes a VHF dipole and an integrated UHF balun diplexer internal to the UHF antenna;

FIG. 49 is a back perspective view of the antenna assembly shown in FIG. 48;

FIG. 50 is a perspective view of the antenna assembly shown in FIG. 48 shown mounted to a mast and a mast base for free-standing indoor use according to an exemplary embodiment.

Figure 51:
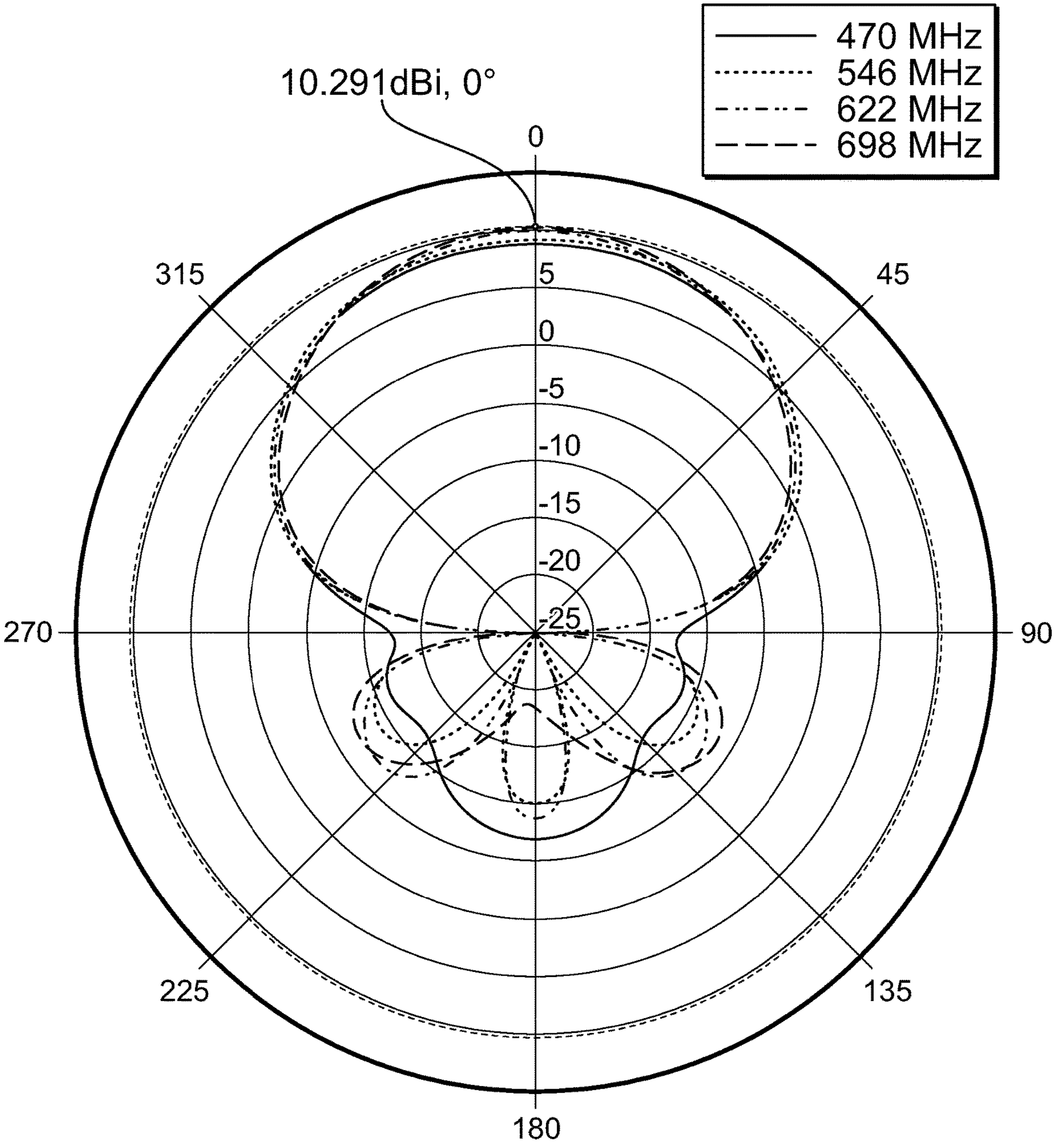
Figure 52:
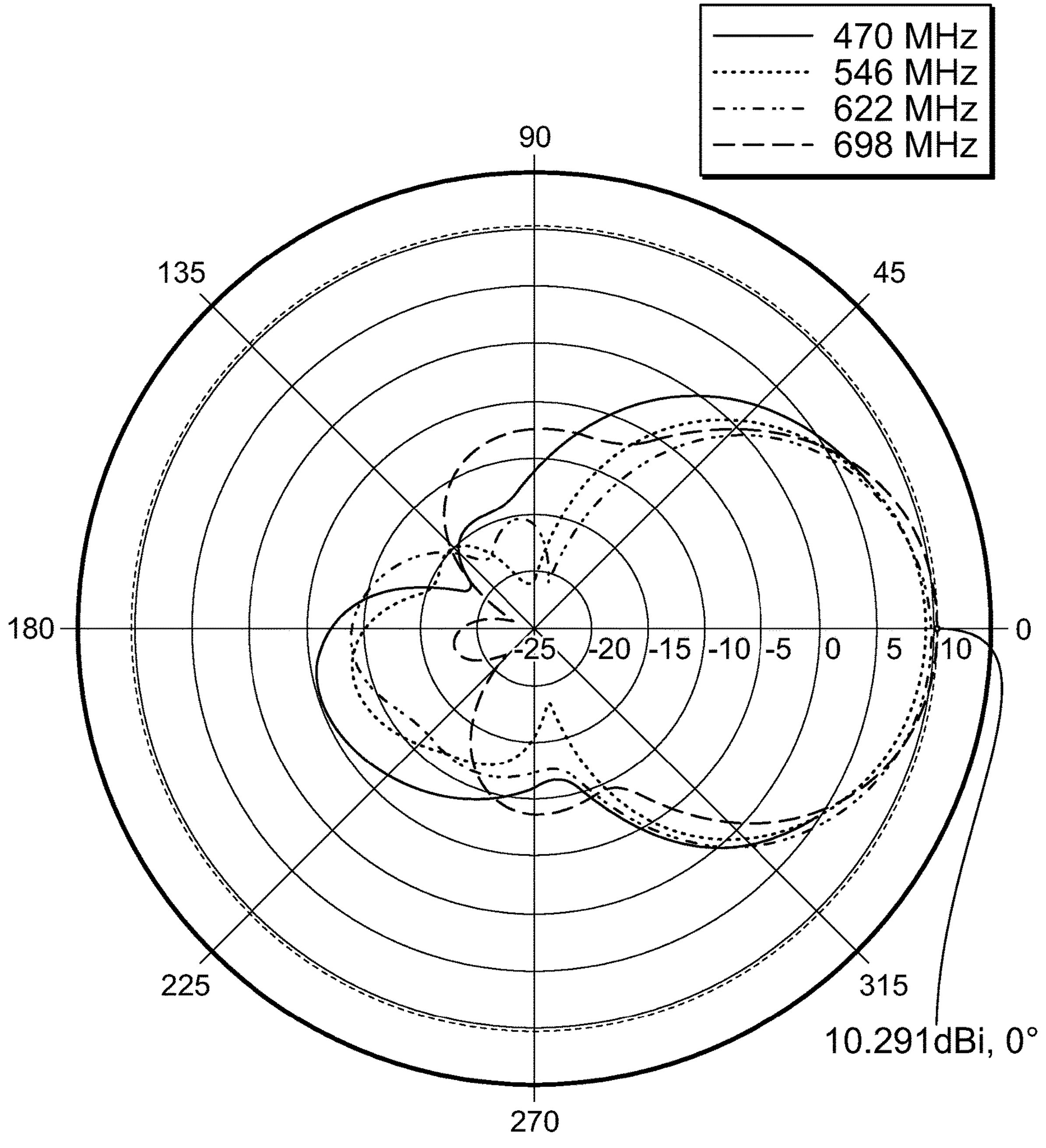
Figure 53:
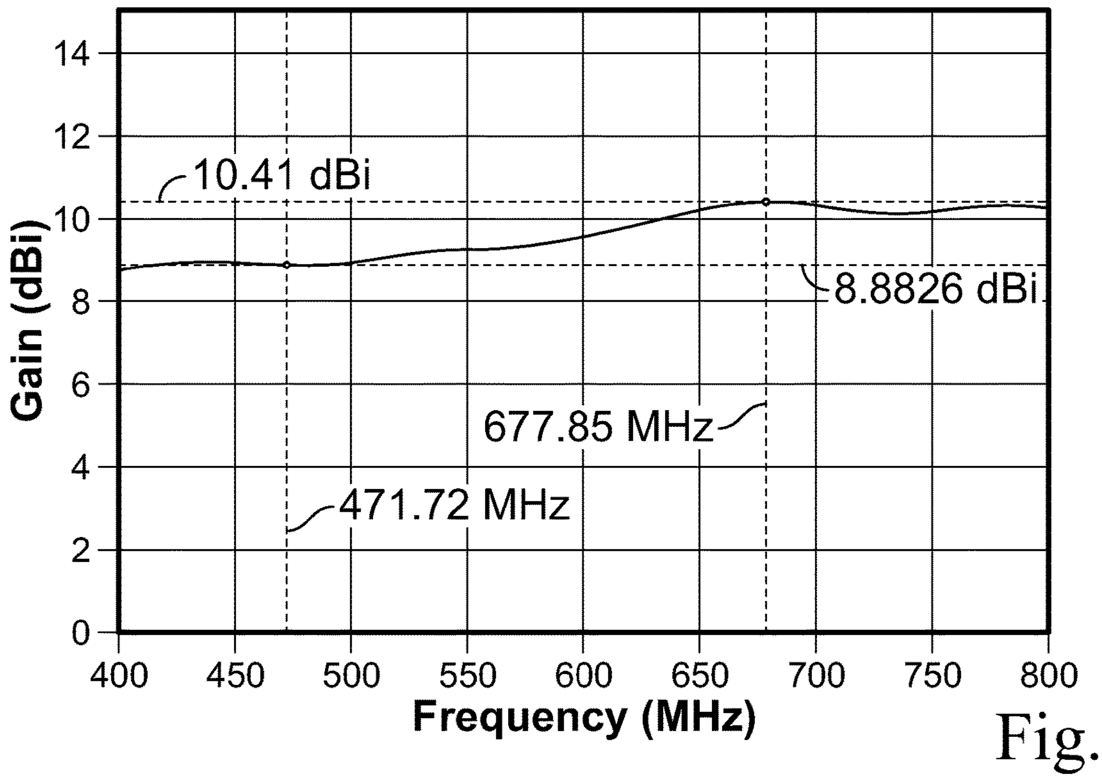
Figure 54:
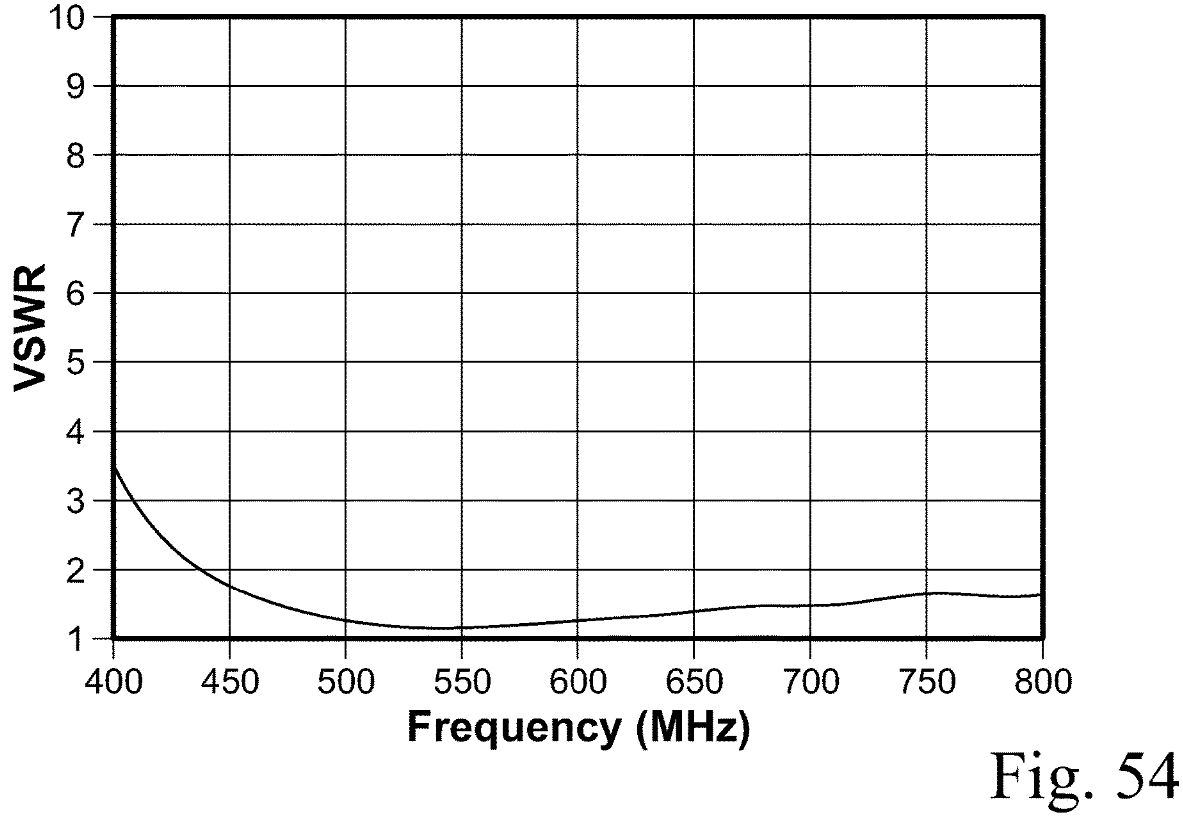
Figure 55:
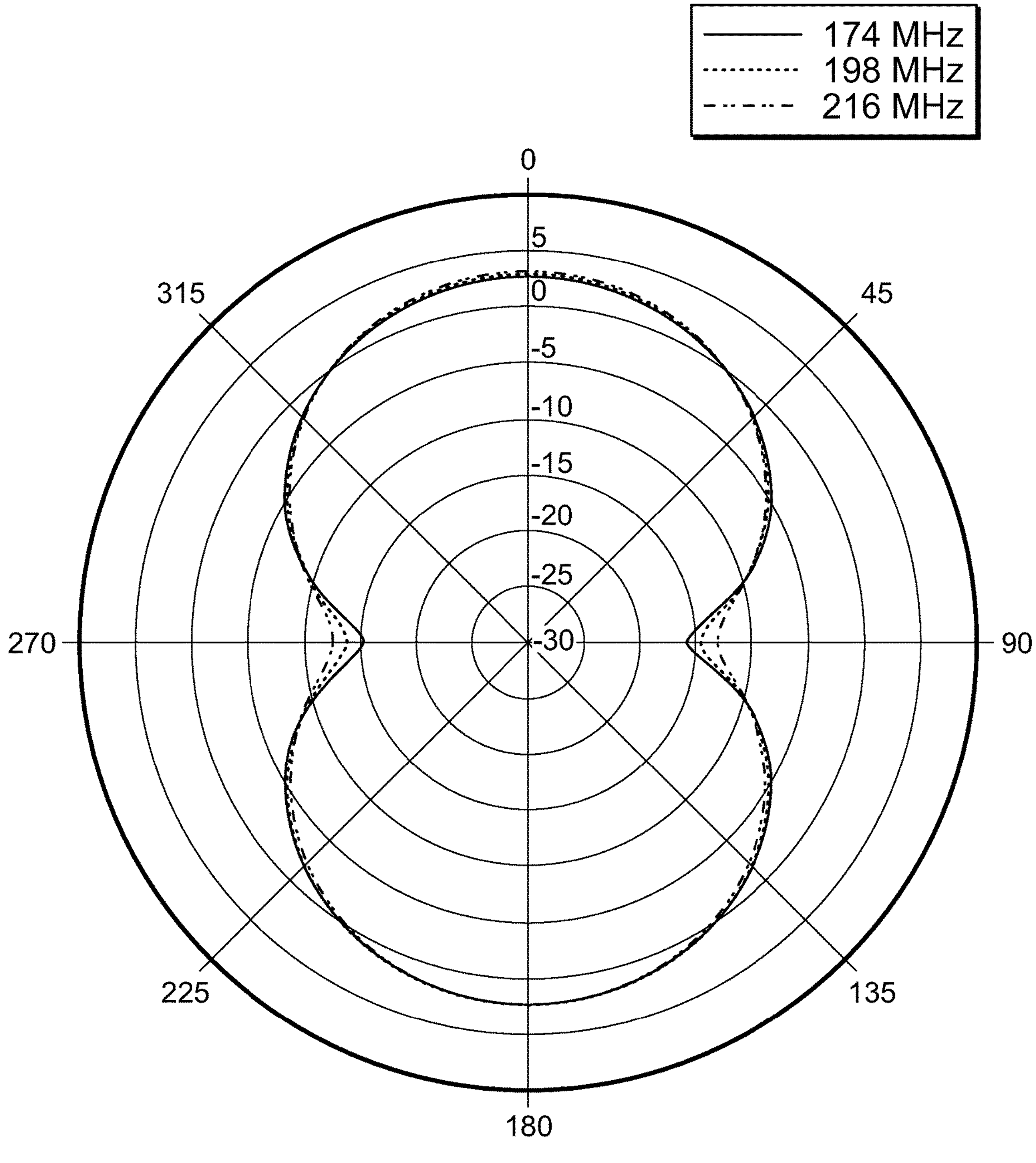
Figure 56:
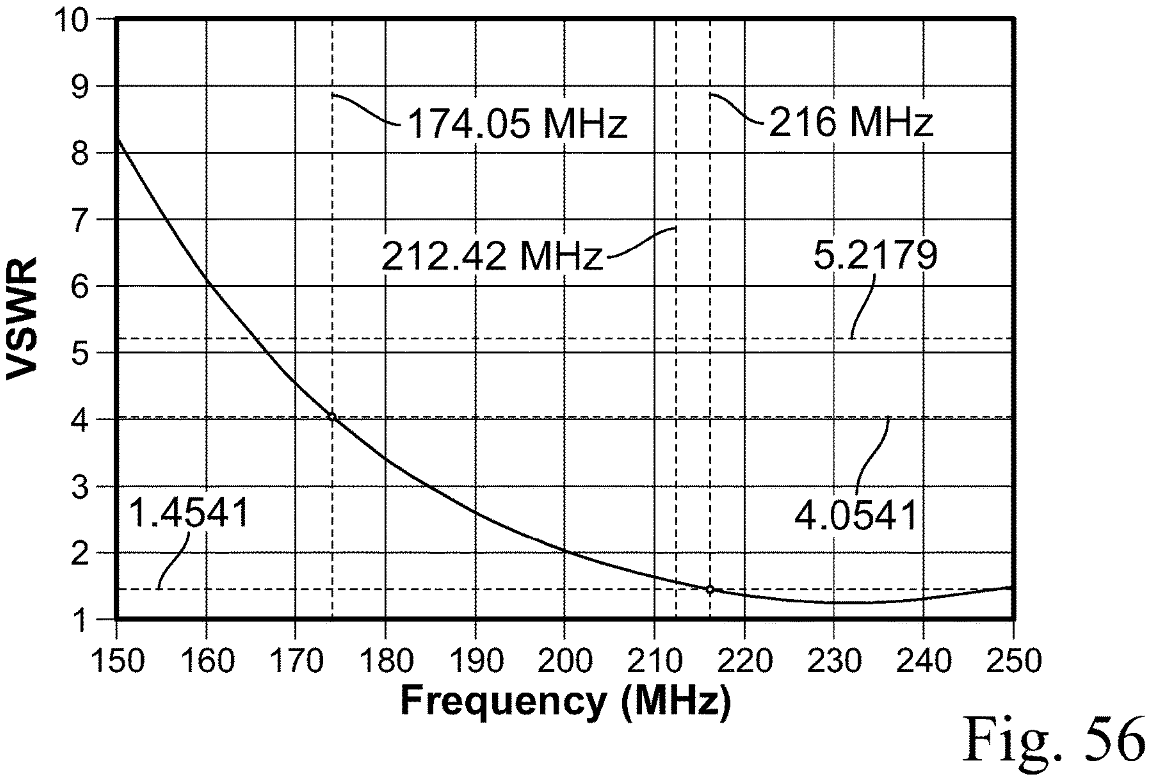
Figure 57:
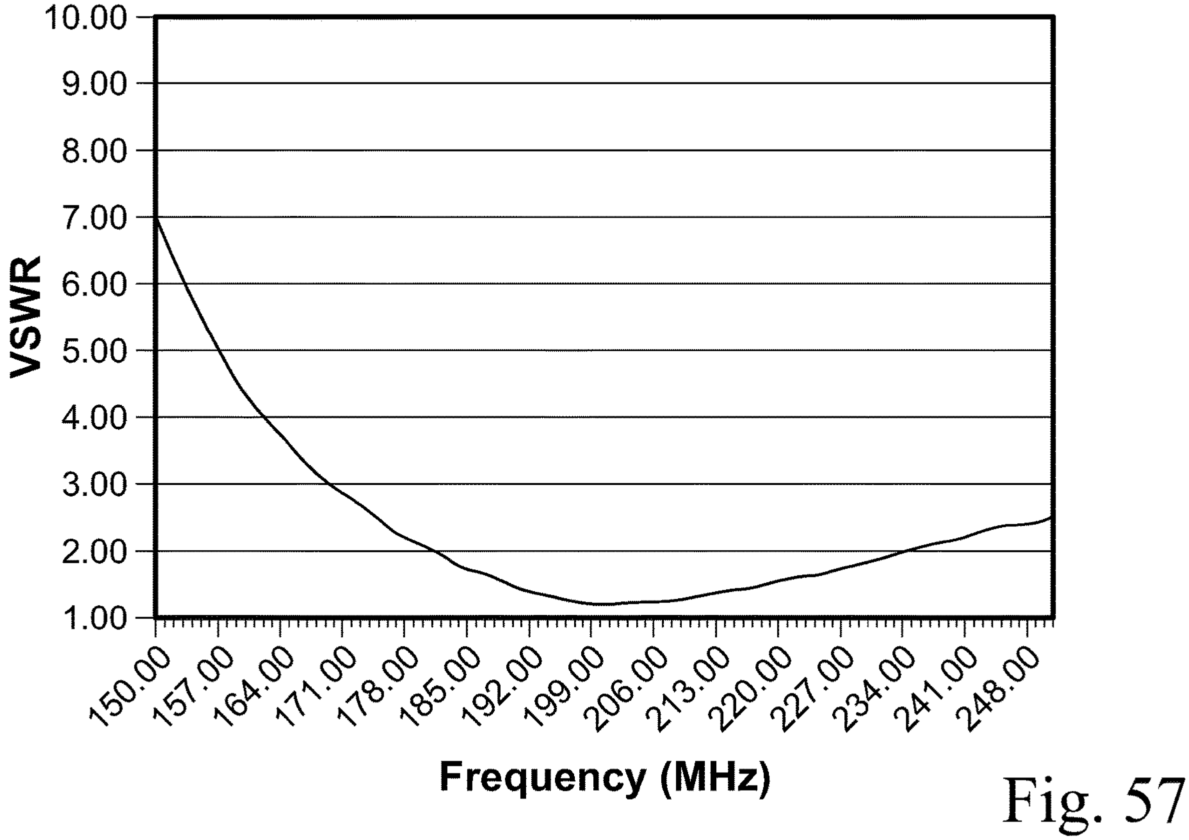
Figure 58:
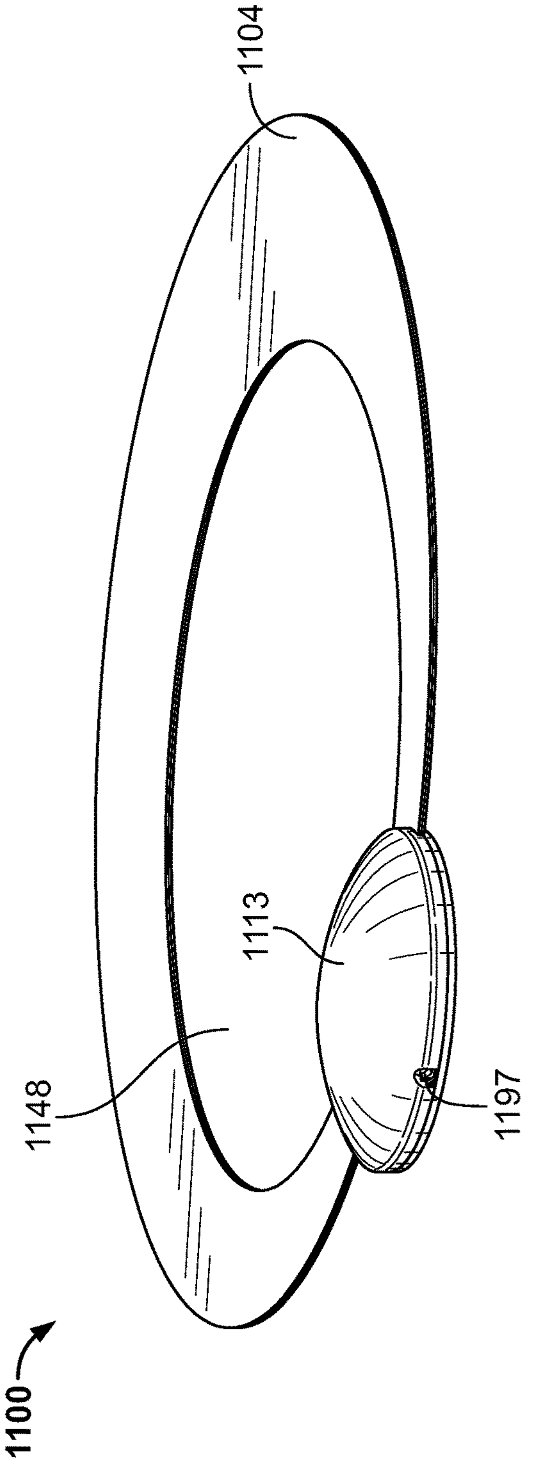
Figure 59:
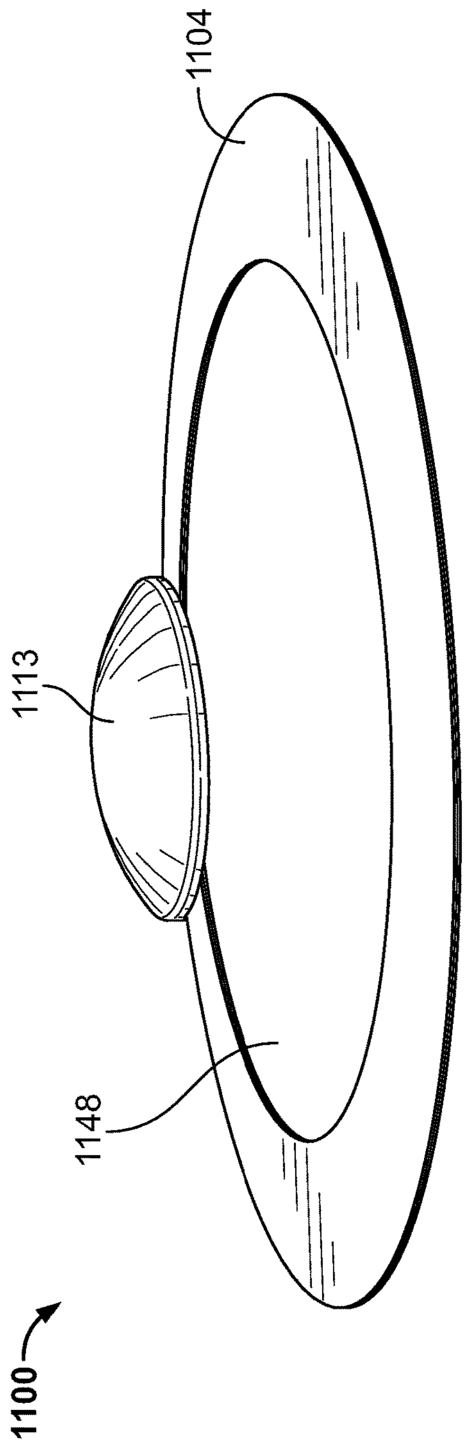
Figure 60:
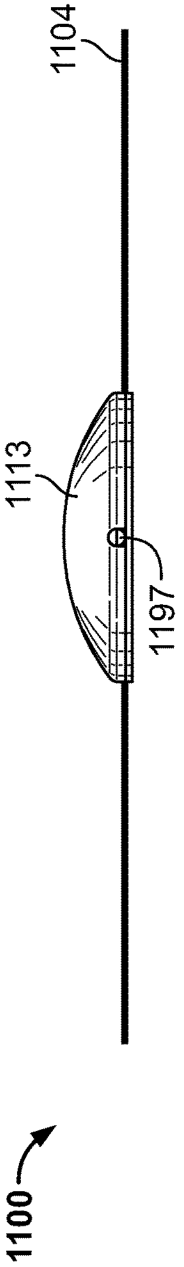
Figure 61:
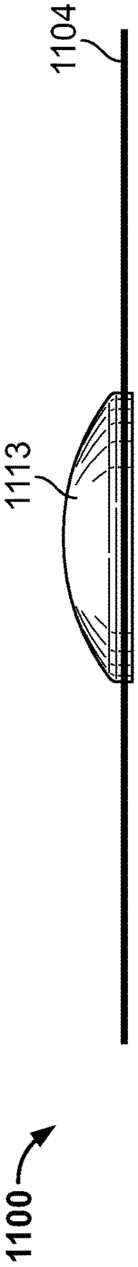
Figure 62:
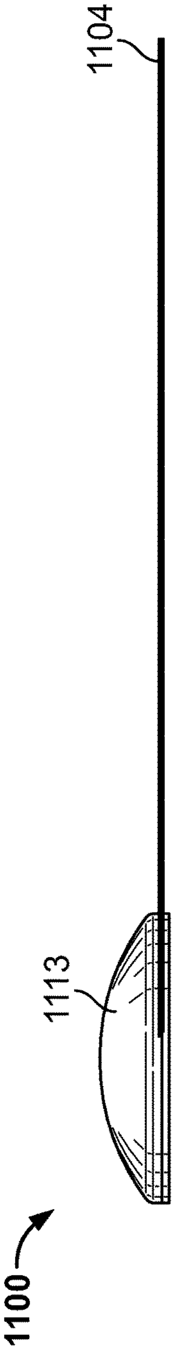
Figure 63:
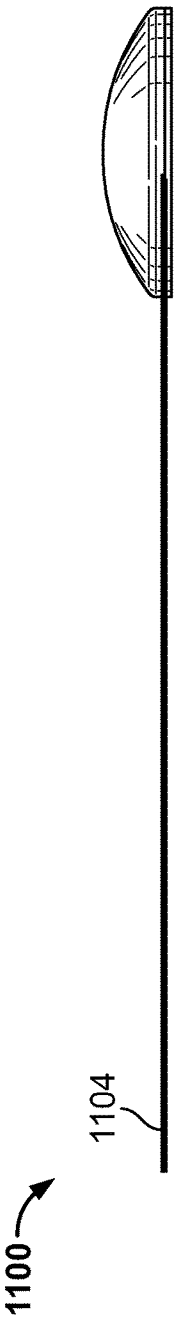
Figure 64:
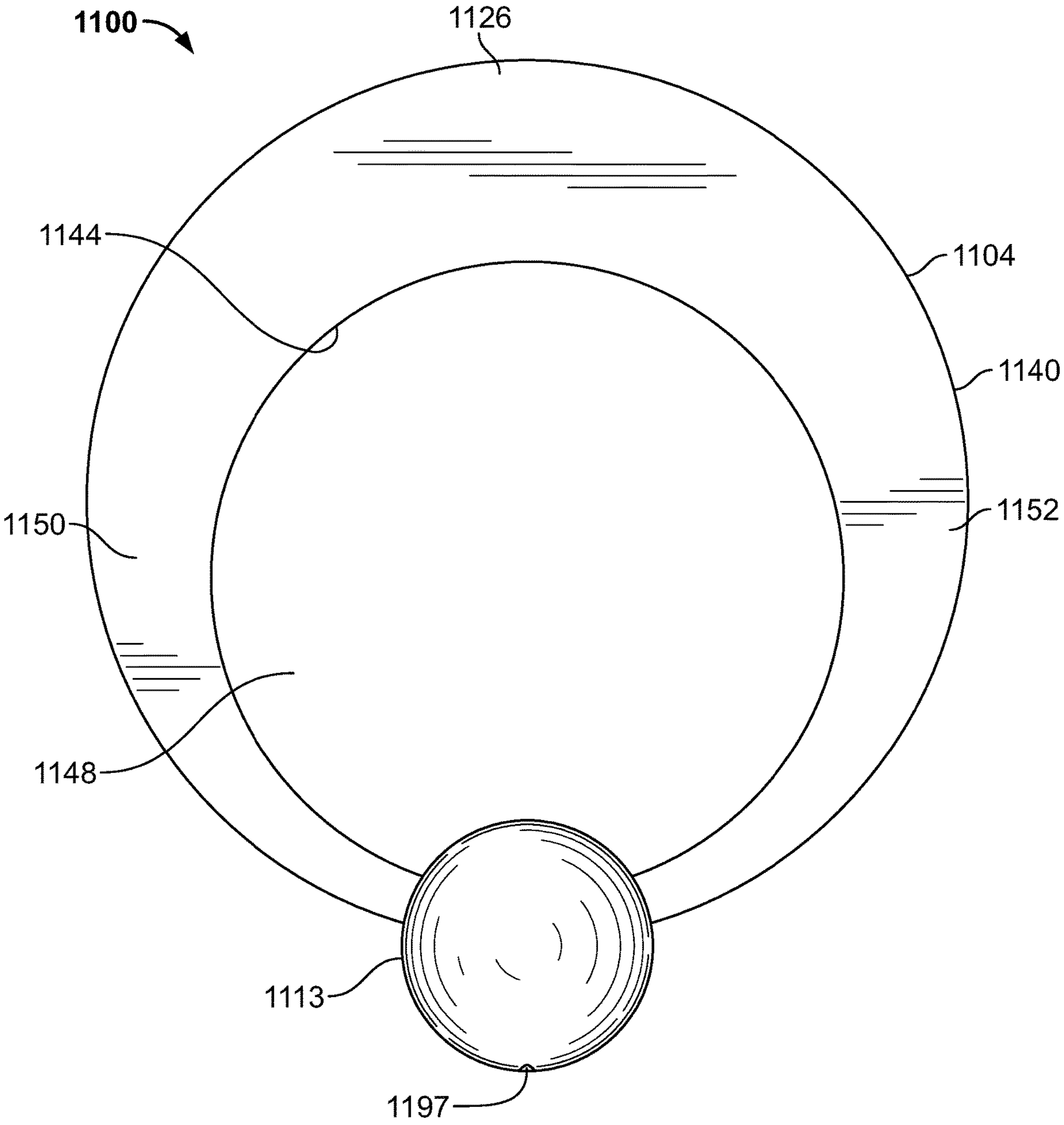
Figure 65:
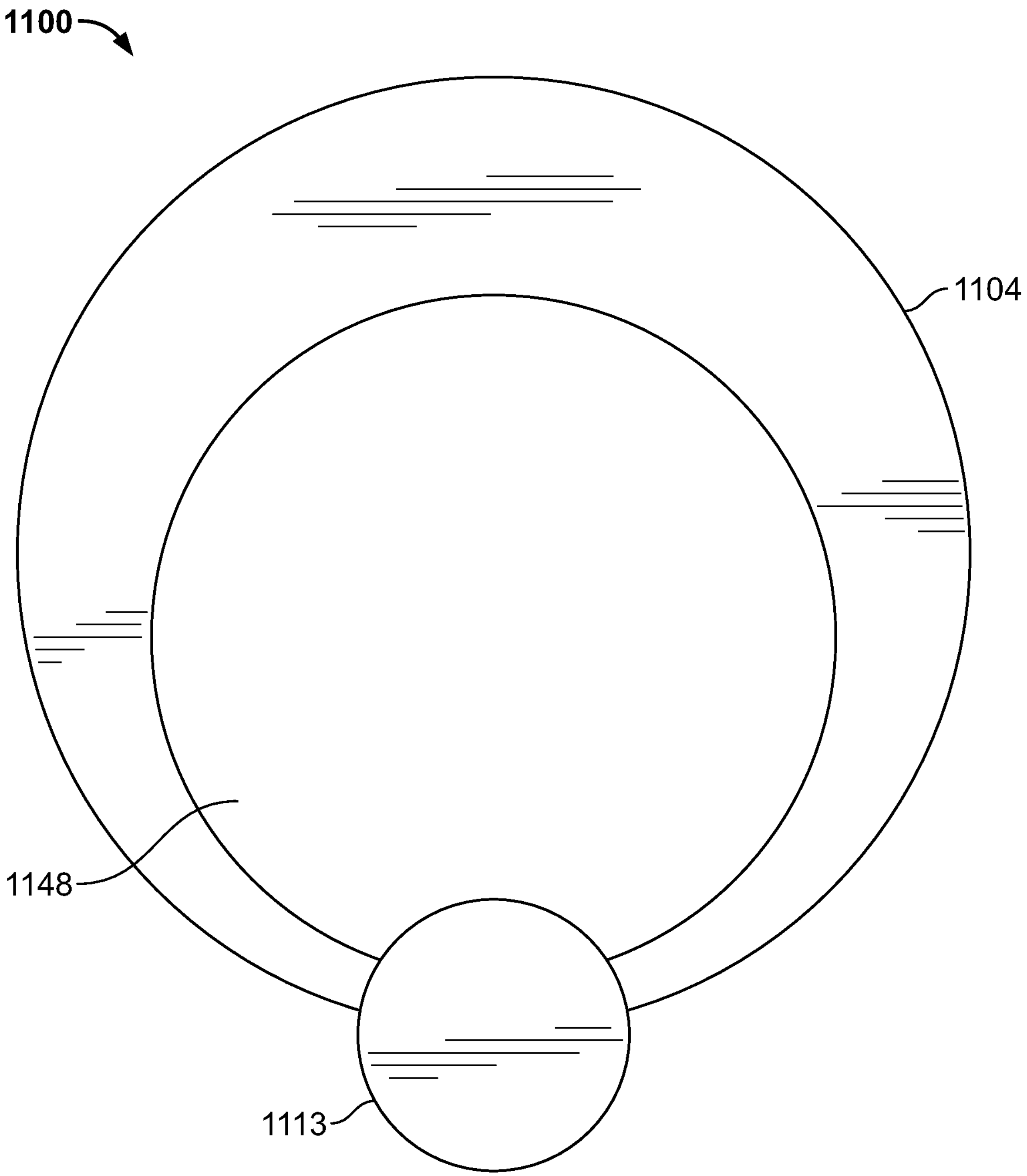
Figure 66:
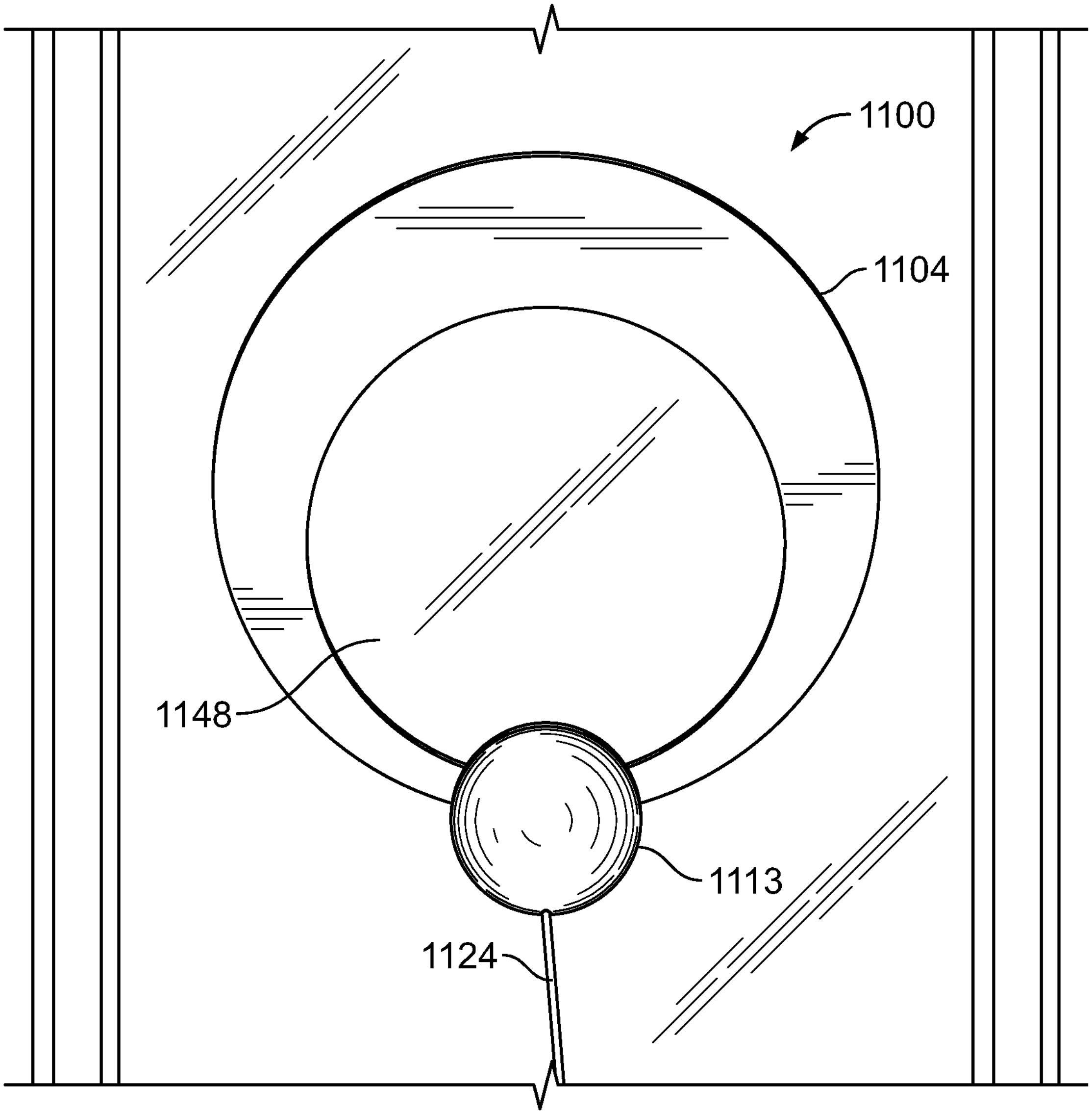
Figure 67:
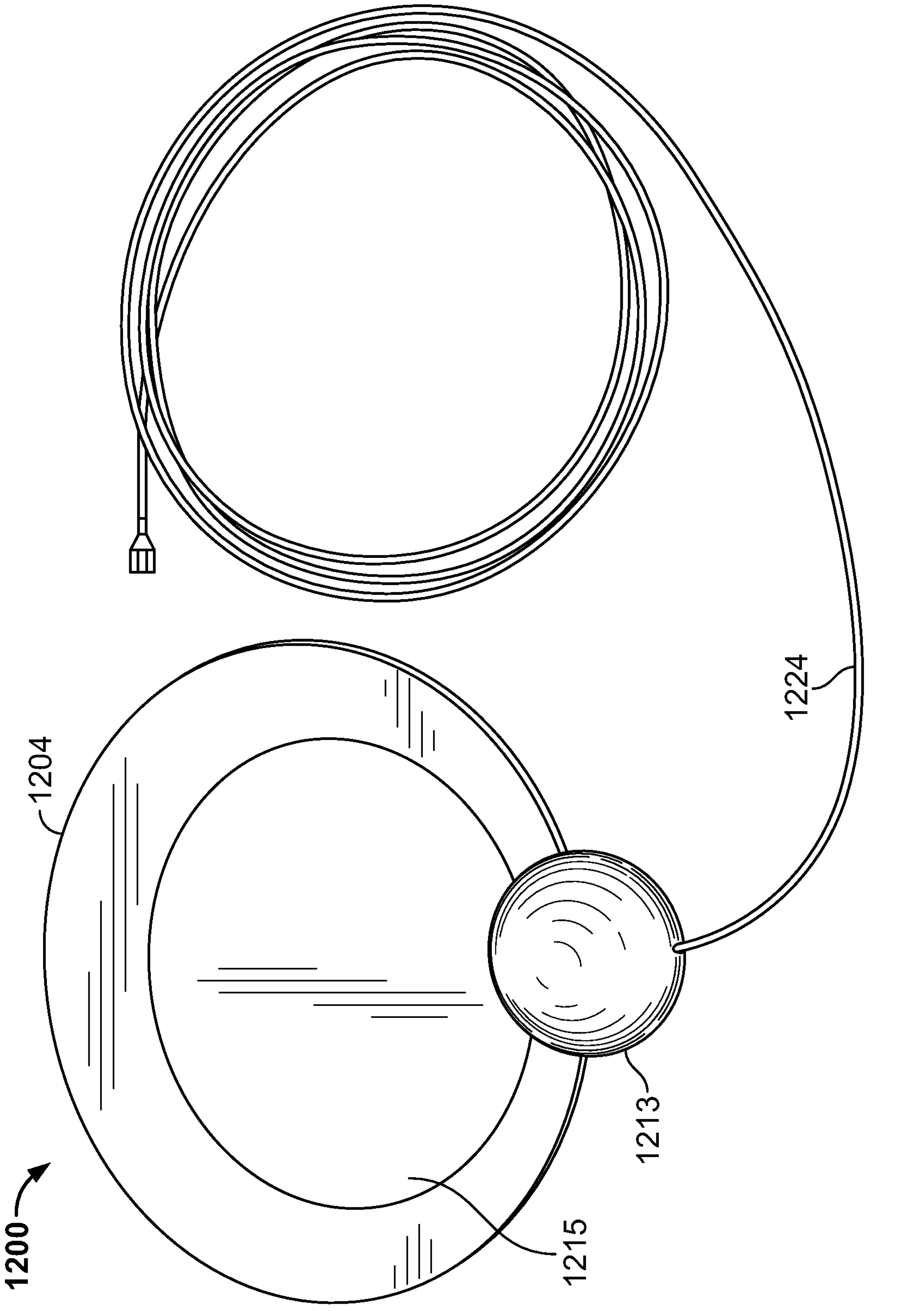

FIG. 51 is an exemplary line graph showing UHF computer-simulated gain (in decibels referenced to isotropic gain (dBi)) versus azimuth angle at various frequencies (in megahertz (MHz)) for the antenna assembly shown in FIG. 48;

FIG. 52 is an exemplary line graph showing UHF computer-simulated gain (dBi) versus elevation angle at various frequencies (MHz) for the antenna assembly shown in FIG. 48;

FIG. 53 is an exemplary line graph showing UHF boresight gain (dBi) versus frequency (MHz) for the antenna assembly shown in FIG. 48;

FIG. 54 is an exemplary line graph showing UHF computer-simulated voltage standing wave ratio (VSWR) versus frequency (MHz) for the antenna assembly shown in FIG. 48;

FIG. 55 is an exemplary line graph showing VHF element computer-simulated gain (dBi) versus azimuth angle at various frequencies (MHz) for the antenna assembly shown in FIG. 48;

FIG. 56 is an exemplary line graph showing VHF element computer-simulated gain (dBi) versus elevation angle at various frequencies (MHz) for the antenna assembly shown in FIG. 48;

FIG. 57 is an exemplary line graph showing VHF element boresight gain (dBi) versus frequency (MHz) for the antenna assembly shown in FIG. 48;

FIG. 58 is a perspective view of another exemplary embodiment of an antenna assembly having a tapered loop antenna element;

FIG. 59 is another perspective view of the antenna assembly shown in FIG. 58;

FIG. 60 is a bottom view of the antenna assembly shown in FIG. 58;

FIG. 61 is a top view of the antenna assembly shown in FIG. 58;

FIG. 62 is a right side view of the antenna assembly shown in FIG. 58;

FIG. 63 is a left side view of the antenna assembly shown in FIG. 58;

FIG. 64 is a front view of the antenna assembly shown in FIG. 58;

FIG. 65 is a bottom view of the antenna assembly shown in FIG. 58;

FIG. 66 shows the antenna assembly of FIG. 58 mounted to a window according to an exemplary embodiment; and FIG. 67 illustrates another exemplary embodiment of an antenna assembly having a tapered loop antenna element.

DETAILED DESCRIPTION

The following description is merely exemplary in nature and is in no way intended to limit the present disclosure, application, or uses.

Figure 1:
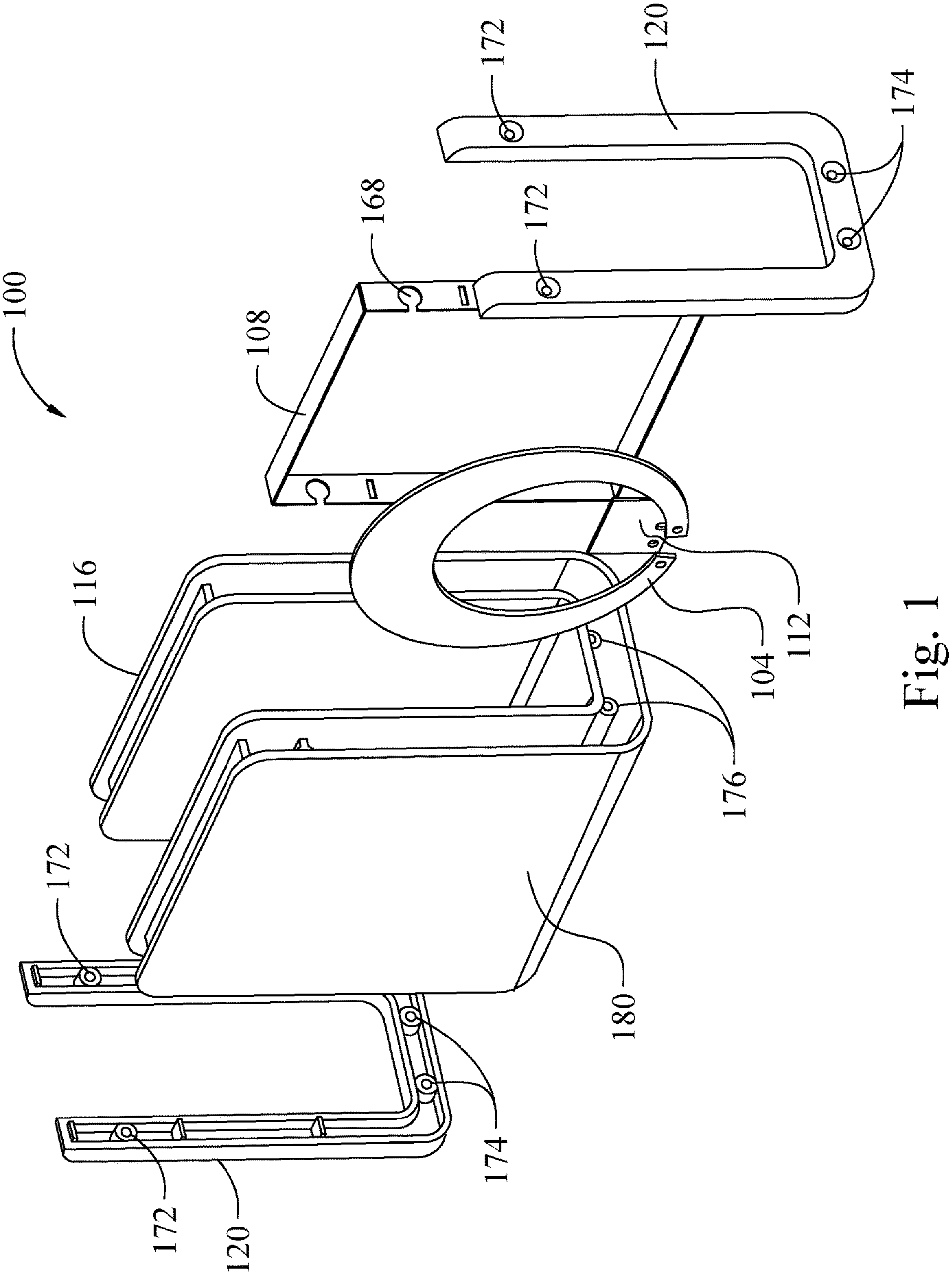
FIG. 1 is an exploded perspective view of an antenna assembly including a tapered loop antenna element, a reflector, a housing (with the end pieces exploded away for clarity), and a PCB balun according to an exemplary embodiment.

FIGS. 1 through 4 illustrate an exemplary antenna assembly 100 embodying one or more aspects of the present disclosure. As shown in FIG. 1, the antenna assembly 100 generally includes a tapered loop antenna element 104 (also shown in FIGS. 5 through 10), a reflector element 108, a balun 112, and a housing 116 with removable end pieces or portions 120.

Figure 11:
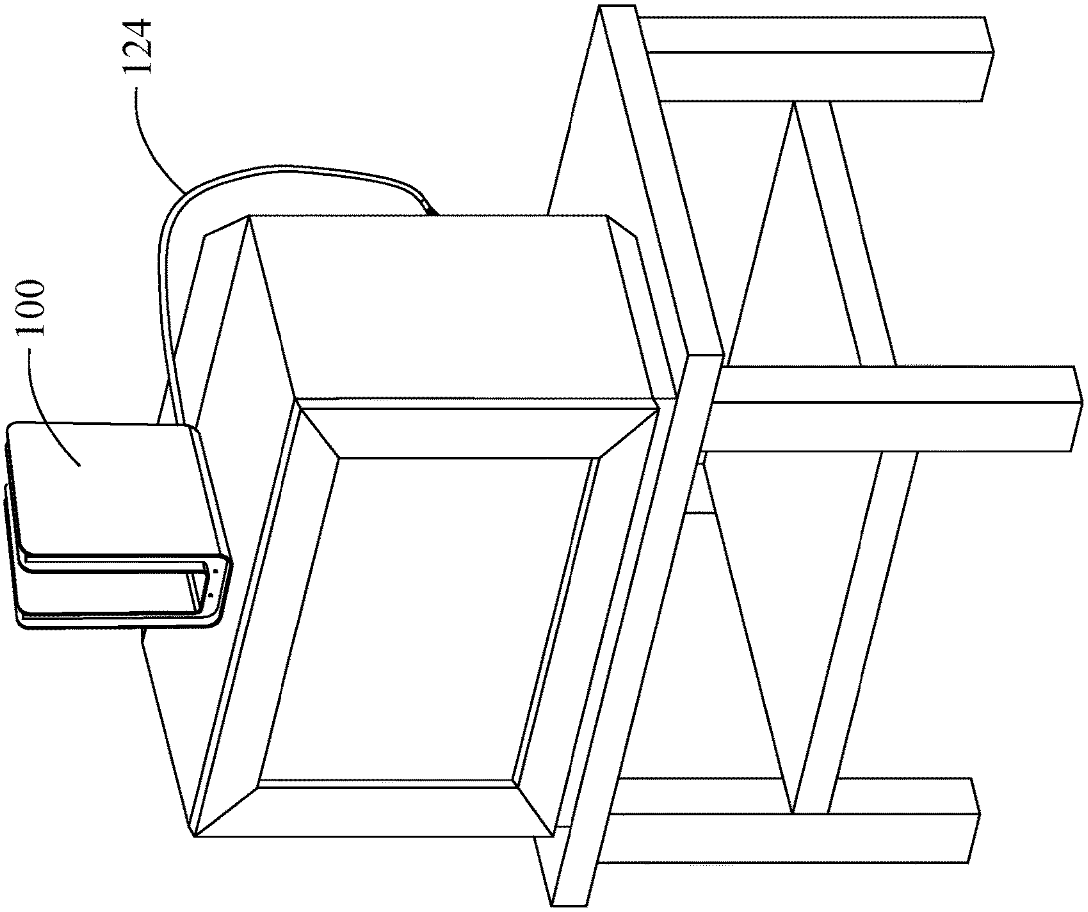
FIG. 11 is a perspective view illustrating an exemplary use for the antenna assembly shown in FIG. 2 with the antenna assembly supported on top of a television with a coaxial cable connecting the antenna assembly to the television, whereby the antenna assembly is operable for receiving signals and communicating the same to the television via the coaxial cable.

As shown in FIG. 11, the antenna assembly 100 may be used for receiving digital television signals (of which high definition television (HDTV) signals are a subset) and communicating the received signals to an external device, such as a television. In the illustrated embodiment, a coaxial cable 124 (FIGS. 2 and 11) is used for transmitting signals received by the antenna assembly 100 to the television (FIG. 11). The antenna assembly 100 may also be positioned on other generally horizontal surfaces, such as a tabletop, coffee tabletop, desktop, shelf, etc.). Alternative embodiments may include an antenna assembly positioned elsewhere and/or supported using other means.

In one example, the antenna assembly 100 may include a 75-ohm RG6 coaxial cable 124 fitted with an F-Type connector (although other suitable communication links may also be employed). Alternative embodiments may include other coaxial cables or other suitable communication links.

Figure 3:
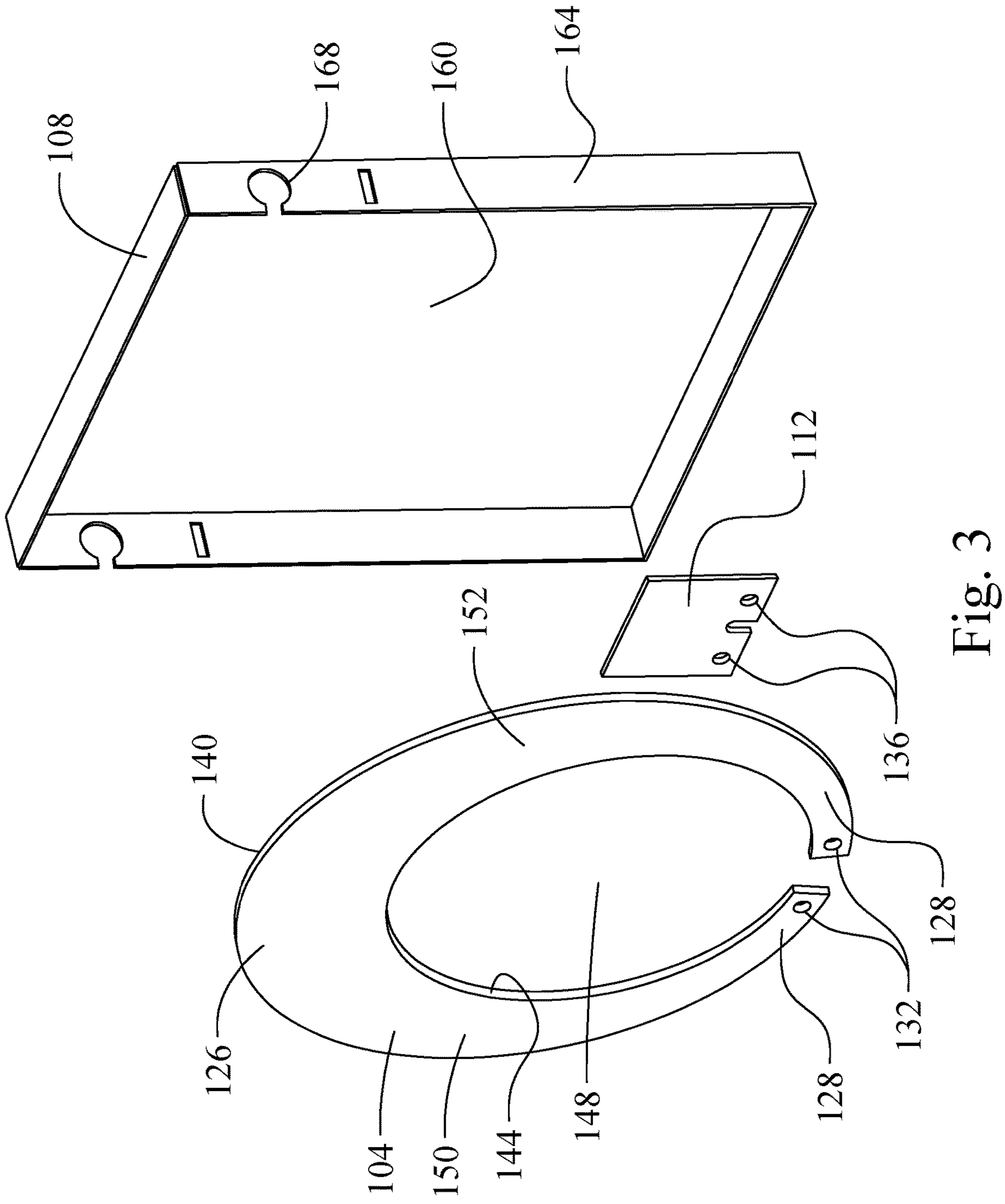
FIG. 3 is an end perspective view illustrating the tapered loop antenna element, reflector, and PCB balun shown in FIG. 1.
Figure 5:
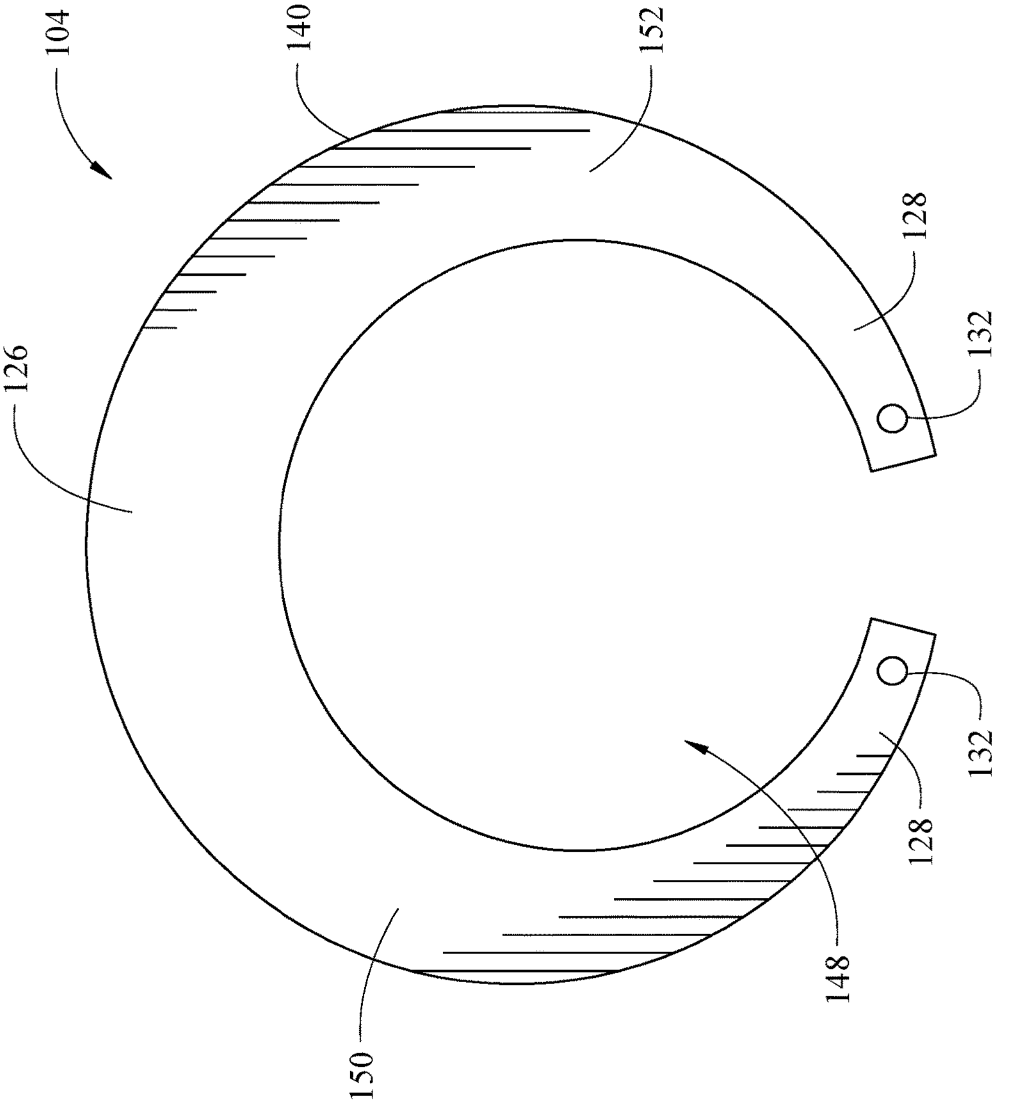
FIG. 5 is a front elevation view of the tapered loop antenna element shown in FIG. 1.
Figure 6:
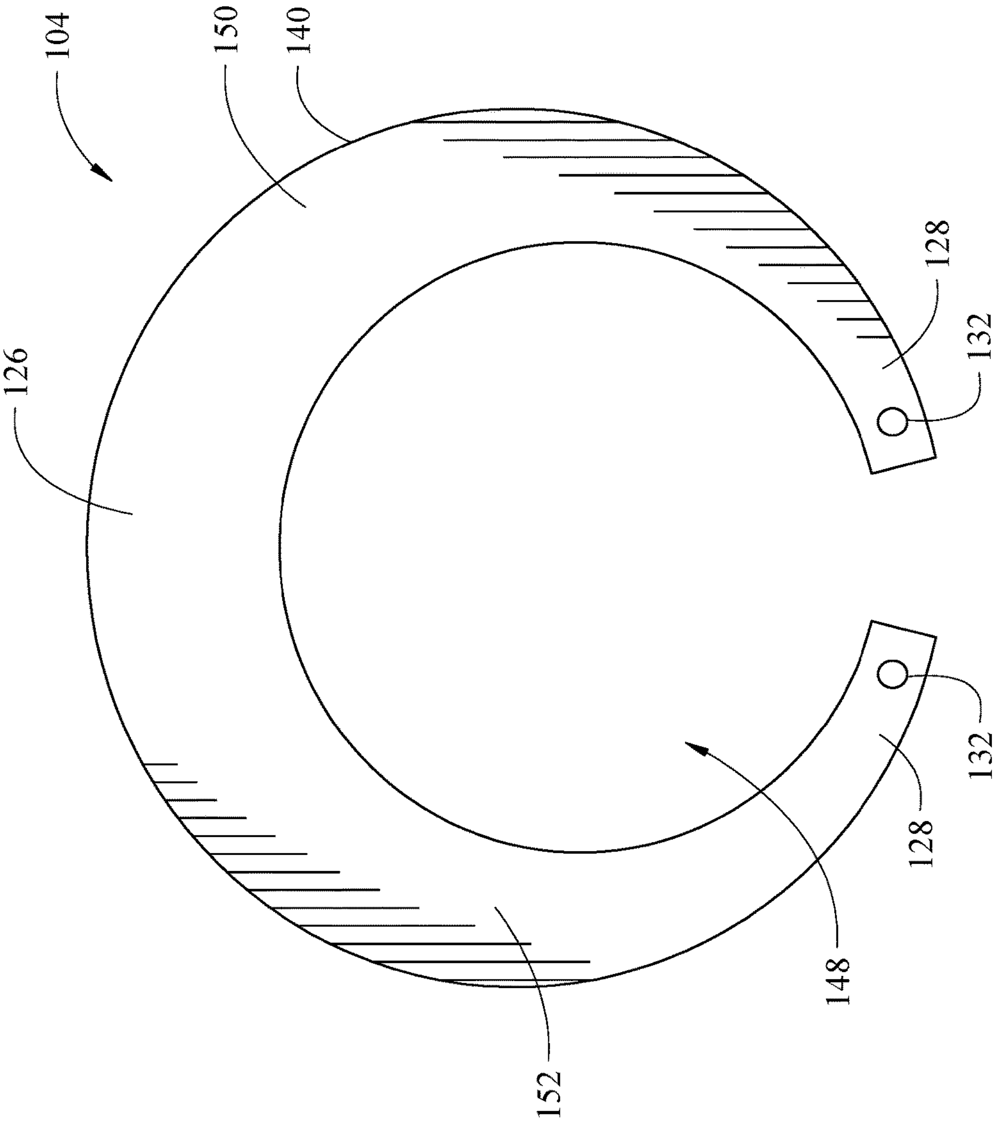
FIG. 6 is a back elevation of the tapered loop antenna element shown in FIG. 1.
Figure 7:
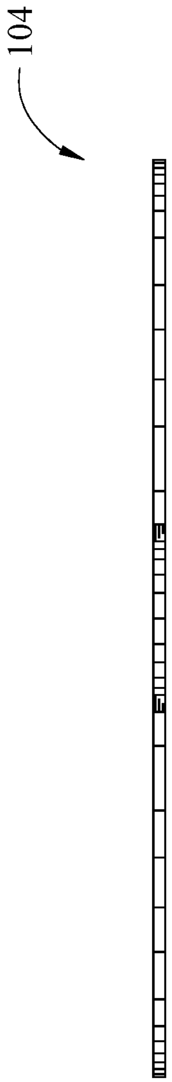
FIG. 7 is a bottom plan view of the tapered loop antenna element shown in FIG. 1.
Figure 8:
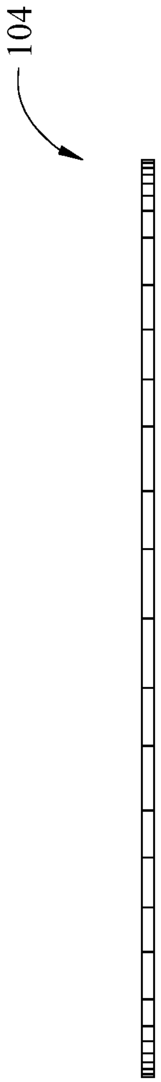
FIG. 8 is a top plan view of the tapered loop antenna element shown in FIG. 1.
Figure 10:
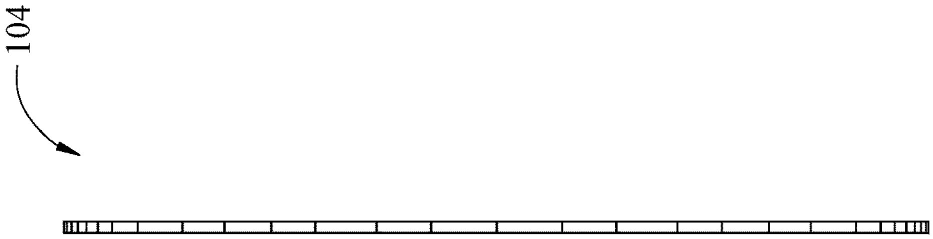
FIG. 10 is a left elevation view of the tapered loop antenna element shown in FIG. 1.
Figure 9:
FIG. 9 is a right elevation view of the tapered loop antenna element shown in FIG. 1.

As shown in FIGS. 3, 5, and 6, the tapered loop antenna element 104 has a generally annular shape cooperatively defined by an outer periphery or perimeter portion 140 and an inner periphery or perimeter portion 144. The outer periphery or perimeter portion 140 is generally circular. The inner periphery or perimeter portion 144 is also generally circular, such that the tapered loop antenna element 104 has a generally circular opening 148.

In some embodiments, the tapered loop antenna element has an outer diameter of about two hundred twenty millimeters and an inner diameter of about eighty millimeters. Some embodiments include the inner diameter being offset from the outer diameter such that the center of the circle defined generally by the inner perimeter portion 144 (the inner diameter's midpoint) is about twenty millimeters below the center of the circle defined generally by the outer perimeter portion 140 (the outer diameter's midpoint). Stated differently, the inner diameter may be offset from the outer diameter such that the inner diameter's midpoint is about twenty millimeters below the outer diameter's midpoint. The offsetting of the diameters thus provides a taper to the tapered loop antenna element 104 such that it has at least one portion (a top portion 126 shown in FIGS. 3, 5, and 6) wider than another portion (the end portions 128 shown in FIGS. 3, 5, and 6). The taper of the tapered loop antenna element 104 has been found to improve performance and aesthetics. As shown by FIGS. 1, 3, 5, and 6, the tapered loop antenna element 104 includes first and second halves or curved portions 150, 152 that are generally symmetric such that the first half or curved portion 150 is a mirror-image of the second half or curved portion 152. Each curved portion 150, 152 extends generally between a corresponding end portion 128 and then tapers or gradually increases in width until the middle or top portion 126 of the tapered loop antenna element 104. The tapered loop antenna element 104 may be positioned with the housing 116 in an orientation such that the wider portion 126 of the tapered loop antenna element 104 is at the top and the narrower end portions 128 are at the bottom.

With continued reference to FIGS. 3, 5, and 6, the tapered loop antenna element 104 includes spaced-apart end portions 128. In one particular example, the end portions 128 of the tapered loop antenna element 104 are spaced apart a distance of about 2.5 millimeters. Alternative embodiments may include an antenna element with end portions spaced apart greater than or less than 2.5 millimeters. For example, some embodiments include an antenna element with end portions spaced apart a distance of between about 2 millimeters to about 5 millimeters. The spaced-apart end portions may define an open slot therebetween that is operable to provide a gap feed for use with a balanced transmission line.

The end portions 128 include fastener holes 132 in a pattern corresponding to fastener holes 136 of the PCB balun 112. Accordingly, mechanical fasteners (e.g., screws, etc.) may be inserted through the fastener holes 132, 136 after they are aligned, for attaching the PCB balun 112 to the tapered loop antenna element 104. Alternative embodiments may have differently configured fastener holes (e.g., more or less, different shapes, different sizes, different locations, etc.). Still other embodiments may include other attachment methods (e.g., soldering, etc.).

As shown in FIGS. 4 and 7-10, the illustrated tapered loop antenna element 104 is substantially planar with a generally constant or uniform thickness. In one exemplary embodiment, the tapered loop antenna element 104 has a thickness of about 3 millimeters. Other embodiments may include a thicker or thinner antenna element. For example, some embodiments may include an antenna element with a thickness of about 35 micrometers (e.g., 1 oz. copper, etc.), where the antenna element is mounted, supported, or installed on a printed circuit board. Further embodiments may include a free-standing, self-supporting antenna element made from aluminum, anodized aluminum, copper, etc. having a thickness between about 0.5 millimeters to about 5 millimeters, etc. In another exemplary embodiment, the antenna element comprises a relatively thin aluminum foil that is encased in a supporting plastic enclosure, which has been used to reduce material costs associated with the aluminum.

Alternative embodiments may include an antenna element that is configured differently than the tapered loop antenna element 104 shown in the figures. For example, other embodiments may include a non-tapered loop antenna element having a centered (not offset) opening. Additional embodiments may include a loop antenna element that defines a full generally circular loop or hoop without spaced-apart free end portions 128. Further embodiments may include an antenna element having an outer periphery/perimeter portion, inner periphery/perimeter portion, and/or opening sized or shaped differently, such as with a non-circular shape (e.g., ovular, triangular, rectangular, etc.). The antenna element 104 (or any portion thereof) may also be provided in various configurations (e.g., shapes, sizes, etc.) depending at least in part on the intended end-use and signals to be received by the antenna assembly.

The antenna element 104 may be made from a wide range of materials, which are preferably good conductors (e.g., metals, silver, gold, aluminum, copper, etc.). By way of example only, the tapered loop antenna element 104 may be formed from a metallic electrical conductor, such as aluminum (e.g., anodized aluminum, etc.), copper, stainless steel, other metals, other alloys, etc. In another embodiment, the tapered loop antenna element 104 may be stamped from sheet metal, or created by selective etching of a copper layer on a printed circuit board substrate.

Figure 4:
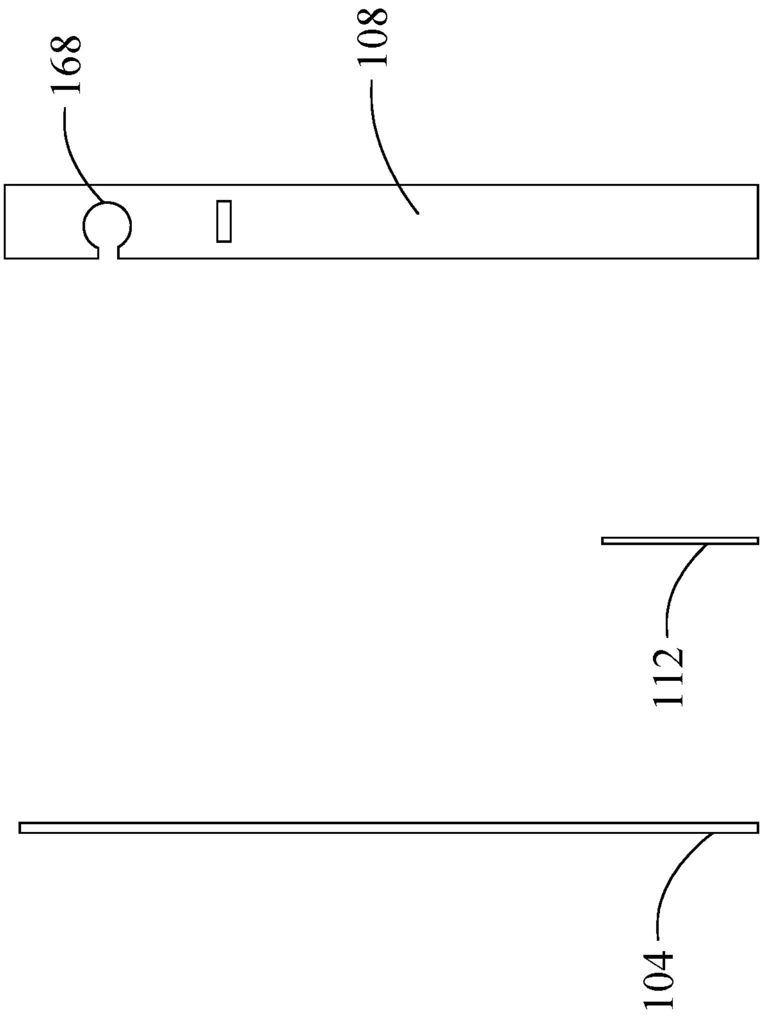
FIG. 4 is a side elevation view of the components shown in FIG. 3.

FIGS. 1, 3, and 4 illustrate the exemplary reflector 108 that may be used with the antenna assembly 100. As shown in FIG. 3, the reflector 108 includes a generally flat or planar surface 160. The reflector 108 also includes baffle, lip, or sidewall portions 164 extending outwardly relative to the surface 160. The reflector 108 may be generally operable for reflecting electromagnetic waves generally towards the tapered loop antenna element 104.

In regard to the size of the reflector and the spacing to the antenna element, the inventors hereof note the following. The size of the reflector and the spacing to the antenna element strongly impact performance. Placing the antenna element too close to the reflector provides an antenna with good gain, but narrows impedance bandwidth and poor VSWR (voltage standing wave ratio). Despite the reduced size, such designs are not suitable for the intended broadband application. If the antenna element is placed too far away from the reflector, the gain is reduced due to improper phasing. When the antenna element size and proportions, reflector size, baffle size, and spacing between antenna element and reflector are properly chosen, there is an optimum configuration that takes advantage of the near zone coupling with the electrically small reflector element to produce enhanced impedance bandwidth, while mitigating the effects of phase cancellation. The net result is an exemplary balance between impedance bandwidth, directivity or gain, radiation efficiency, and physical size.

In this illustrated embodiment, the reflector 108 is generally square with four perimeter sidewall portions 164. Alternative embodiments may include a reflector with a different configuration (e.g., differently shaped, sized, less sidewall portions, etc.). The sidewalls may even be reversed so as to point opposite the antenna element. The contribution of the sidewalls is to slightly increase the effective electrical size of the reflector and improve impedance bandwidth.

Dimensionally, the reflector 108 of one exemplary embodiment has a generally square surface 160 with a length and width of about 228 millimeters. Continuing with this example, the reflector 108 may also have perimeter sidewall portions 164 each with a height of about 25.4 millimeters relative to the surface 160. The dimensions provided in this paragraph (as are all dimensions set forth herein) are mere examples provided for purposes of illustration only, as any of the disclosed antenna components herein may be configured with different dimensions depending, for example, on the particular application and/or signals to be received or transmitted by the antenna assembly. For example, another embodiment may include a reflector 108 having a baffle, lip, or perimeter sidewall portions 164 having a height of about ten millimeters. Another embodiment may have the reflector 108 having a baffle, lip in the opposite direction to the antenna element. In such embodiment, it is possible to also add a top to the open box, which may serve as a shielding enclosure for a receiver board or other electronics.

With further reference to FIG. 3, cutouts, openings, or notches 168 may be provided in the reflector's perimeter sidewall portions 164 to facilitate mounting of the reflector 108 within the housing 116 and/or attachment of the housing end pieces 120. In an exemplary embodiment, the reflector 108 may be slidably positioned within the housing 116 (FIG. 1). The fastener holes 172 of the housing end pieces 120 may be aligned with the reflector's openings 168, such that fasteners may be inserted through the aligned openings 168, 172. Alternative embodiments may have reflectors without such openings, cutouts, or notches.

FIGS. 1, 3, and 4 illustrate an exemplary balun 112 that may be used with the antenna assembly 100 for converting a balanced line into an unbalanced line. In the illustrated embodiment, the antenna assembly 100 includes a printed circuit board having the balun 112. The PCB having the balun 112 may be coupled to the tapered loop antenna element 104 via fasteners and fastener holes 132 and 136 (FIG. 3). Alternative embodiments may include different means for connecting the balun 112 to the tapered loop antenna elements and/or different types of transformers besides the printed circuit board balun 112.

As shown in FIG. 1, the housing 116 includes end pieces 120 and a middle portion 180. In this particular example, the end pieces 120 are removably attached to middle portion 180 by way of mechanical fasteners, fastener holes 172, 174, and threaded sockets 176. Alternative embodiments may include a housing with an integrally-formed, fixed end piece. Other embodiments may include a housing with one or more removable end pieces that are snap-fit, friction fit, or interference fit with the housing middle portion without requiring mechanical fasteners.

Figure 2:
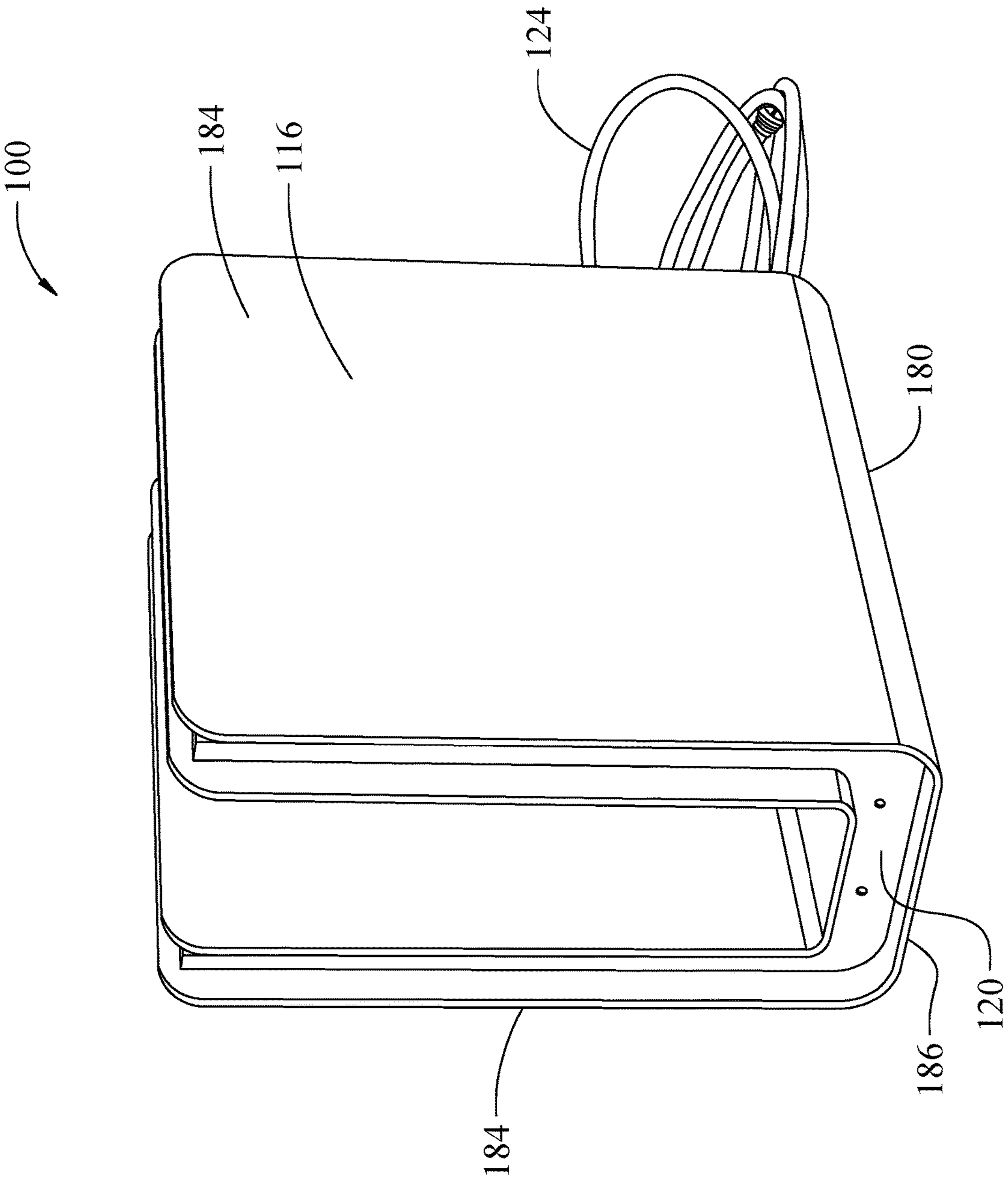
FIG. 2 is a perspective view illustrating the antenna assembly shown in FIG. 1 after the components have been assembled and enclosed within the housing.

As shown in FIG. 2, the housing 116 is generally U-shaped with two spaced-apart upstanding portions or members 184 connected by a generally horizontal member or portion 186. The members 184, 186 cooperatively define a generally U-shaped profile for the housing 116 in this embodiment.

As shown by FIG. 1, the tapered loop antenna element 104 may be positioned in a different upstanding member 184 than the upstanding member 184 in which the reflector 108 is positioned. In one particular example, the housing 116 is configured (e.g., shaped, sized, etc.) such that the tapered loop antenna element 104 is spaced apart from the reflector 108 by about 114.4 millimeters when the tapered loop antenna element 104 and reflector 108 are positioned into the respective different sides of the housing 116. In addition, the housing 116 may be configured such that the housing's side portions 184 are generally square with a length and a width of about 25.4 centimeters. Accordingly, the antenna assembly 100 may thus be provided with a relatively small overall footprint. These shapes and dimensions are provided for purposes of illustration only, as the specific configuration (e.g., shape, size, etc.) of the housing may be changed depending, for example, on the particular application.

The housing 116 may be formed from various materials. In some embodiments, the housing 116 is formed from plastic. In those embodiments in which the antenna assembly is intended for use as an outdoor antenna, the housing may be formed from a weather resistant material (e.g., waterproof and/or ultra-violet resistant material, etc.). In addition, the housing 116 (or bottom portion thereof) may also be formed from a material so as to provide the bottom surface of the housing 116 with a relatively high coefficient of friction. This, in turn, would help the antenna assembly 100 resist sliding relative to the surface (e.g., top surface of television as shown in FIG. 11, etc.) supporting the assembly 100.

In some embodiments, the antenna assembly may also include a digital tuner/converter (ATSC receiver) built into or within the housing. In these exemplary embodiments, the digital tuner/converter may be operable for converting digital signals received by the antenna assembly to analog signals. In one exemplary example, a reflector with a reversed baffle and cover may serve as a shielded enclosure for the ATSC receiver. The shielded box reduces the effects of radiated or received interference upon the tuner circuitry. Placing the tuner in this enclosure conserves space and eliminates (or reduces) the potential for coupling between the antenna element and the tuner, which may otherwise negatively impact antenna impedance bandwidth and directivity.

In various embodiments, the antenna assembly 100 is tuned (and optimized in some embodiments) to receive signals having a frequency associated with high definition television (HDTV) within a frequency range of about 470 megahertz and about 690 megahertz. In such embodiments, narrowly tuning the antenna assembly 100 for receiving these HDTV signals allows the antenna element 104 to be smaller and yet still function adequately. With its smaller discrete physical size, the overall size of the antenna assembly 100 may be reduced so as to provide a reduced footprint for the antenna assembly 100, which may, for example, be advantageous when the antenna assembly 100 is used indoors and placed on top of a television (e.g., FIG. 11, etc.).

Exemplary operational parameters of the antenna assembly 100 will now be provided for purposes of illustration only. These operational parameters may be changed for other embodiments depending, for example, on the particular application and signals to be received by the antenna assembly.

Figure 12:
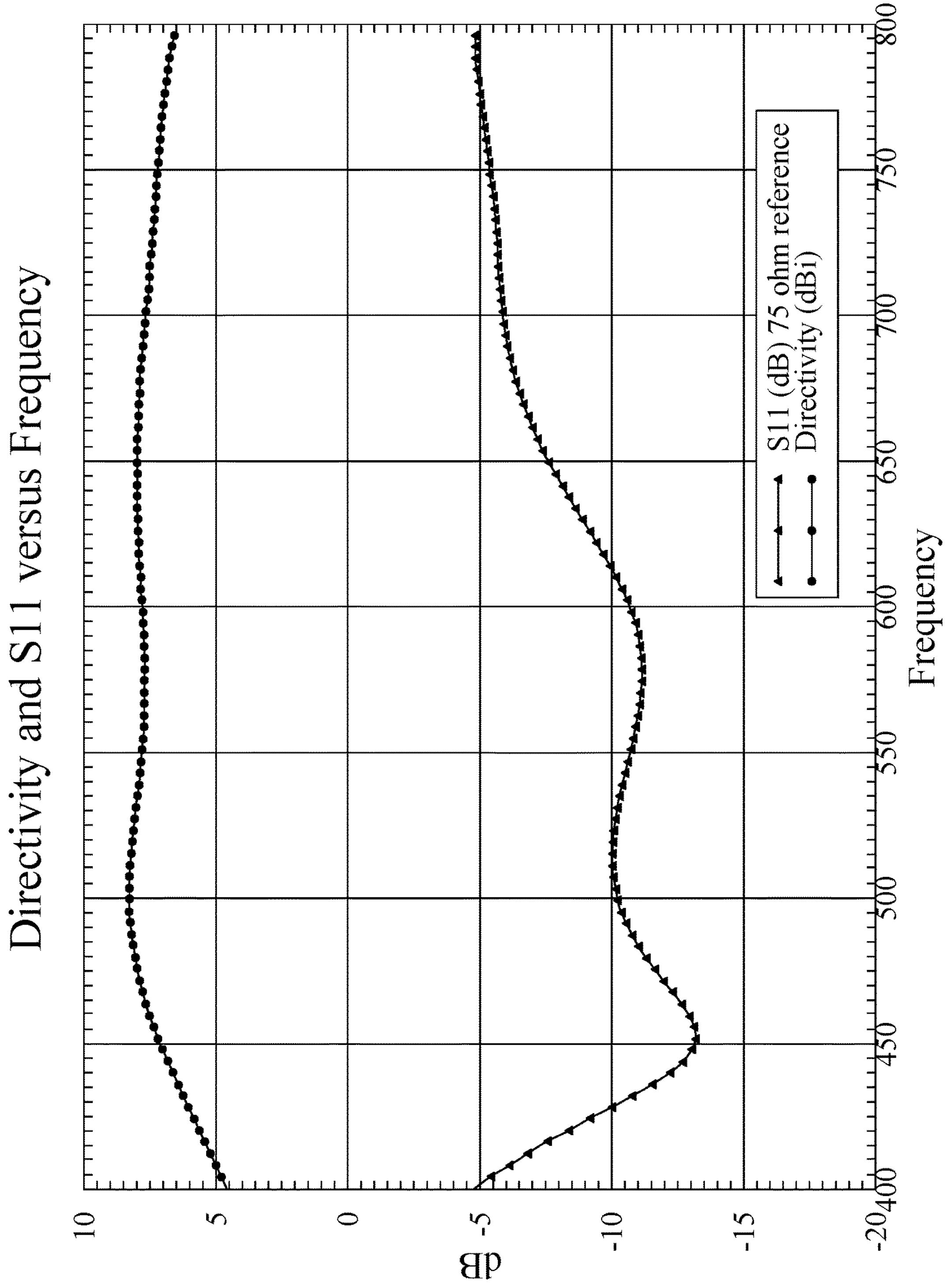
FIG. 12 is an exemplary line graph showing computer-simulated gain/directivity and S11 versus frequency (in megahertz) for an exemplary embodiment of the antenna assembly with seventy-five ohm unbalanced coaxial feed.

In some embodiments, the antenna assembly 100 may be configured so as to have operational parameters substantially as shown in FIG. 12, which illustrates computer-simulated gain/directivity and S11 versus frequency (in megahertz) for an exemplary embodiment of the antenna assembly 100 with seventy-five ohm unbalanced coaxial feed. In other embodiments, a 300 ohm balanced twin lead may be used.

FIG. 12 generally shows that the antenna assembly 100 has a relatively flat gain curve from about 470 MHz to about 698 MHz. In addition, FIG. 12 also shows that the antenna assembly 100 has a maximum gain of about 8 dBi (decibels referenced to isotropic gain) and an output with an impedance of about 75 Ohms.

In addition, FIG. 12 also shows that the S11 is below −6 dB across the frequency band from about 470 MHz to about 698 MHz. Values of S11 below this value ensure that the antenna is well matched and operates with high efficiency.

In addition, an antenna assembly may also be configured with fairly forgiving aiming. In such exemplary embodiments, the antenna assembly would thus not have to be re-aimed or redirected each time the television channel was changed.

Figure 13:
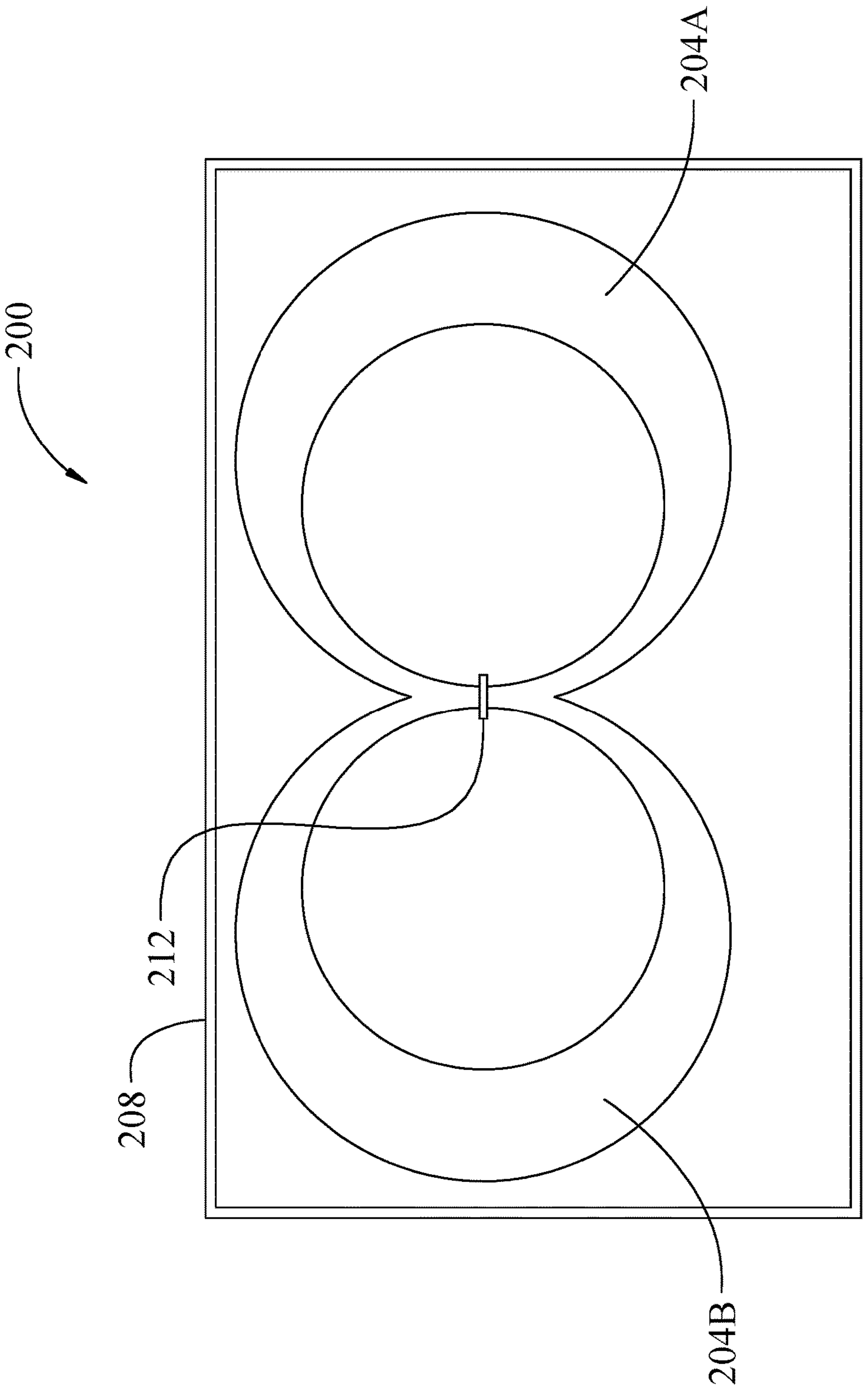
FIG. 13 is a view of another exemplary embodiment of an antenna assembly having two tapered loop antenna elements, a reflector, and a PCB balun.

FIG. 13 illustrates another embodiment of an antenna assembly 200 embodying one or more aspects of the present disclosure. In this illustrated embodiment, the antenna assembly 200 includes two generally side-by-side tapered loop antenna elements 204A and 204B in a generally figure eight configuration (as shown in FIG. 13). In this exemplary embodiment, the two loops 204A and 204B are arranged one opposite to the other such that a gap is maintained between each pair of opposite spaced apart end portions of each loop 204A, 204B. The gap or open slot may be used to provide a gap feed for use with a balanced transmission line. In operation, this gap feed configuration allows the vertical going electrical current components to effectively cancel each other out such that antenna assembly 200 has relatively pure H polarization at the passband frequencies and exhibits very low levels of cross polarized signals.

Figure 20:
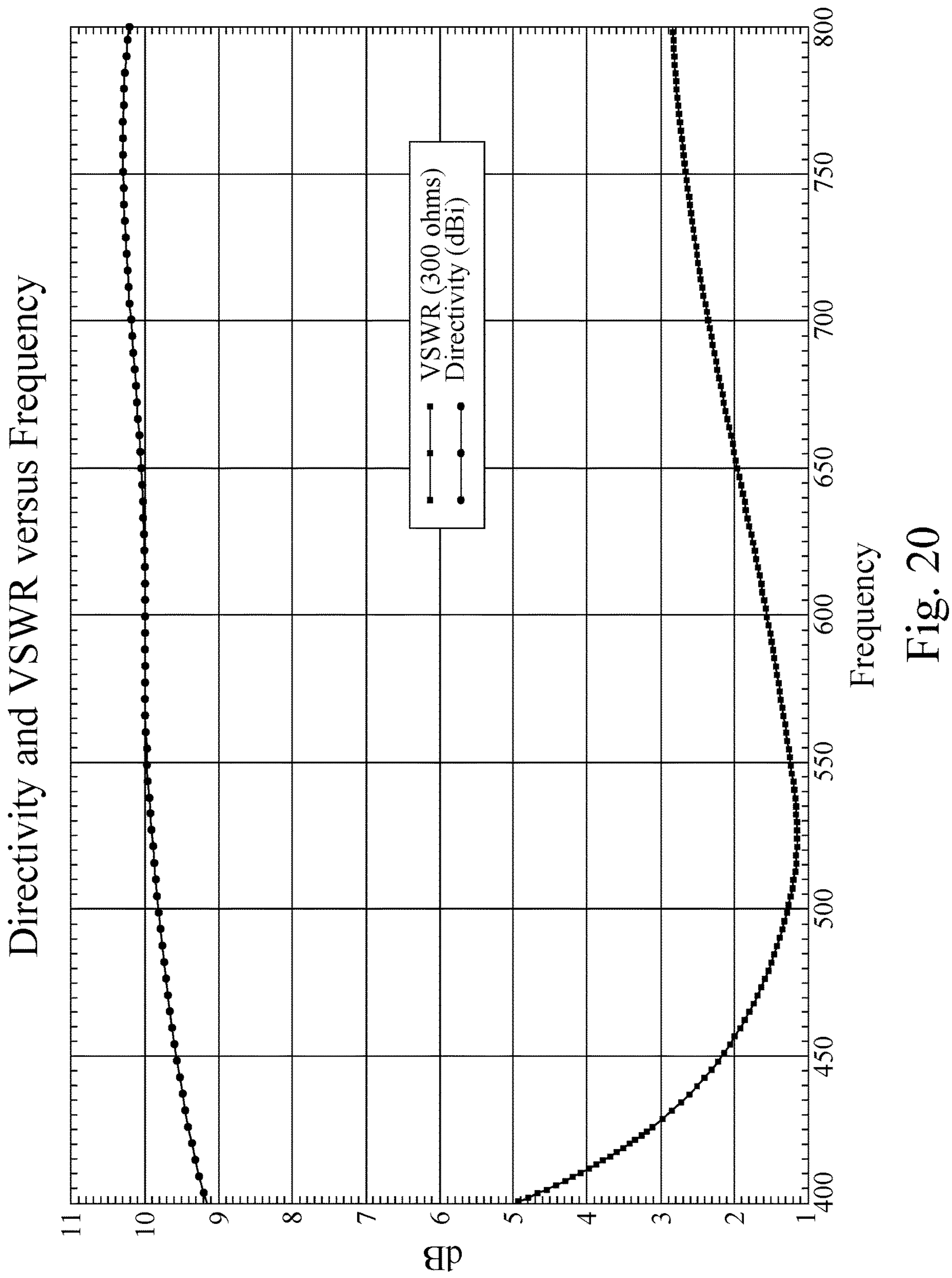
FIG. 20 is an exemplary line graph showing computer-simulated directivity and S11 versus frequency (in megahertz) for the antenna assembly shown in FIG. 13 according to an exemplary embodiment.

The antenna assembly 200 also includes a reflector 208 and a printed circuit board balun 212. The antenna assembly 200 may be provided with a housing similar to or different than housing 116. Other than having two tapered loop antenna elements 204A, 204B (and improved antenna range that may be achieved thereby), the antenna assembly 200 may be operable and configured similar to the antenna assembly 100 in at least some embodiments thereof. FIG. 20 is an exemplary line graph showing computer-simulated directivity and S11 versus frequency (in megahertz) for the antenna assembly 200 according to an exemplary embodiment.

Figure 14:
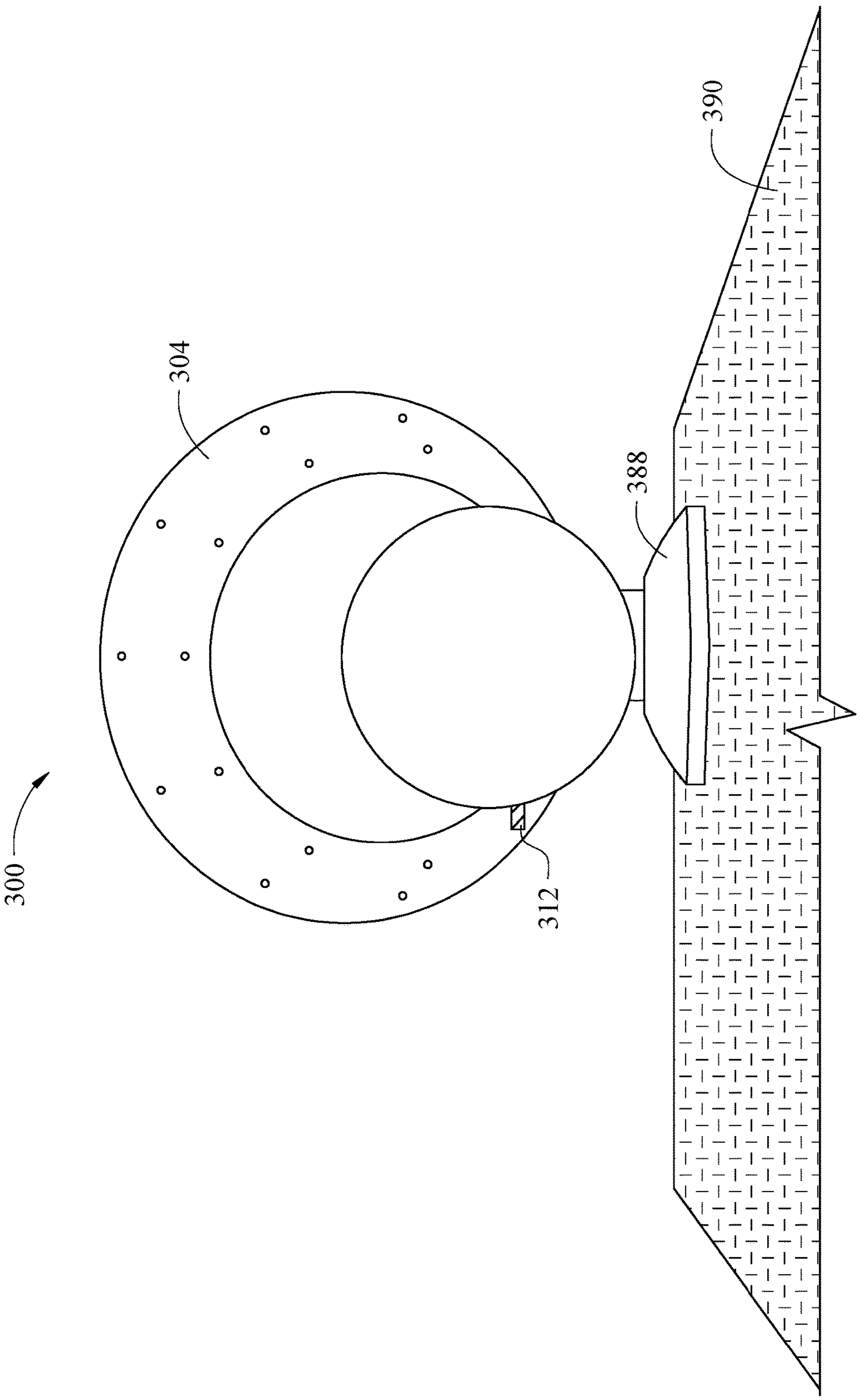
FIG. 14 is a view of another exemplary embodiment of an antenna assembly having a tapered loop antenna element and a support, and also showing the antenna assembly supported on top of a desk or tabletop.
Figure 15:
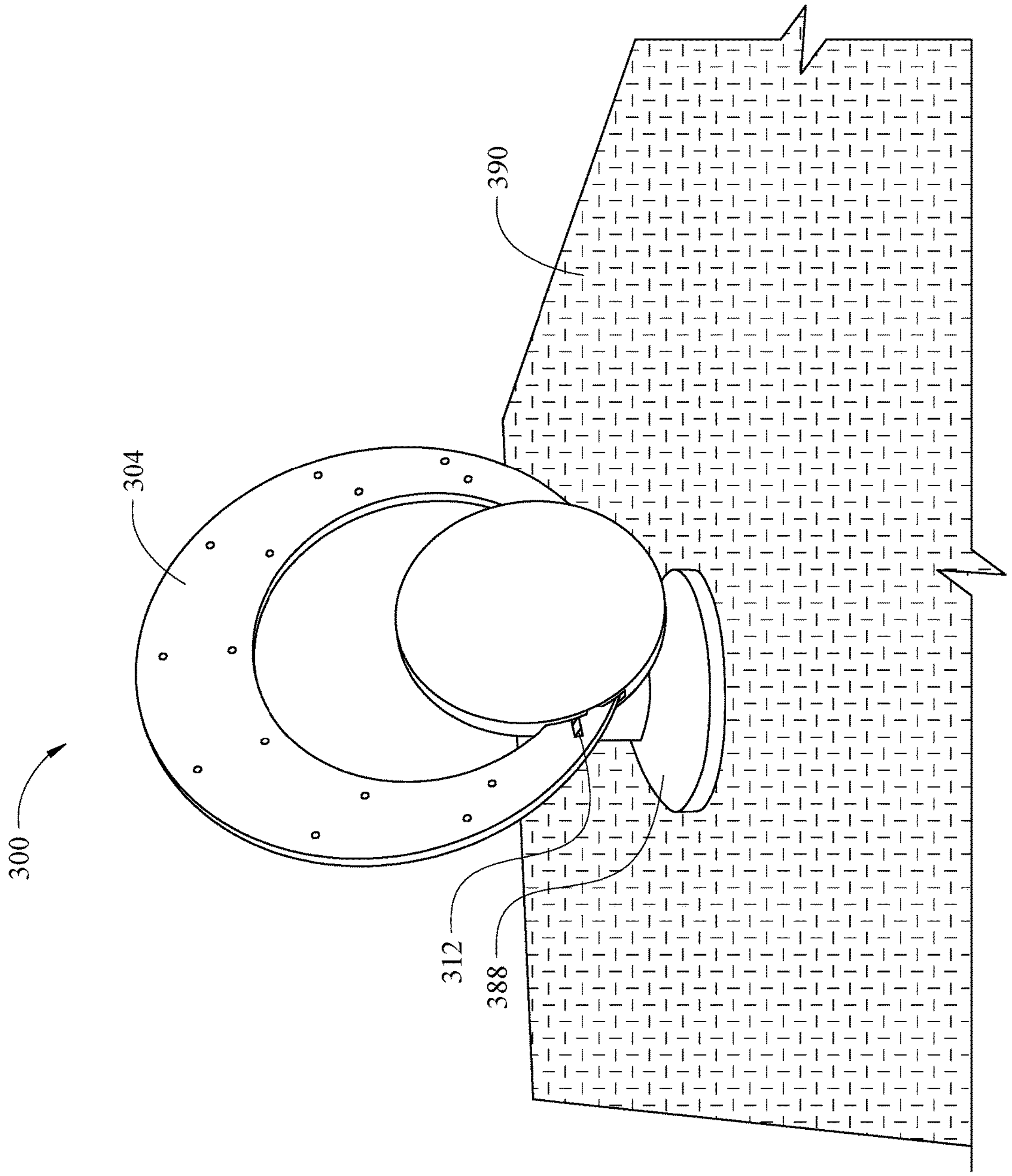
FIG. 15 is a perspective view of the antenna assembly shown in FIG. 14.

FIGS. 14 through 19 and 26 through 42 show additional exemplary embodiments of antenna assemblies embodying one or more aspects of the present disclosure. For example, FIGS. 14 and 15 show an antenna assembly 300 having a tapered loop antenna element 304 and a support 388. In this exemplary embodiment, the antenna assembly 300 is supported on a horizontal surface 390, such as the top surface of a desk, tabletop, television, etc. The antenna assembly 300 may also include a printed circuit board balun 312. In some embodiments, an antenna assembly may include a tapered loop antenna element (e.g., 304, 404, 504, etc.) with openings (e.g., holes, indents, recesses, voids, dimples, etc.) along the antenna element's middle portion and/or first and second curved portions, where the openings may be used, for example, to help align and/or retain the antenna element to a support. For example, a relatively thin metal antenna element with such openings may be supported by a plastic support structure that has protuberances, nubs, or protrusions that align with and are frictionally received within the openings of the antenna element, whereby the frictional engagement or snap fit helps retain the antenna element to the plastic support structure.

Figure 16:
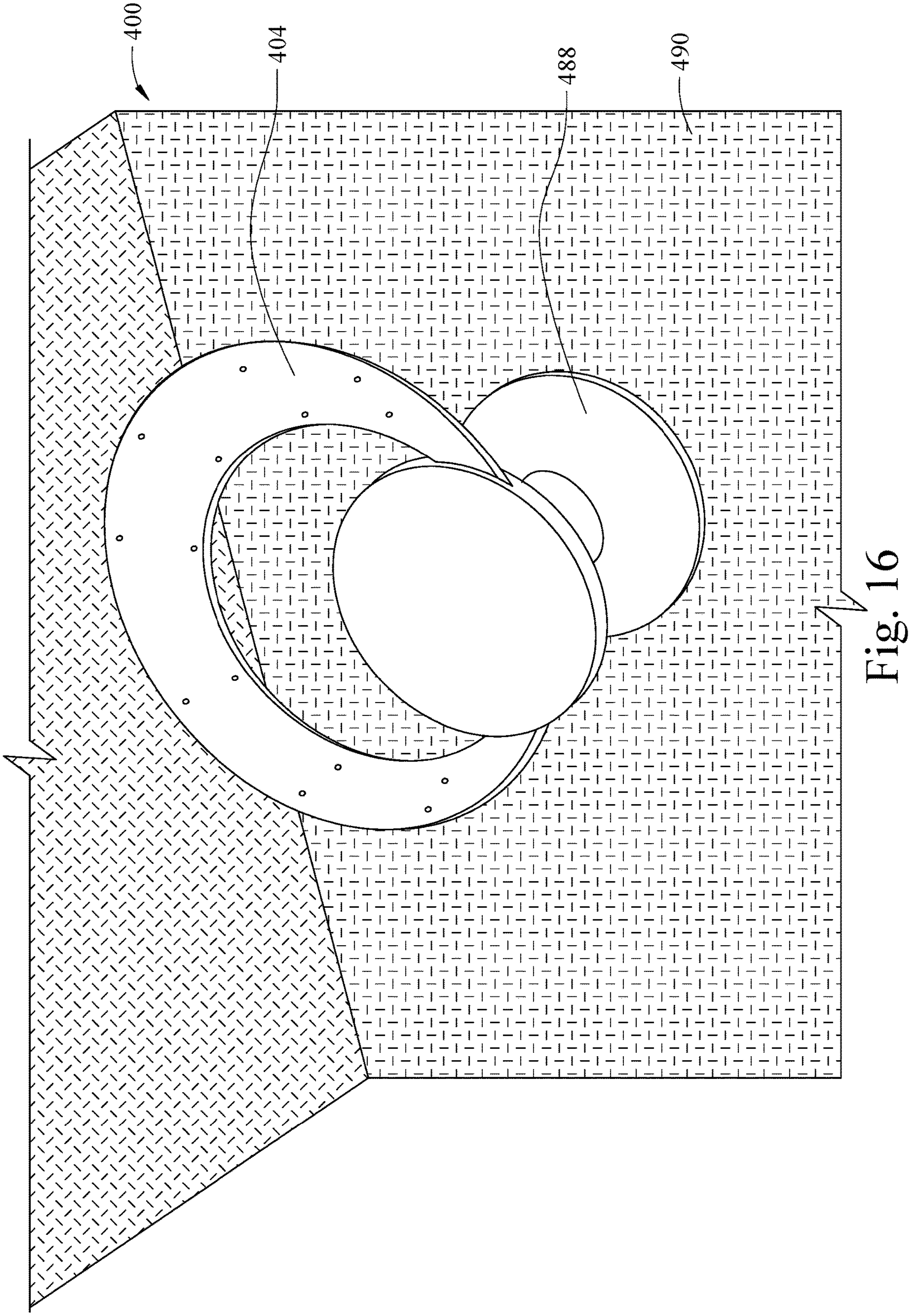
FIG. 16 is a perspective view of another exemplary embodiment of an antenna assembly having a tapered loop antenna element and an indoor wall mount/support, and also showing the antenna assembly mounted to a wall.

As another example, FIG. 16 shows an antenna assembly 400 having a tapered loop antenna element 404 and an indoor wall mount/support 488. In this example, the antenna assembly is mounted to a vertical surface 490, such a wall, etc. The antenna assembly 400 may also include a printed circuit board balun. The balun, however, is not illustrated in FIG. 10 because it is obscured by the support 488.

FIGS. 26 through 42 illustrate another exemplary antenna assembly 800 having a tapered lop antenna element 804 and a rotatably convertible support, mount, or stand 888. In this example, the tapered loop antenna element 804 may be covered by or disposed within a cover material (e.g., plastic, other dielectric material, etc.), which may be the same material from which the support 888 is made.

Figure 26:
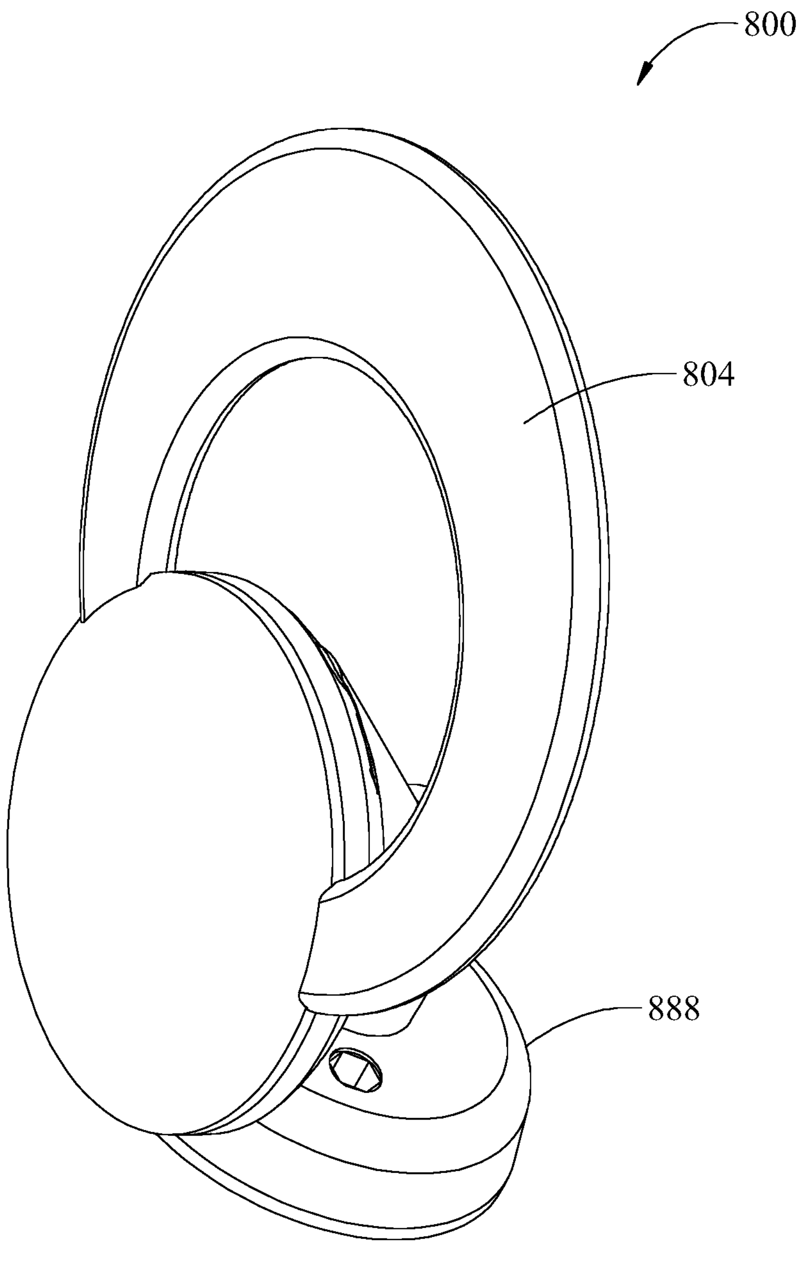
FIG. 26 is a perspective view of another exemplary embodiment of an antenna assembly having a tapered loop antenna element and a support that is rotatably convertible between a first configuration (shown in FIG. 26) for supporting the antenna assembly on a horizontal surface and a second configuration (shown in FIG. 27) for supporting the antenna assembly from a vertical surface.

In this example embodiment of the antenna assembly 800, the rotatably convertible support 888 allows the antenna assembly 800 to be supported on a horizontal surface from a vertical surface depending on whether the support 888 is in a first or second configuration. For example, FIG. 26 illustrates the support or stand 888 in a first configuration in which the support 888 allows the antenna assembly 800 to be supported on a horizontal surface after being placed upon that horizontal surface. The horizontal surface upon which the antenna assembly 800 may be placed may comprise virtually any horizontal surface, such as the top of a desk, tabletop, television, etc. In some embodiments, the antenna assembly 800 may be fixedly attached or fastened to the horizontal surface by using mechanical fasteners (e.g., wood screws, etc.) inserted through fastener holes 899 (FIG. 36) on the bottom of the support 888. But the antenna assembly 800 may be attached to a horizontal surface using other methods, such as double-side adhesive tape, etc. Or the antenna assembly 800 need not be attached to the horizontal surface at all.

Figure 27:
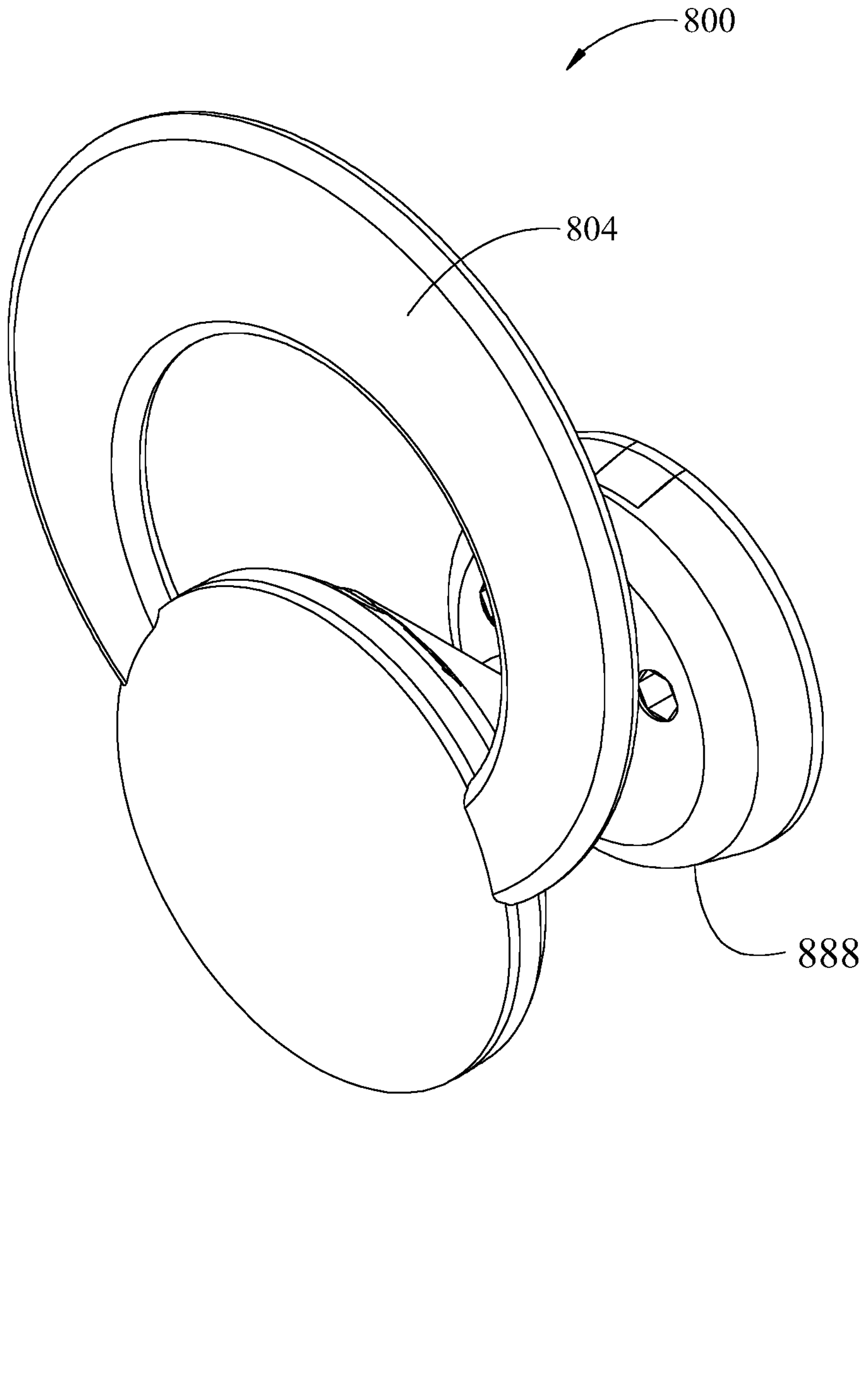
FIG. 27 is a perspective view of the antenna assembly shown in FIG. 26 but after the rotatably convertible support has been rotated to the second configuration for supporting the antenna assembly form a vertical surface.

FIG. 27 illustrates the support 888 in a second configuration that allows the antenna assembly 800 to be mounted to a vertical surface, such as wall, etc. In some embodiments, the antenna assembly 800 may be suspended from a nail or screw on a wall by way of the opening 898 (FIG. 40) on the bottom of the support 888.

Figure 28:
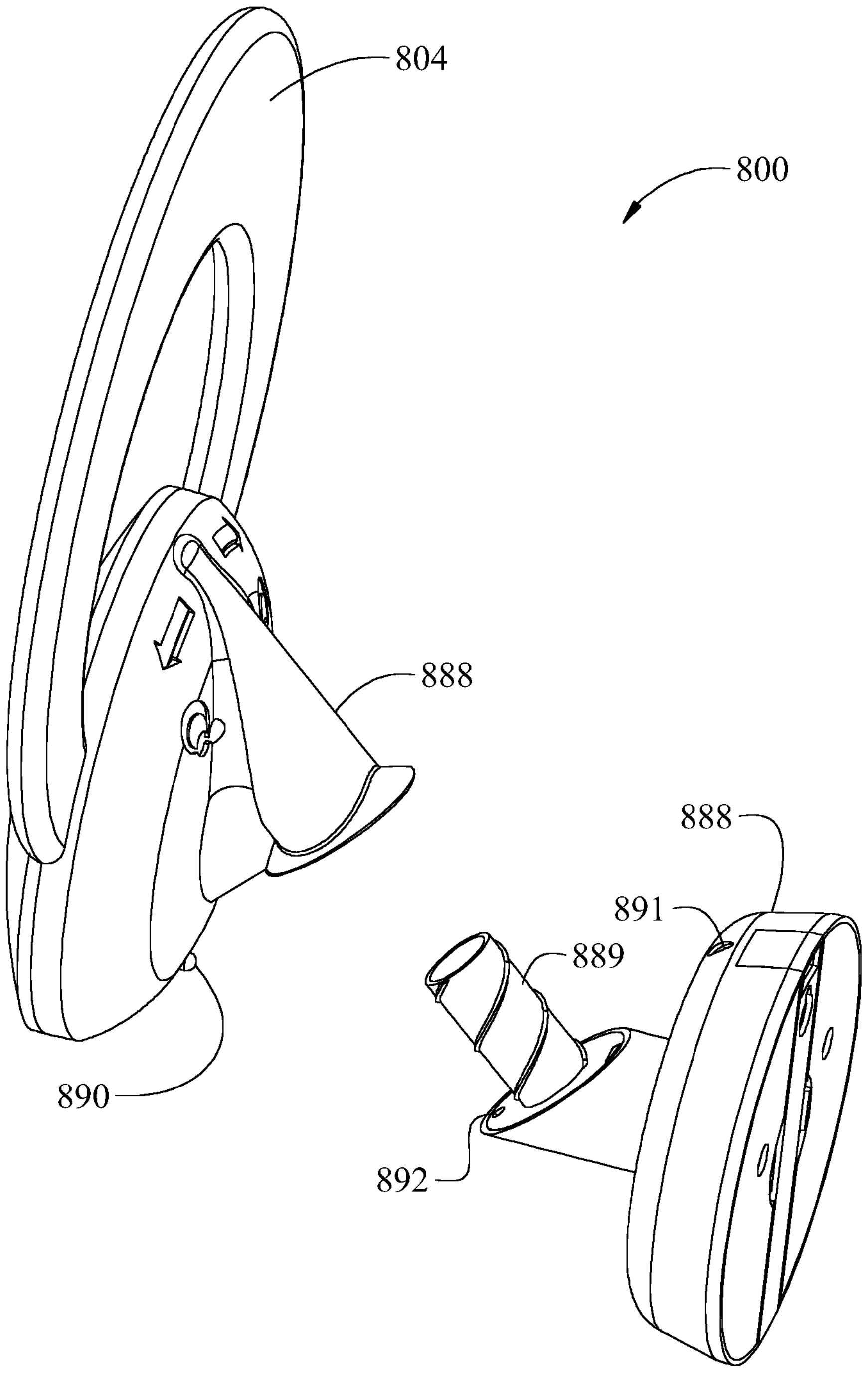
FIG. 28 is an exploded perspective view of the antenna assembly shown in FIGS. 26 and 27 and illustrating the threaded stem portion and stopping members for retaining the rotatably convertible support in the first or second configuration.
Figure 29:
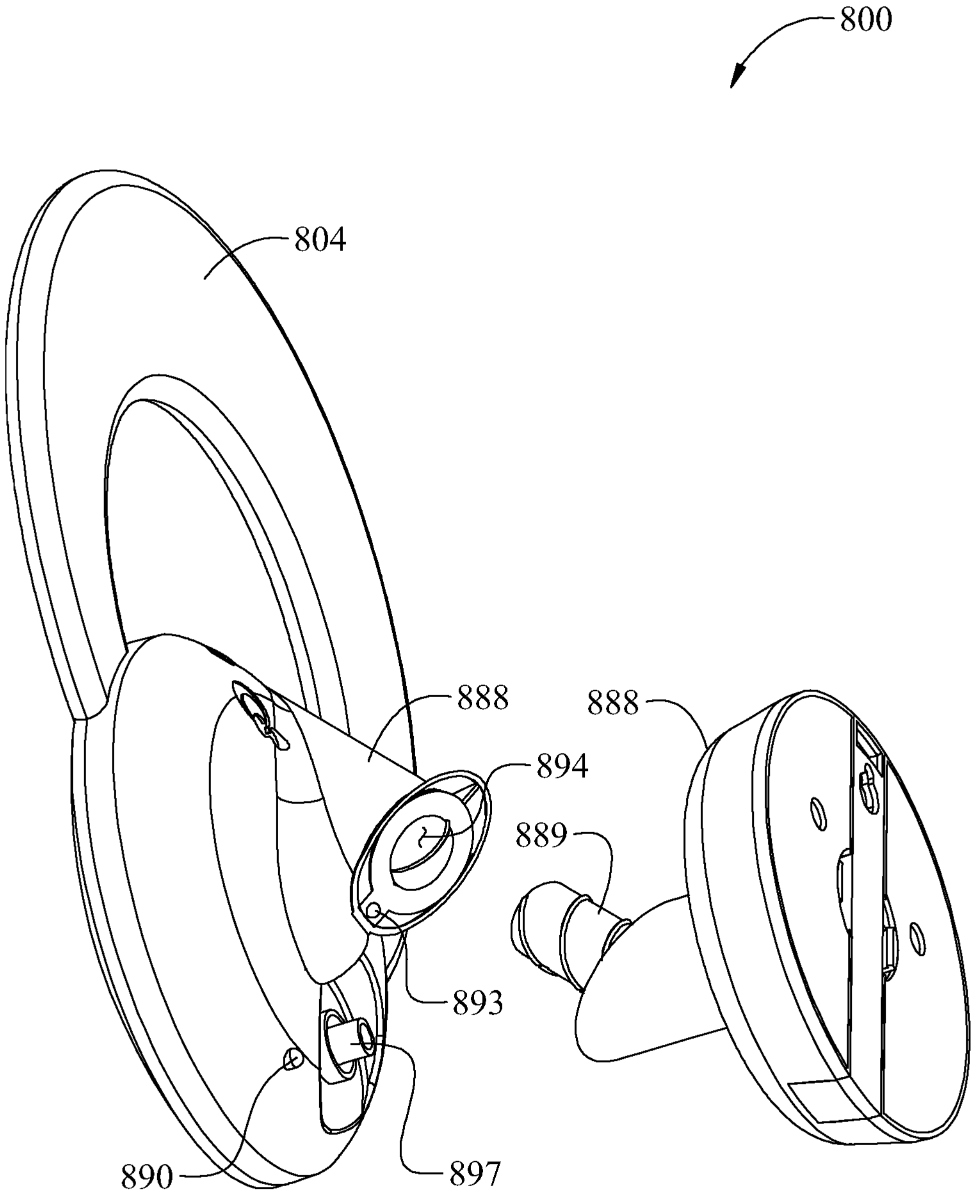
FIG. 29 is another exploded perspective view of the antenna assembly shown in FIGS. 26 and 27.

By way of example, a user may rotate the support 888 to convert the support 888 from the first configuration (FIG. 26) to the second configuration (FIG. 27), or vice versa. As shown in FIGS. 28 and 29, the rotatably convertible support 888 includes a threaded stem portion 889 and a threaded opening 894. In this example, the threaded stem portion 889 extends upwardly from the base of the support 888, and the threaded opening 894 is defined by the upper portion of the support 888. In other embodiments, this may be reversed such that the base includes threaded opening, and the threaded stem portion extends downwardly from the upper portion of the mount.

Figure 30:
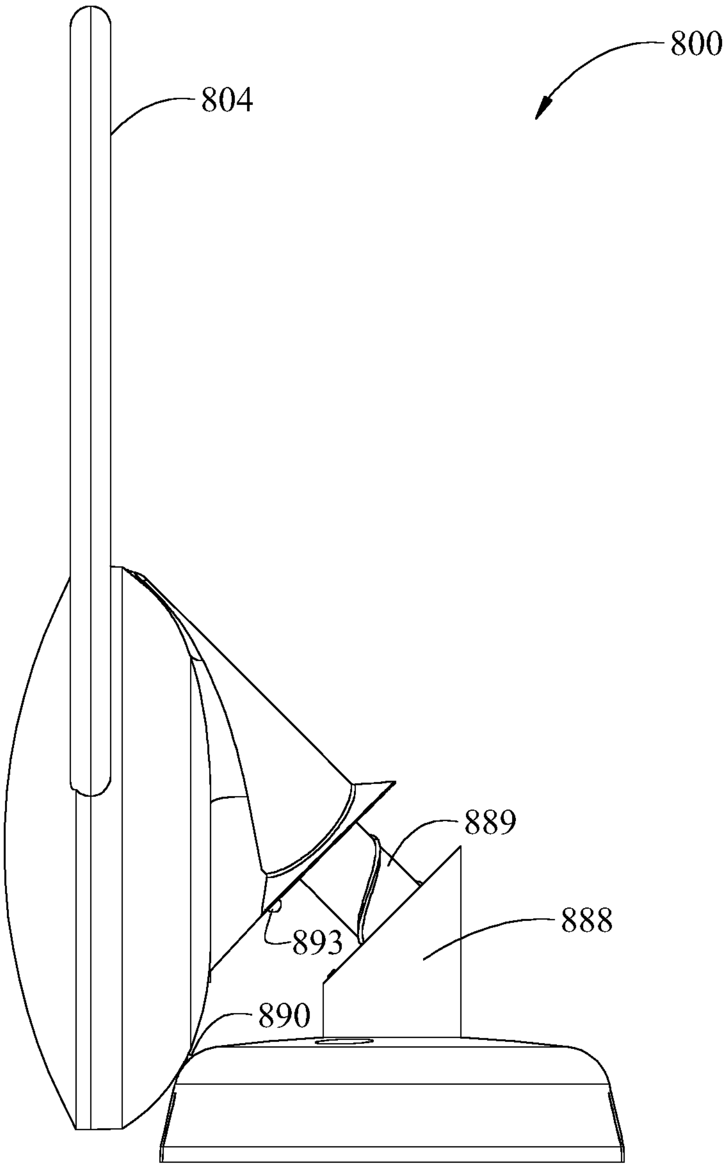
FIG. 30 is a right side view of the antenna assembly shown in FIG. 26 with the rotatably convertible support shown in the first configuration for supporting the antenna assembly on a horizontal surface.
Figure 31:
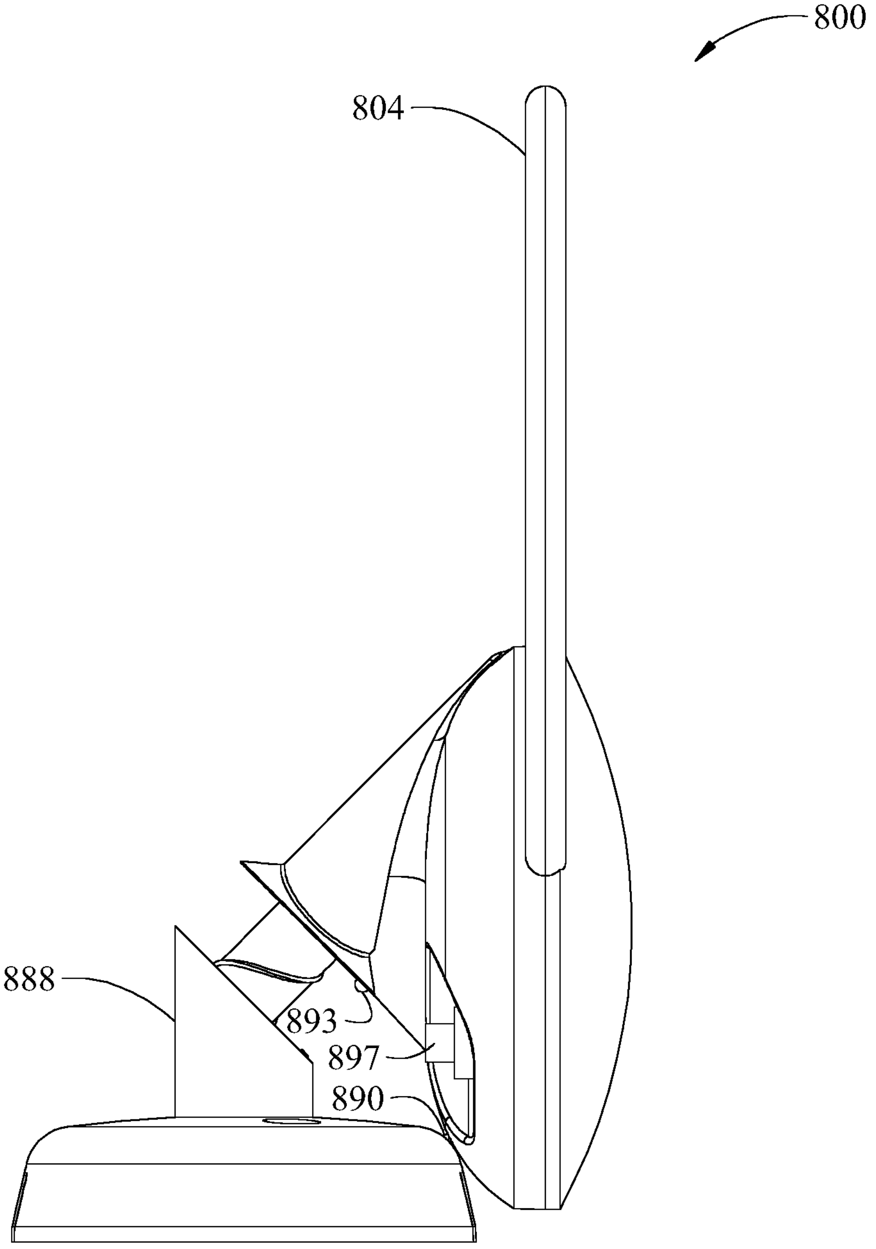
FIG. 31 is a left side view of the antenna assembly shown in FIG. 26.
Figure 32:
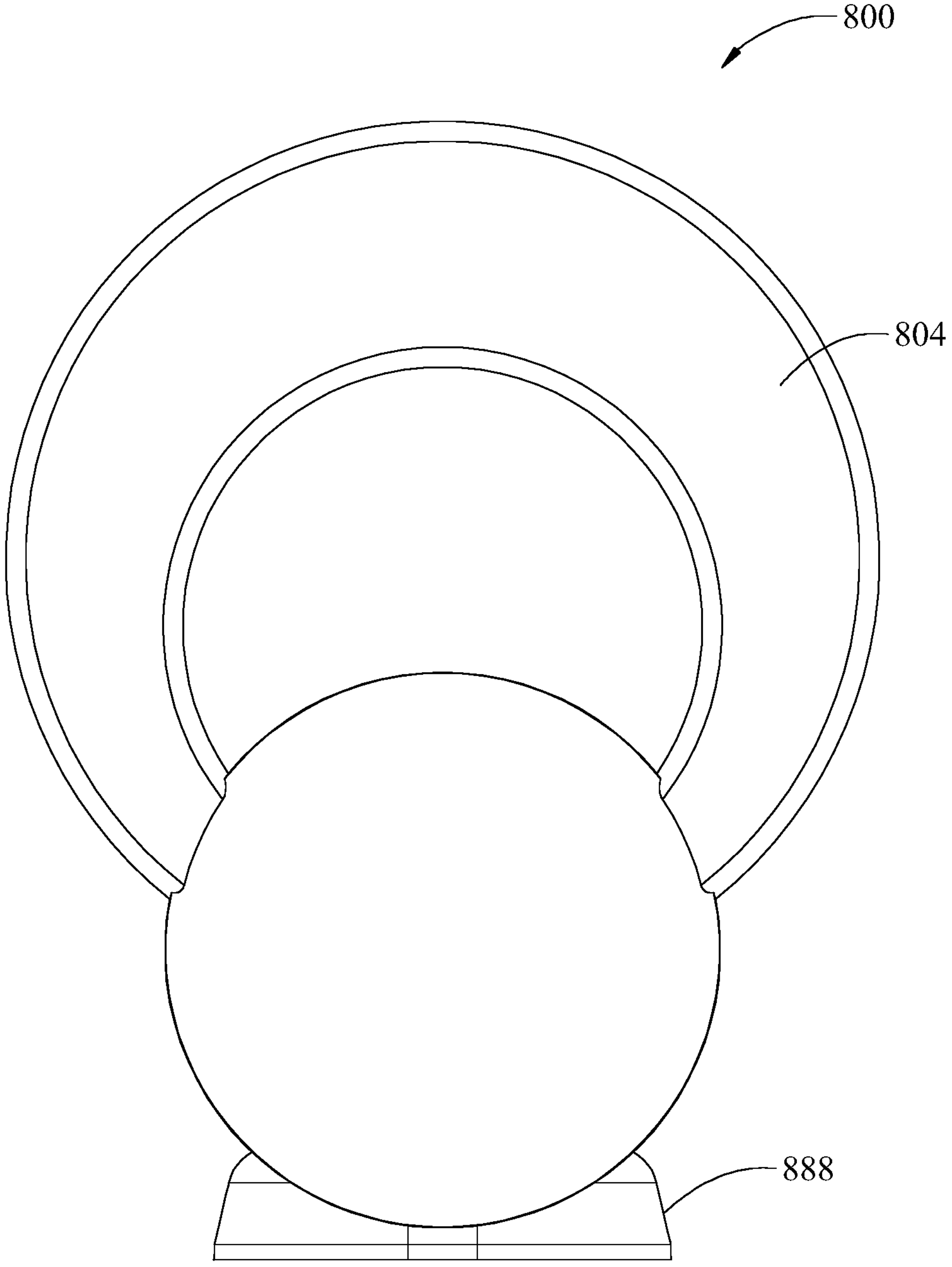
FIG. 32 is a front view of the antenna assembly shown in FIG. 26.
Figure 34:
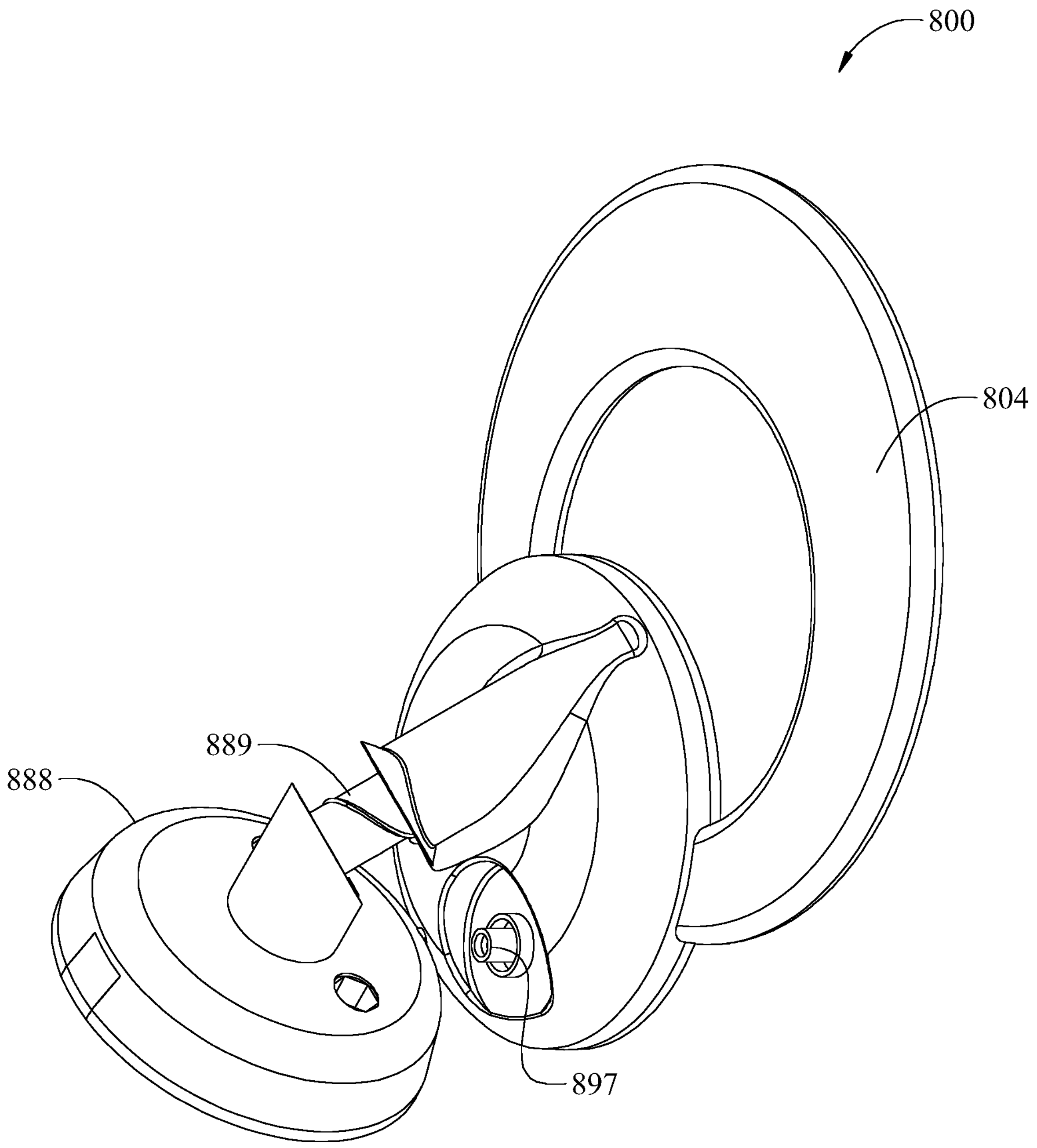
FIG. 34 is an upper back perspective view of the antenna assembly shown in FIG. 26.
Figure 35:
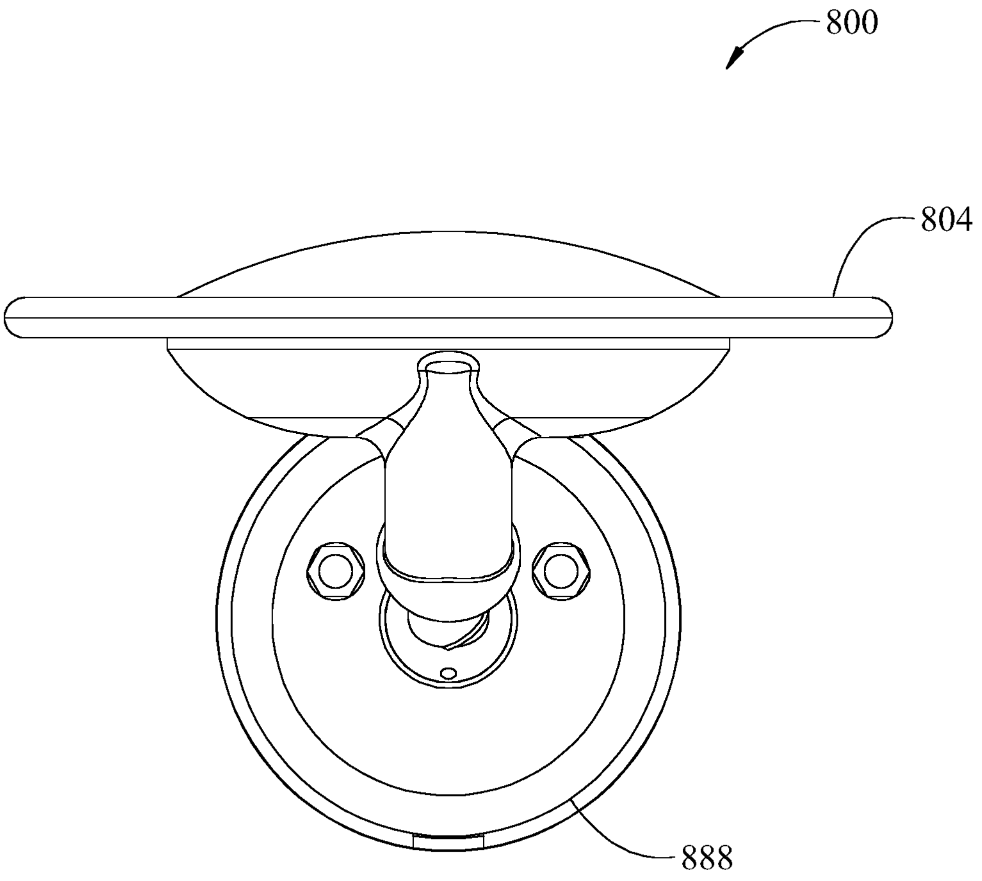
FIG. 35 is a top view of the antenna assembly shown in FIG. 26.
Figure 36:
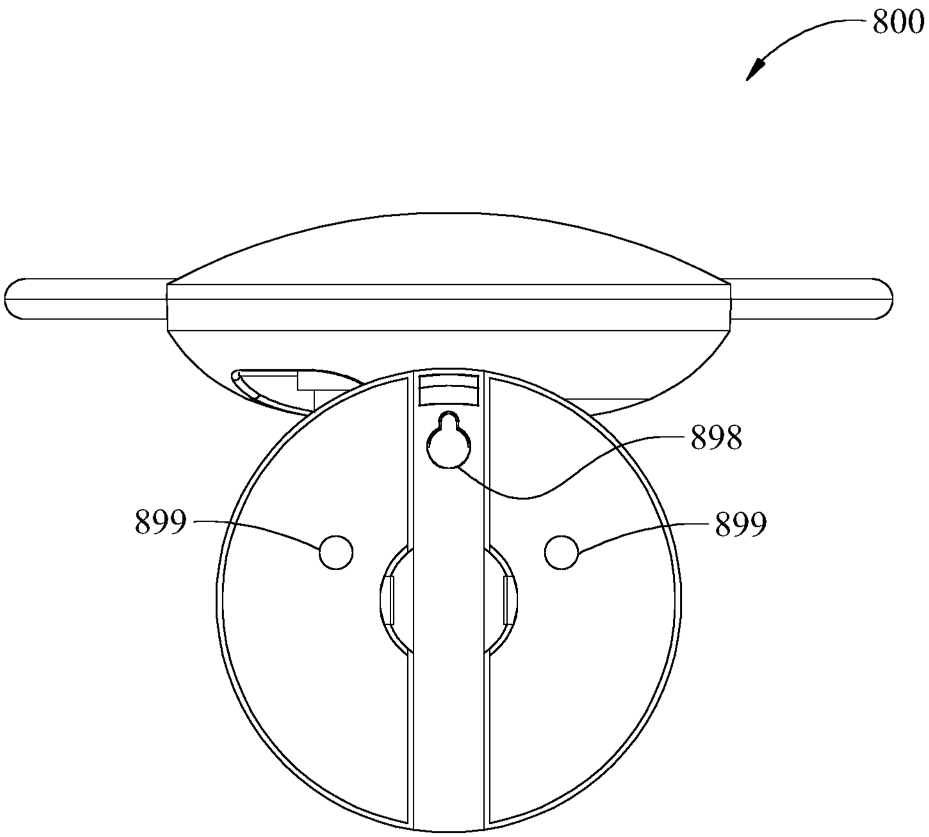
FIG. 36 is a bottom view of the antenna assembly shown in FIG. 26.
Figure 37:
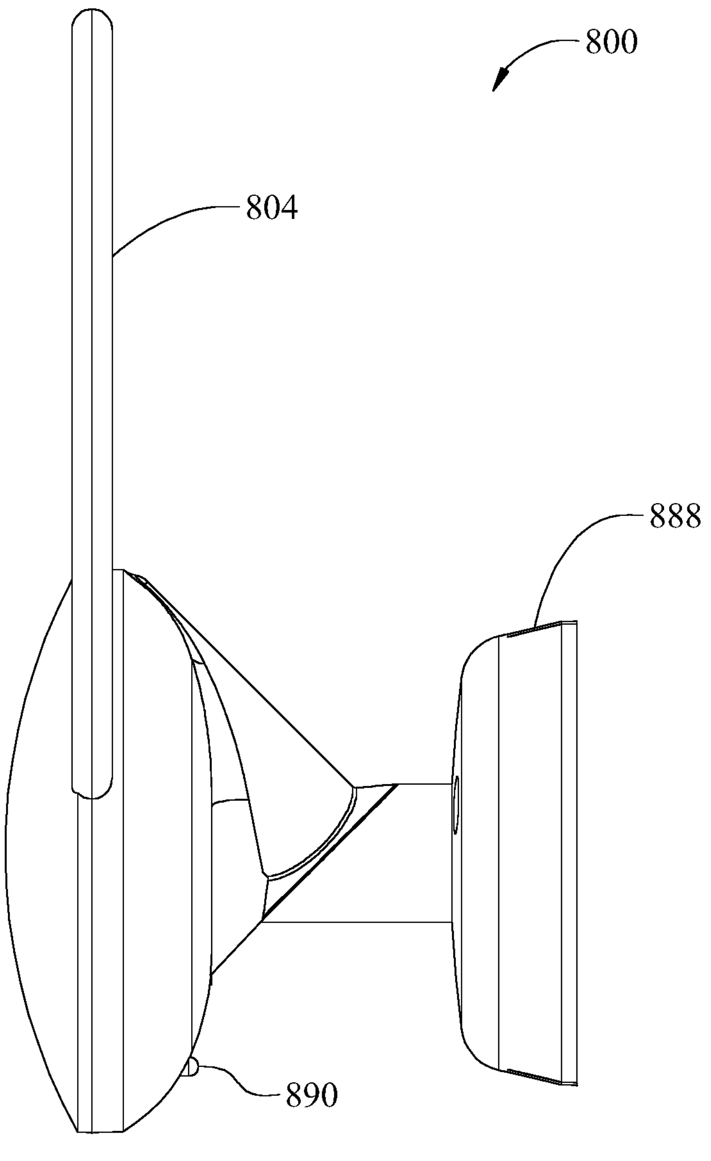
FIG. 37 is a right side view of the antenna assembly shown in FIG. 27 with the rotatably convertible support shown in the second configuration for supporting the antenna assembly from a vertical surface.
Figure 38:
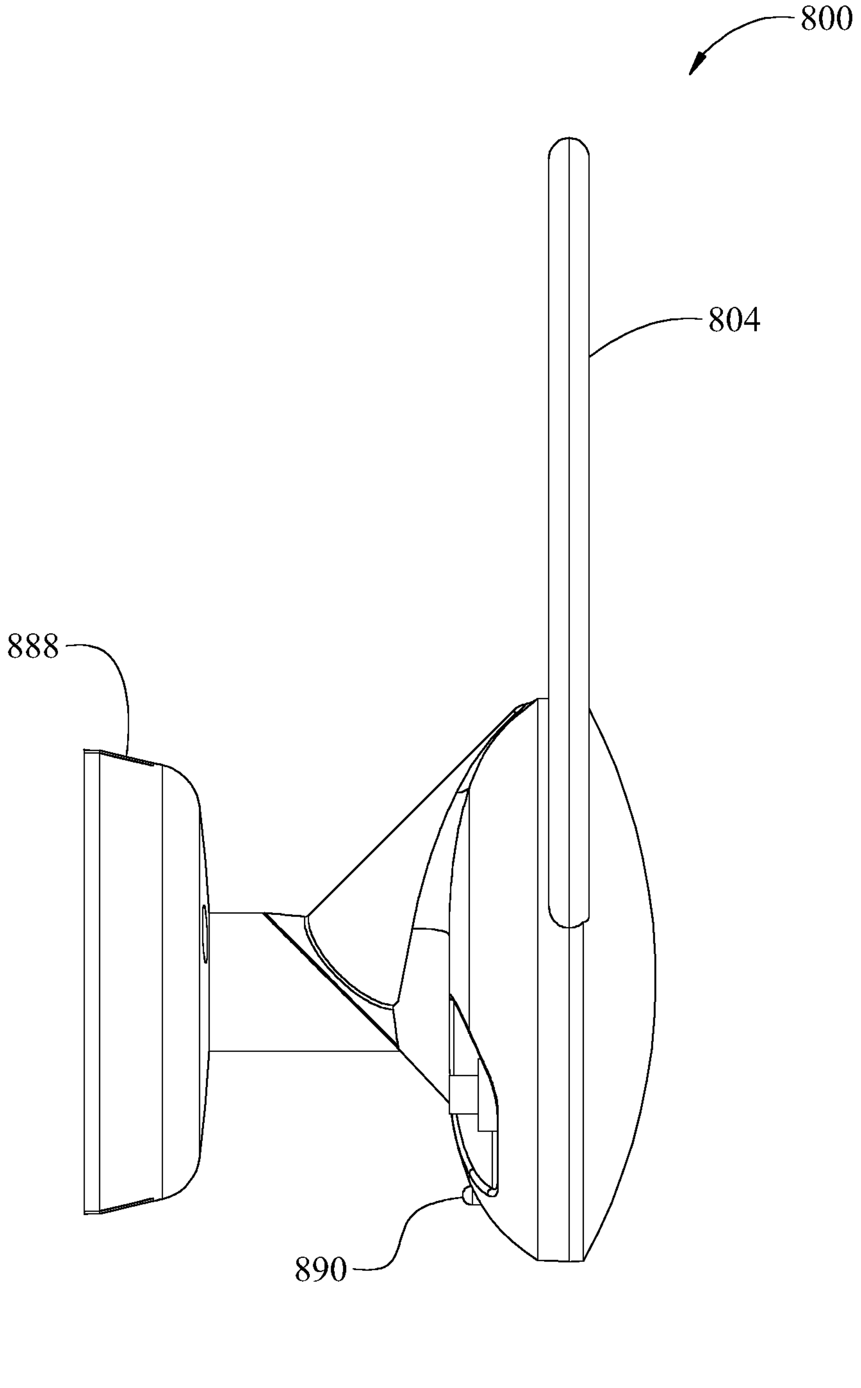
FIG. 38 is a left side view of the antenna assembly shown in FIG. 27.
Figure 39:
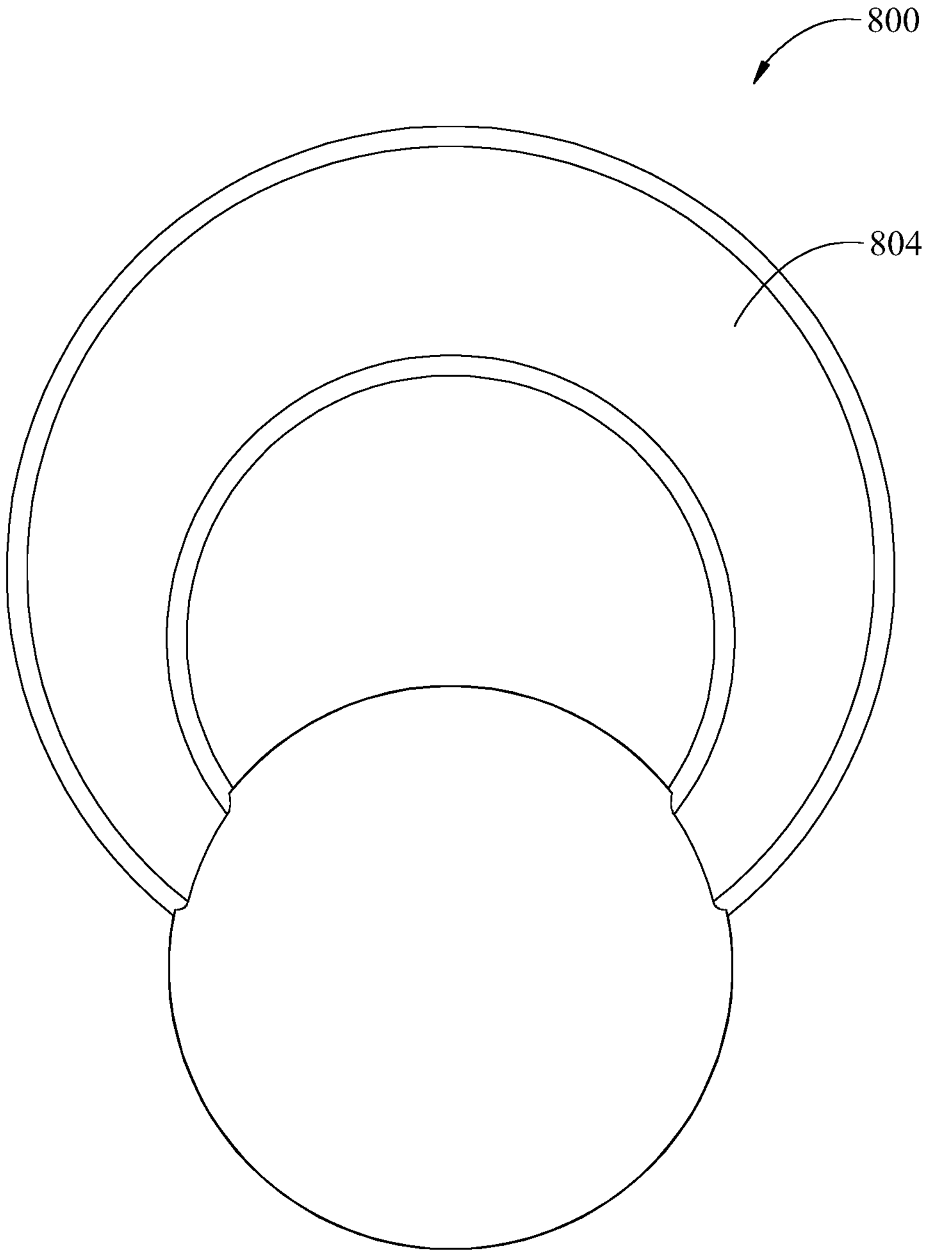
FIG. 39 is a front view of the antenna assembly shown in FIG. 27.
Figure 40:
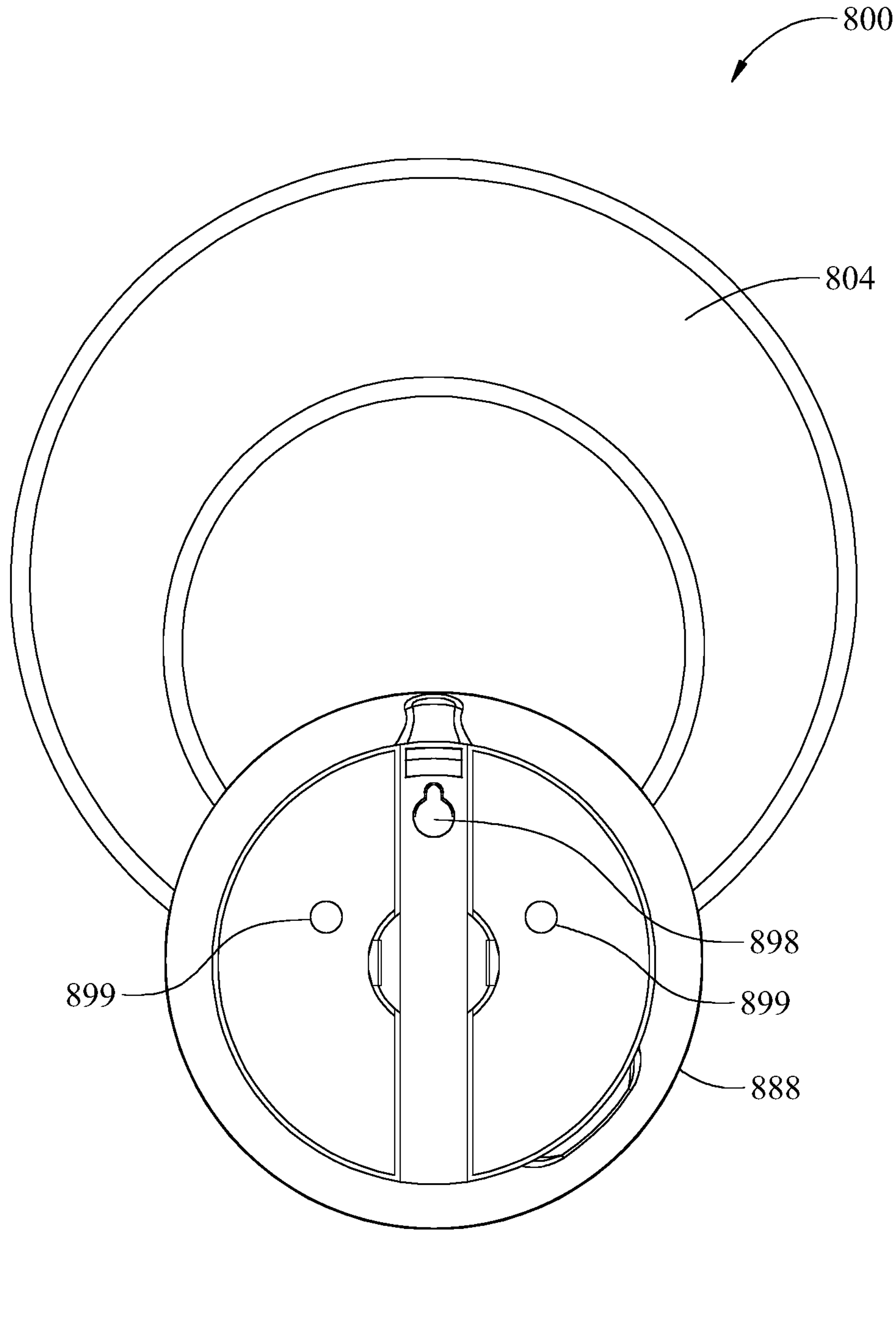
FIG. 40 is a back view of the antenna assembly shown in FIG. 27.
Figure 41:
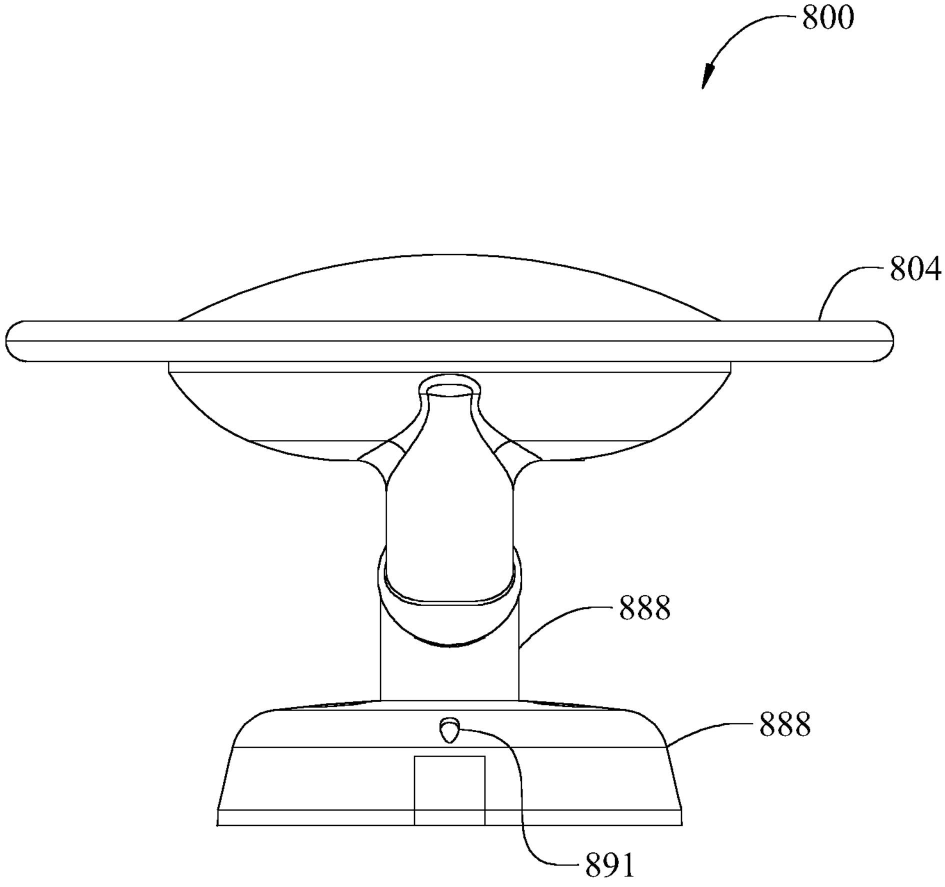
FIG. 41 is a top view of the antenna assembly shown in FIG. 27.
Figure 42:
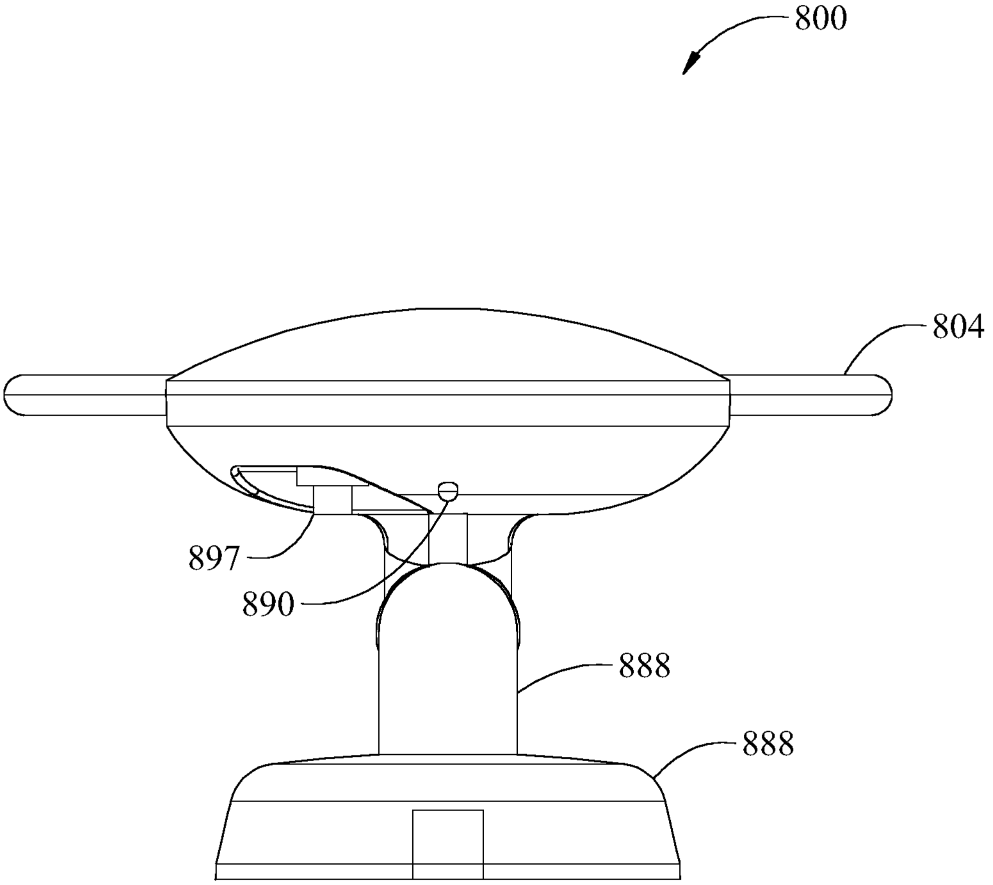
FIG. 42 is a bottom view of the antenna assembly shown in FIG. 27.

With continued reference to FIGS. 28 and 29, the support 888 also includes stops for retaining the rotatably convertible support 888 in the first or second configuration. In this example embodiment as shown in FIG. 28, the support 888 include a first stop 890 (e.g., projection, nub, protrusion, protuberance, etc.) configured to be engagingly received within an opening 891, for retaining the support 888 in the first configuration. FIGS. 30, 31, and 34 illustrate the engagement of the first stop 890 within the opening 891, which inhibits relative rotation of the upper and lower portions of the support 888 thus helping retain support 888 in the first configuration for supporting the antenna assembly 800 on a horizontal surface. In this example, the first stop 890 is provided on the upper portion of the support 888 and the opening 891 is on the lower portion or base of the support 888. In other embodiments, this may be reversed such that the base includes the first stop and the opening is on the upper portion of the support.

The support 888 also include a second stop 893 (FIG. 29) (e.g., projection, nub, protrusion, protuberance, etc.) configured to be engagingly received within an opening 892 (FIG. 28), for retaining the support 888 in the second configuration. The engagement of the second stop 893 within the opening 892 inhibits relative rotation of the upper and lower portions of the support 888 thus helping retain support 888 in the second configuration for supporting the antenna assembly 800 from a vertical surface. In this example, the second stop 893 is provided on the upper portion of the support 888 and the opening 892 is on the lower portion or base of the support 888. In other embodiments, this may be reversed such that the base includes the second stop and the opening is on the upper portion of the support.

In addition helping retain the support 888 in either the first or second configuration, the stops may also help provide a tactile and/or audible indication to the user to stop rotating the upper or lower portion of the support 888 relative to the other portion. For example, as a user is reconfiguring or converting the support 888 from the first or second configuration to the other configuration, the user may feel and/or hear an audible click as the corresponding first or second stop 890, 893 is engaged into the corresponding opening 891, 892.

Figure 33:
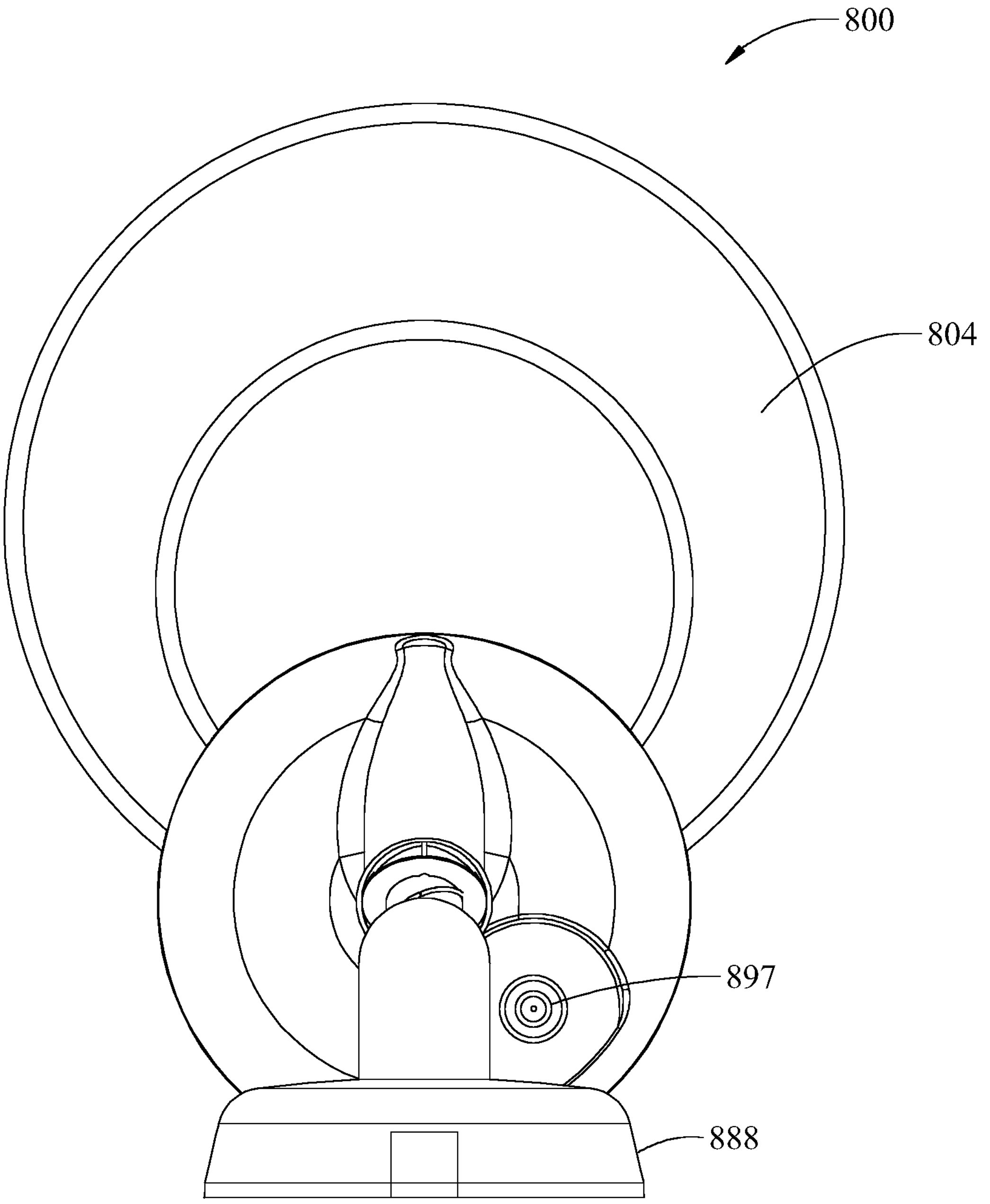
FIG. 33 is a back view of the antenna assembly shown in FIG. 26.

As shown in FIGS. 29 and 33, the antenna assembly 800 includes a connector 897 for connecting a coaxial cable to the antenna assembly 800. Alternative embodiments may include different types of connectors.

Figure 21:
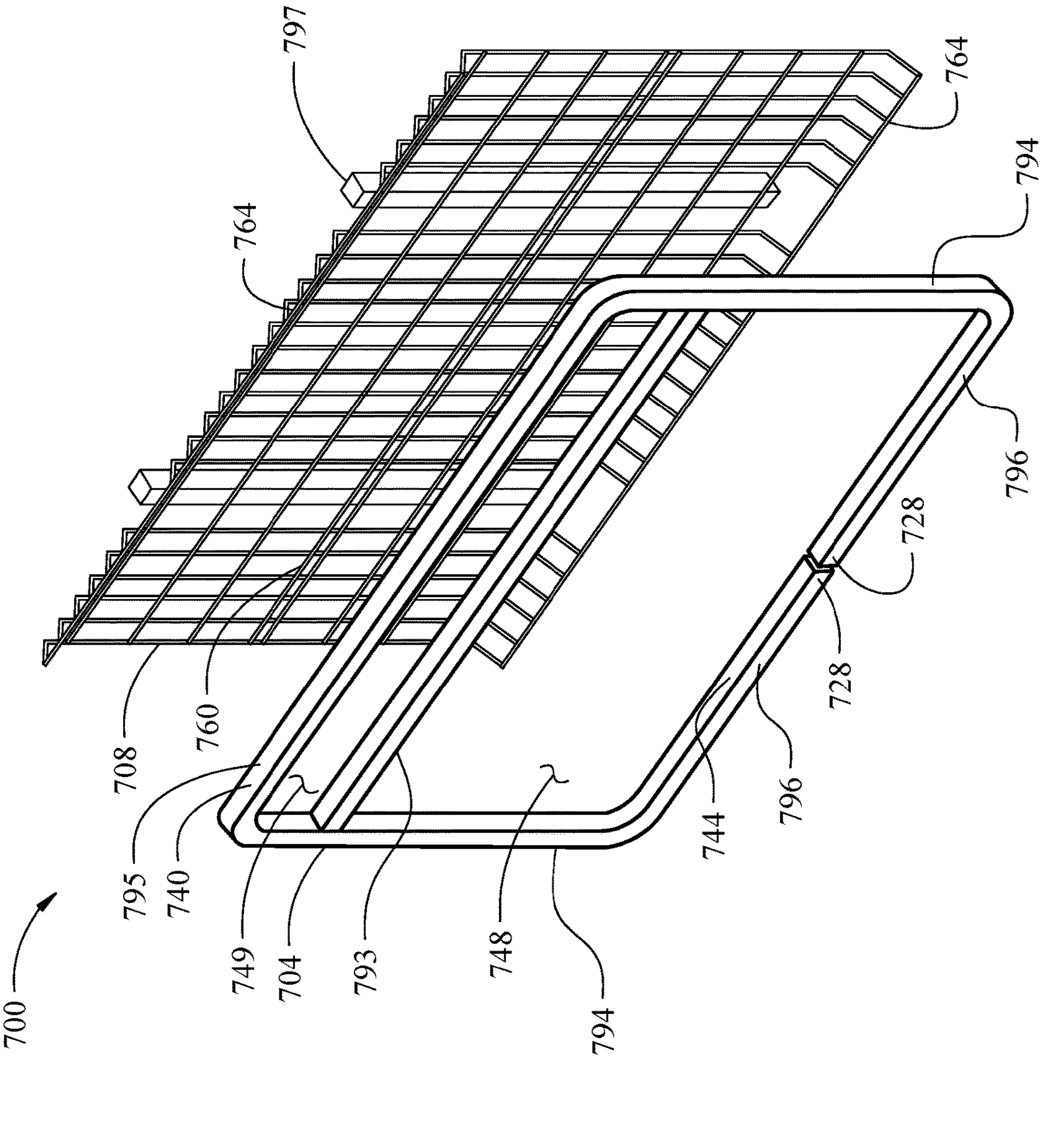
FIG. 21 is a perspective view of another exemplary embodiment of an antenna assembly configured for reception of VHF signals.
Figure 23:
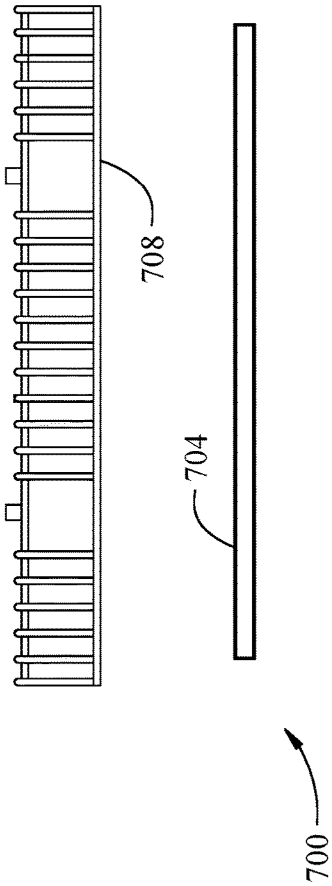
FIG. 23 is a top view of the antenna assembly shown in FIG. 21.
Figure 22:
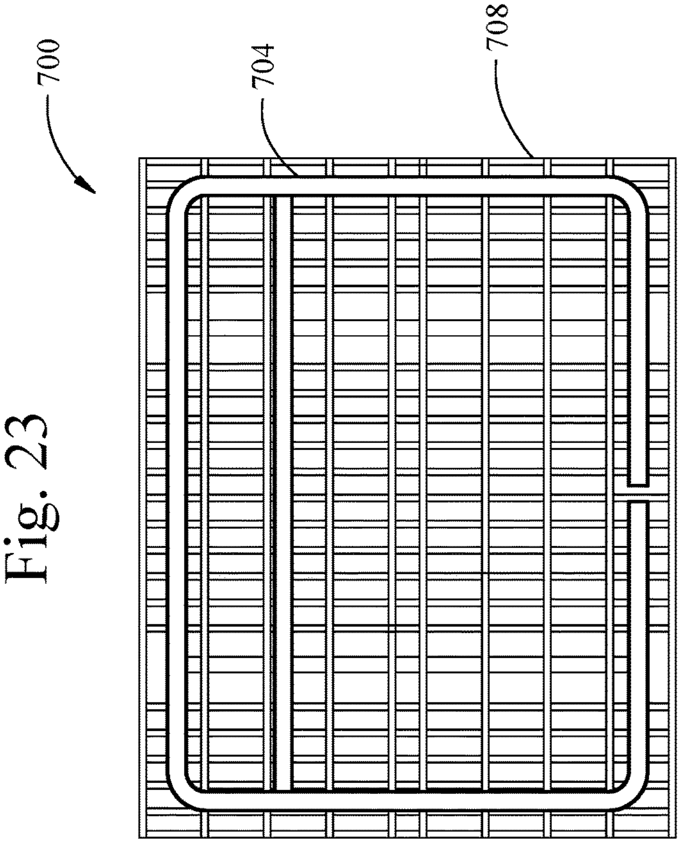
FIG. 22 is a front view of the antenna assembly shown in FIG. 21.
Figure 24:
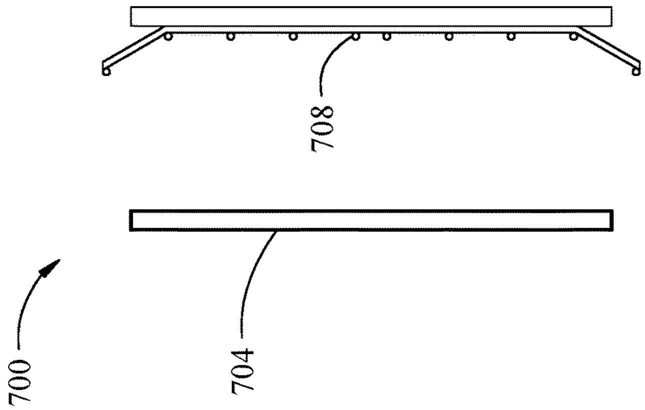
FIG. 24 is a side view of the antenna assembly shown in FIG. 21.

The antenna assemblies 300 (FIGS. 14 and 15), 400 (FIG. 16), and 800 (FIGS. 26 through 42) do not include any reflector. In some embodiments, the antenna assemblies 300, 400, 800 are configured to provide good VSWR (voltage standing wave ratio) without a reflector. In other embodiments, however, the antenna assemblies 300, 400, 800 may include a reflector, such as reflector identical or similar to a reflector disclosed herein (e.g., 108 (FIG. 1), 208 (FIG. 13), 508 (FIG. 17), 608 (FIG. 19), 708 (FIG. 21), 908 (FIG. 43), 1008 (FIG. 48) or other suitably configured reflector.

The antenna assemblies 300, 400, 800 may be operable and configured similar to the antenna assemblies 100 and 200 in at least some embodiments thereof. The illustrated circular shapes of the supports 388, 488, 888 are only exemplary embodiments. The support 388, 488, 888 may have many shapes (e.g. square, hexagonal, etc.). Removing a reflector may result in an antenna with less gain but wider bi-directional pattern, which may be advantageous for some situations where the signal strength level is high and from various directions.

Figure 17:
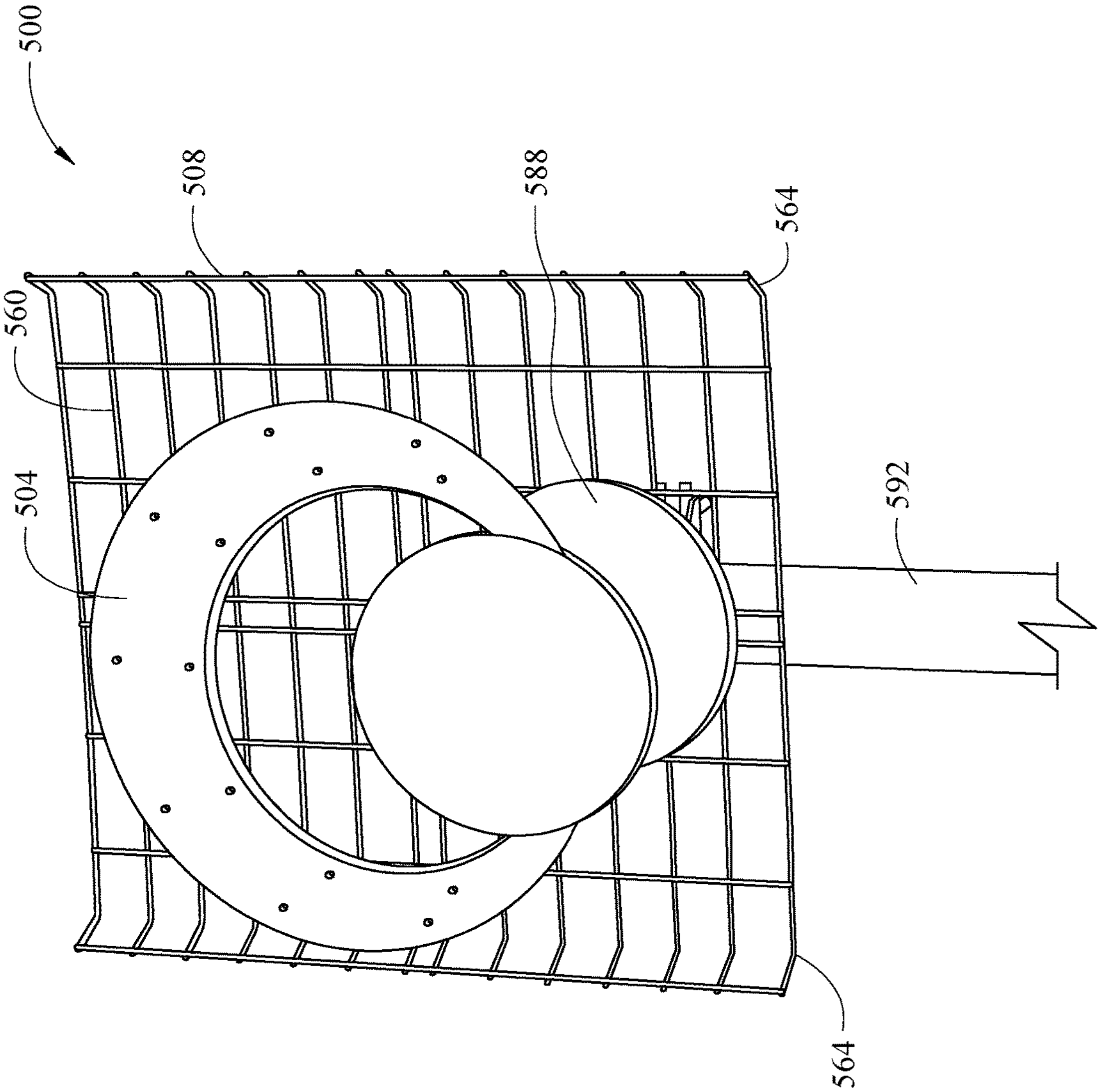
FIG. 17 is a perspective view of another exemplary embodiment of an antenna assembly having a tapered loop antenna element and a support, and showing the antenna assembly mounted outdoors to a vertical mast or pole.
Figure 18:
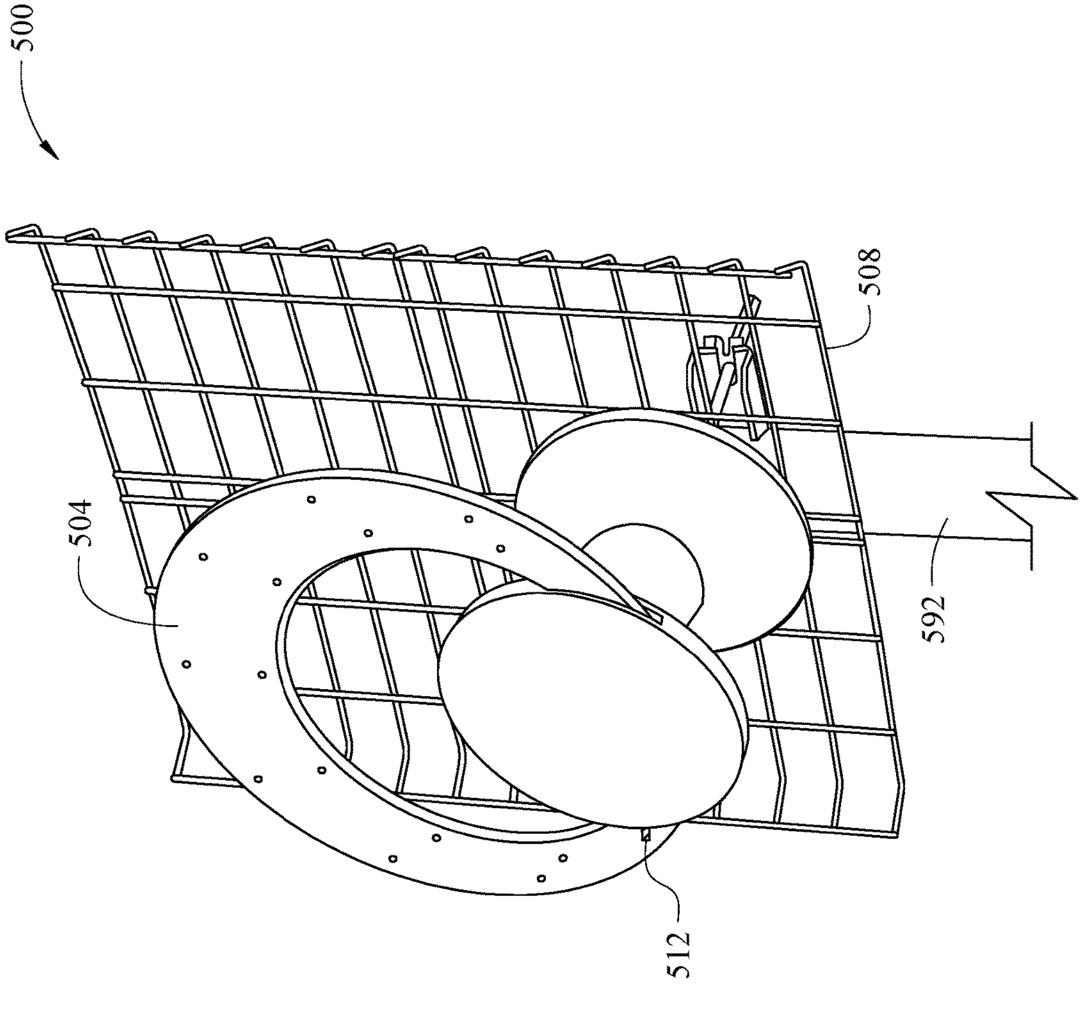
FIG. 18 is another perspective view of the antenna assembly shown in FIG. 17.
Figure 19:
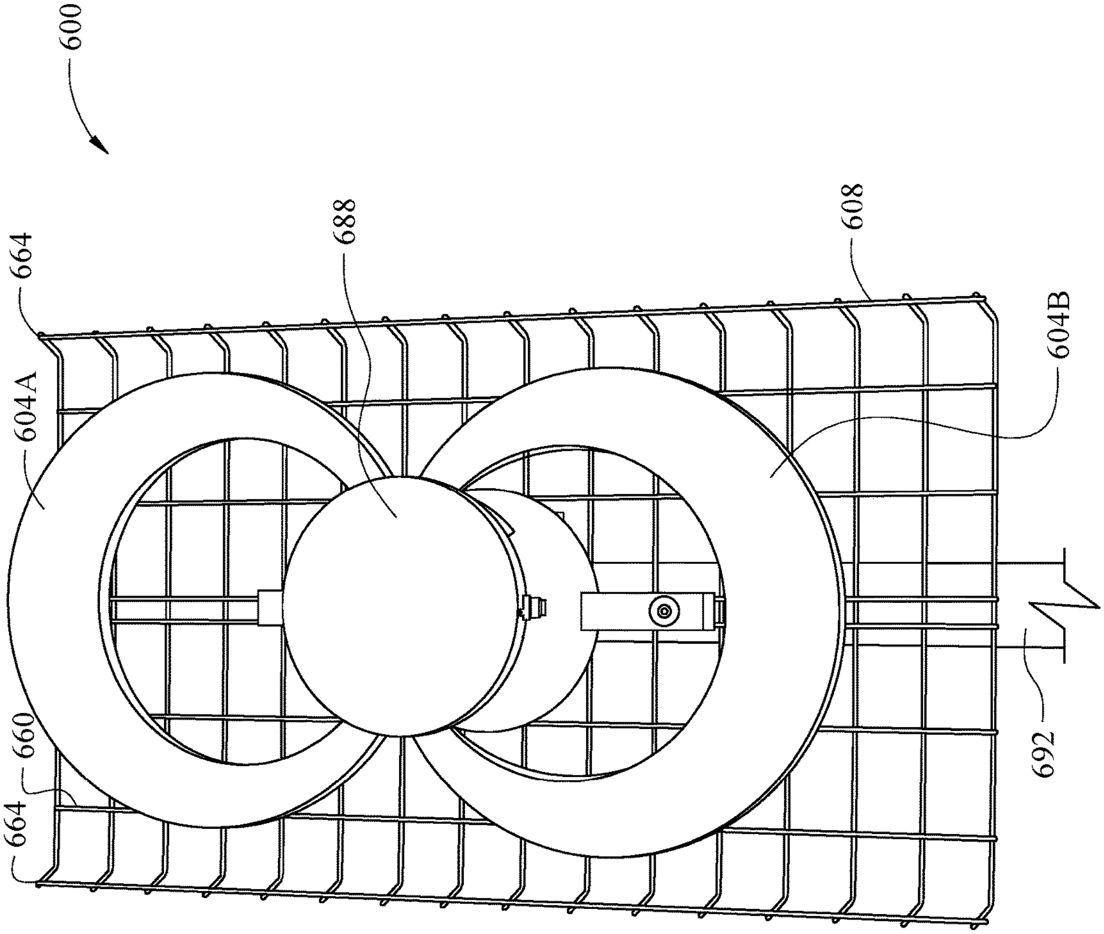
FIG. 19 is a perspective view of another exemplary embodiment of an antenna assembly having two tapered loop antenna elements and a support, and showing the antenna assembly mounted outdoors to a vertical mast or pole.

Other exemplary embodiments of antenna assemblies for mounting outdoors are illustrated in FIGS. 17 through 19. FIGS. 17 and 18 show an antenna assembly 500 having a tapered loop antenna element 504, a printed circuit board balun 512, and a support 588, where the antenna assembly 500 is mounted outdoors to a vertical mast or pole 592. FIG. 19 shows an antenna assembly 600 having two tapered loop antenna elements 604A and 604B and a support 688, where the antenna assembly 600 is mounted outdoors to a vertical mast or pole 692. In various embodiments, the supports 588 and/or 688 may be nonconvertible or rotatably convertible in a manner substantially similar to the support 888.

The antenna assemblies 500 and 600 include reflectors 508 and 608. Unlike the generally solid planar surface of reflectors 108 and 208, the reflectors 508 and 608 have a grill or mesh surface 560 and 660. The reflector 508 also includes two perimeter flanges 564. The reflector 608 includes two perimeter flanges 664. A mesh reflector is generally preferred for outdoor applications to reduce wind loading. With outdoor uses, size is generally less important such that the mesh reflector may be made somewhat larger than the equivalent indoor models to compensate for the inefficiency of the mesh. The increased size of the mesh reflector also removes or reduces the need for a baffle, which is generally more important on indoor models that tend to be at about the limit of the size versus performance curves.

Any of the various embodiments disclosed herein (e.g., FIGS. 14 through 19, FIGS. 26 through 42, FIGS. 43 through 47, FIGS. 48 through 50, FIGS. 58 through 66, FIG. 67, etc.) may include one or more components (e.g., balun, reflector, etc.) similar to components of antenna assembly 100. In addition, any of the various disclosed herein may be operable and configured similar to the antenna assembly 100 in at least some embodiments thereof.

According to some embodiments, an antenna element for signals in the very high frequency (VHF) range (e.g., 170 Megahertz to 216 Megahertz, etc.) may be less circular in shape but still based on an underlying electrical geometry of antenna elements disclosed herein. A VHF antenna element, for example, may be configured to provide electrical paths of more than one length along an inner and outer periphery of the antenna element. The proper combination of such an element with an electrically small reflector may thus result in superior balance of directivity, efficiency, bandwidth, and physical size as what may be achieved in other example antenna assemblies disclosed herein.

For example, FIGS. 21 through 24 illustrate an exemplary embodiment of an antenna assembly 700, which may be used for reception of VHF signals (e.g., signals within a frequency bandwidth of 170 Megahertz to 216 Megahertz, etc.). As shown, the antenna assembly 700 includes an antenna element 704 and a reflector 708.

The antenna element 704 has an outer periphery or perimeter portion 740 and an inner periphery or perimeter portion 744. The outer periphery or perimeter portion 740 is generally rectangular. The inner periphery or perimeter portion 744 is also generally rectangular. In addition, the antenna element 704 also includes a tuning bar 793 disposed or extending generally between the two side members 794 of the antenna element 704. The tuning bar 793 is generally parallel with the top member 795 and bottom members 796 of the antenna element 704. The tuning bar 793 extends across the antenna element 704, such that the antenna element 704 includes a lower generally rectangular opening 748 and an upper generally rectangular opening 749. The antenna element 704 further includes spaced-apart end portions 728.

With the tuning bar 793, the antenna element 704 includes first and second electrical paths of different lengths, where the shorter electrical path includes the tuning bar 793 and the longer electrical path does not. The longer electrical path is defined by an outer loop of the antenna element 704, which includes the antenna element's spaced-apart end portions 728, bottom members 796, side members 794, and top member 795. The shorter electrical path is defined by an inner loop of the antenna element 704, which includes the antenna element's spaced-apart end portions 728, bottom members 796, portions of the side members 794 (the portions between the tuning bar 793 and bottom members 796), and the tuning bar 793. By a complex coupling theory, the electrical paths defined by the inner and outer loops of the antenna element 704 allow for efficient operation within the VHF bandwidth range of about 170 Megahertz to about 216 Megahertz in some embodiments. With the greater efficiency, the size of the antenna assembly may thus be reduced (e.g., 75% size reduction, etc.) and still provide satisfactory operating characteristics.

The tuning bar 793 may be configured (e.g., sized, shaped, located, etc.) so as to provide impedance matching for the antenna element 704. In some example embodiments, the tuning bar 793 may provide the antenna element 704 with a more closely matched impedance to a 300 ohm transformer.

In one particular example, the end portions 728 of the antenna element 704 are spaced apart a distance of about 2.5 millimeters. By way of further example, the antenna element 704 may be configured to have a width (from left to right in FIG. 22) of about 600 millimeters, a height (from top to bottom in FIG. 22) of about 400 millimeters, and have the tuning bar 793 spaced above the bottom members 796 by a distance of about 278 millimeters. A wide range of materials may be used for the antenna element 704. In one exemplary embodiment, the antenna element 704 is made from aluminum hollow tubing with a ¾ inch by ¾ inch square cross section. In this particular example, the various portions (728, 793, 794, 795, 796) of the antenna element 704 are all formed from the same aluminum tubing, although this is not required for all embodiments. Alternative embodiments may include an antenna element configured differently, such as from different materials (e.g., other materials besides aluminum, antenna elements with portions formed from different materials, etc.), non-rectangular shapes and/or different dimensions (e.g., end portions spaced apart greater than or less than 2.5 millimeters, etc.). For example, some embodiments include an antenna element with end portions spaced apart a distance of between about 2 millimeters to about 5 millimeters. The spaced-apart end portions may define an open slot therebetween that is operable to provide a gap feed for use with a balanced transmission line.

With continued reference to FIGS. 21 through 24, the reflector 708 includes a grill or mesh surface 760. The reflector 708 also includes two perimeter flanges 764. The perimeter flanges 764 may extend outwardly from the mesh surface 760. In addition, members 797 may be disposed behind the mesh surface 760, to provide reinforcement to the mesh surface 760 and/or a means for supporting or coupling the mesh surface 760 to a supporting structure. By way of example only, the reflector 708 may be configured to have a width (from left to right in FIG. 22) of about 642 millimeters, a height (from top to bottom in FIG. 22) of about 505 millimeters, and be spaced apart from the antenna element 704 with a distance of about 200 millimeters separating the reflector's mesh surface 760 from the back surface of the antenna element 704. Also, by way of example only, the perimeter flanges 764 may be about 23 millimeters long and extend outwardly at an angle of about 120 degrees from the mesh surface 760. A wide range of material may be used for the reflector 708. In one exemplary embodiment, the reflector 708 includes vinyl coated steel. Alternative embodiments may include a differently configured reflector (e.g., different material, shape, size, location, etc.), no reflector, or a reflector positioned closer or farther away from the antenna element.

Figure 25:
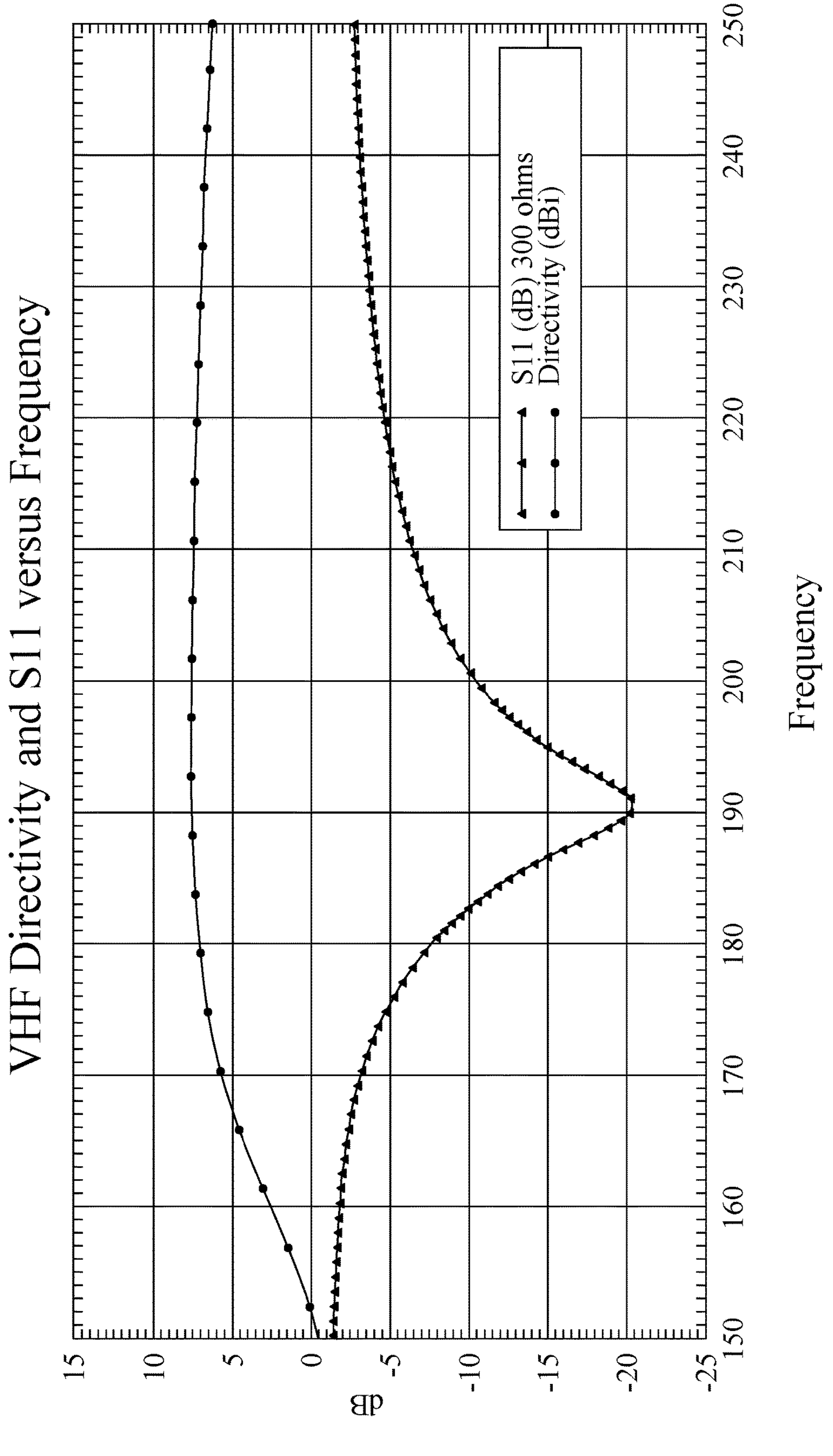
FIG. 25 is an exemplary line graph showing computer-simulated directivity and VSWR (voltage standing wave ratio) versus frequency (in megahertz) for the antenna assembly shown in FIGS. 21 through 24 according to an exemplary embodiment.

FIG. 25 is an exemplary line graph showing computer-simulated directivity and VSWR (voltage standing wave ratio) versus frequency (in megahertz) for the antenna assembly 700 according to an exemplary embodiment.

FIGS. 43 and 44 illustrate an exemplary embodiment of an antenna assembly 900 embodying one or more aspects of the present disclosure. As shown, the antenna assembly 900 includes a tapered loop antenna element 904 and a rotatably convertible support, mount, or stand 988.

The support 988 is rotatably convertible between a first configuration (shown in FIGS. 43 and 44) for supporting the antenna assembly 900 on a horizontal surface and a second configuration for supporting the antenna assembly 900 from a vertical surface. In some embodiments, the antenna assembly 900 may be attached, fastened, or coupled to a surface by using mechanical fasteners (e.g., screws, etc.) inserted within fastener holes 998 and 999 on the bottom (FIG. 47) of the support 988. The antenna assembly 900 may be attached to a surface using other methods, such as double-sided adhesive tape, etc. Or the antenna assembly 900 need not be attached to the horizontal surface at all.

The support 988 may be similar in structure and operation as the support 888 of antenna assembly 800 described above. For example, the support 988 includes a threaded stem portion 989 (FIG. 45) extending upwardly from the base of the support 988. The support 988 also includes a threaded opening defined by the upper portion of the support 988. In other embodiments, this may be reversed such that the base includes threaded opening, and the threaded stem portion extends downwardly from the upper portion of the mount.

The support 988 includes stops for retaining the rotatably convertible support 988 in the first or second configuration as described above for support 888. In this example embodiment, the support 988 include a first stop (e.g., projection, nub, protrusion, protuberance, etc.) configured to be engagingly received within an opening 991 (FIG. 45) for retaining the support 988 in the first configuration (FIG. 44). The support 988 includes a second stop 993 (FIG. 44) (e.g., projection, nub, protrusion, protuberance, etc.) configured to be engagingly received within an opening for retaining the support 988 in the second configuration. In addition to helping retain the support 988 in either the first or second configuration, the stops may also help provide a tactile and/or audible indication to the user to stop rotating the upper or lower portion of the support 988 relative to the other portion.

The support 988 further includes a connector 997 for connecting a coaxial cable (e.g., a 75-ohm RG6 coaxial cable fitted with an F-Type connector, etc.) to the antenna assembly 900. Alternative embodiments may include different types of connectors.

In this exemplary embodiment, the rotatably convertible support 988 also includes a slot or groove 909 as shown in FIG. 46. The slot or groove 909 is configured for receiving a lower portion of a reflector 908 therein for mounting the reflector 908 to the support 988 without requiring any mechanical fastener or other mounting means. As shown in FIGS. 43 and 44, a reflector 908 may be mounted in the slot 909 when the support 988 is in the first configuration for supporting the antenna assembly 900 on a horizontal surface. When mounted in the slot 909, the reflector 908 is spaced apart from the tapered loop antenna element 904 as shown in FIG. 44.

The reflector 908 comprises a grill or mesh surface 960 having two perimeter flanges or sidewalls 964 extending outwardly (e.g., at oblique angles, etc.) from the mesh surface 960. In use, the reflector 908 is operable for reflecting electromagnetic waves generally towards the tapered loop antenna element 904 and generally affecting impedance bandwidth and directionality. In alternative embodiments, reflectors having other configurations may be used, such as a reflector with a solid planar surface (e.g., reflector 108, 208, etc.). In other exemplary embodiments, the antenna assembly 900 may not include any reflector 908.

With the exception of the reflector 908 and the base 988 having the slot 909, the antenna assembly 900 may include one or more components similar to components described above for antenna assembly 800. In addition, the antenna assembly 900 may be operable and configured similar to the antenna assembly 100 in at least some embodiments thereof.

In exemplary embodiments, the antenna assembly 900 may be configured to have, provide and/or operate with one or more of (but not necessarily any or all of) the following features. For example, the antenna assembly 900 may be configured to operate with a range of 30+ miles with a peak gain (UHF) of 8.25 dBi, and consistent gain throughout the entire UHF DTV channel spectrum. The antenna assembly 900 may provide great performance regardless of whether it is indoors, outdoors, or in an attic. The antenna assembly 900 may be dimensionally small with a length of 12 inches, width of 12 inches, and depth of 5 inches. The antenna assembly 900 may have an efficient, compact design that offers excellent gain and impedance matching across the entire post 2009 UHF DTV spectrum and with good directivity at all UHF DTV frequencies with a peak gain of 8.25 dBi.

FIGS. 48 and 49 illustrate an exemplary embodiment of an antenna assembly 1000 embodying one or more aspects of the present disclosure. As shown, the antenna assembly 1000 includes two tapered loop antenna elements 1004 (e.g., in a figure eight configuration, etc.) and a support 1088.

In this exemplary embodiment, the two loops 1004 are arranged one opposite to the other such that a gap is maintained between each pair of opposite spaced apart end portions of each loop 1004. The gap or open slot may be used to provide a gap feed for use with a balanced transmission line. In operation, this gap feed configuration allows the vertical going electrical current components to effectively cancel each other out such that antenna assembly 1000 has relatively pure H polarization at the passband frequencies and exhibits very low levels of cross polarized signals.

The antenna assembly 1000 also includes a reflector 1008 having a grill or mesh surface 1060. Two perimeter flanges or sidewalls 1064 extend outwardly (e.g., at an oblique angle, etc.) from the mesh surface 1060. In use, the reflector 1008 is operable for reflecting electromagnetic waves generally towards the tapered loop antenna element 1004 and generally affecting impedance bandwidth and directionality. In alternative embodiments, reflectors having other configurations may be used, such as a reflector with a solid planar surface (e.g., reflector 108, 208, etc.). In still other exemplary embodiments, the antenna assembly 1000 may not include any reflector 1008.

In this exemplary embodiment, the antenna assembly 1000 also includes a dipole 1006. The dipole 1006 may be fed from the center and include two conductors or dipole antenna elements 1007 (e.g., rods, etc.). The dipole antenna elements 1007 extend outwardly relative to the tapered loop antenna elements 1004. In this illustrated embodiment, the dipole antenna elements 1007 extend laterally outward from respective left and right sides of the antenna assembly 1000. The dipole 1006 is configured so as to allow the antenna assembly 1000 to operate across a VHF frequency range from about 174 megahertz to about 216 megahertz. The double tapered loop antenna elements 1004 allows the antenna assembly 1000 to also operate across a UHF frequency range from about 470 megahertz to about 806. Accordingly, the antenna assembly 1000 is specifically configured for reception (e.g., tuned and/or targeted, etc.) across the UHF/VHF DTV channel spectrum of frequencies. With the exception of the dipole 1006, the antenna assembly 1000 may include one or more components similar to components described above for double tapered loop antenna assembly 600. In addition, the antenna assembly 1000 may include an impedance 75 Ohm output F connection.

In exemplary embodiments, the antenna assembly 1000 may be configured to have, provide and/or operate with one or more of (but not necessarily any or all of) the following features. For example, the antenna assembly 1000 may be configured to operate within both a VHF frequency range from 174 MHz to 216 MHz (Channels 7-13) and a UHF 470 MHz to 806 MHz (Channels 14-69). The antenna assembly 1000 may have a range of 50+ miles with a generous beam width of 70 degrees, a peak gain (UHF) of 10.4 dBi at 670 MHz, a peak gain (VHF) of 3.1 dBi at 216 MHz, VSWR 3.0 max for UHF and VHF, and consistent gain throughout the entire UHF/VHF DTV channel spectrum. The antenna assembly 1000 may provide great performance regardless of whether it is indoors, outdoors, or in an attic. The antenna assembly 1000 may be dimensionally small with a length of 20 inches, width of 35.5 inches, and depth of 6.5 inches. The antenna assembly 1000 may be configured to have improved performance for weak VHF stations and be operable as a broadband antenna without performance compromises.

In an exemplary embodiment, the antenna assembly 1000 includes an integrated diplexer that allows the specially tuned HDTV elements to be combined without performance degradation. The diplex in this example comprises an integrated UHF balun diplexer internal to the UHF antenna, e.g., within the support 1088. Traditional multiband antennas are inherently compromised in that up to 90% of the television signal can be lost through impedance mismatches and phase cancellation when signals from their disparate elements are combined. After recognizing this failing of traditional multiband antennas, the inventors hereof developed and included a unique network feed in their antenna assembly 1000, which network feed is able to combine the UHF and VHF signals without the losses mentioned above. For example, the antenna assembly 1000 may deliver 98% of signal reception to a digital tuner rather than being lost through impedance mismatches and phase cancellation.

In FIG. 50, the antenna assembly 1000 is shown mounted to a mast or mounting pole 1092 for free-standing indoor use according to an exemplary embodiment. By way of example, the mounting pole 1092 may be generally J-shaped and have a length of about 20 inches. The mounting pole 1092 is shown secured to a mounting bracket via bolts. In alternative embodiments, the antenna assembly 1000 may be mounted differently indoors, outdoors, in an attic, etc.

FIGS. 51 through 57 illustrate performance technical data for the antenna assembly 1000 shown in FIG. 48. The computer-simulated performance data was obtained using a state-of-the-art simulator with the following assumptions of a perfect electrical conductor (PEC), free space, no balun included, and 300 ohm line transmission line reference. The data and results shown in FIGS. 51 through 57 are provided only for purposes of illustration and not for purposes of limitation. Accordingly, an antenna assembly may be configured to have operational parameters substantially as shown in any one or more of FIGS. 51 through 57, or it may be configured to have different operational parameters depending, for example, on the particular application and signals to be received by the antenna assembly.

As shown by the test data, the antenna assembly 1000 had a peak gain (UHF) of 10.4 dBi at 670 MHz, a peak gain (VHF) of 3.1 dBi at 216 MHz, and a maximum VSWR of 3.0 for both UHF and VHF. Notably, the antenna assembly had consistent gain throughout the entire UHF/VHF DTV channel spectrum.

FIGS. 58 through 66 illustrate an exemplary embodiment of an antenna assembly 1100 embodying one or more aspects of the present disclosure. As shown, the antenna assembly 1100 includes a single tapered loop antenna element 1104 that is coupled and/or supported to a support or housing 1113. The antenna assembly 1100 may also include a balun (e.g., PCB balun 112 (FIG. 3), etc.) within the housing 1113, such that the balun is not visible and is obscured by the housing 1113. The tapered loop antenna element 1104 and balun may be similar in structure and operation as the tapered loop antenna element 104 and balun 112 shown in FIGS. 1 and 3-10 and described above.

As shown in FIG. 66, the antenna assembly 1100 is configured to adhere or mount (e.g., adhered, adhesively attached, etc.) to a window. Advantageously, mounting an antenna assembly to a window may provide a higher and more consistent DTV signal strength as compared to interior locations of a home. An antenna assembly may be mounted on various window types, such as a single or double pane window that is partially frosted and does not include a low e-coating, etc.

By way of example, the back or rear surface(s) of the tapered loop antenna element 1104 and/or the housing 1113 may be flat and planar as shown in FIGS. 60-63 and 65. This, in turn, allows the flat back surface to be positioned flush against a window. Accordingly, the antenna assembly 1100 does not include or necessarily need a support or mount having a base or stand (e.g., 388, 488, 588, 688, 888, 988, etc.) for supporting or mounting the antenna assembly to a horizontal surface (e.g., FIGS. 14 and 15, etc.), to a vertical surface (e.g., FIG. 16), or to a reflector and mounting post (e.g., 508, 592 in FIG. 17; 608, 692 in FIG. 18; 1008, 1092 in FIG. 50, etc.). In this illustrated embodiment, the antenna assembly 1100 is shown without any reflector (e.g., 108, 208, 508, 608, 708, 908, 1008, etc.). In other exemplary embodiments, the antenna assembly 1100 may include a reflector and/or support having a base or stand.

A wide range of materials may be used for the antenna assembly 1100. In an exemplary embodiment, an outer surface or covering of the antenna assembly 1100 comprises silicone such that at least a portion of the back surface(s) of the antenna assembly 1100 is naturally tacky or self-adherent material. With the naturally tacky or self-adherent properties, the antenna assembly 1100 may be mounted or attached directly to a window without any additional adhesives, etc. needed between the window and the naturally tacky or self-adherent outer covering or surface of the antenna assembly 1100. The tapered loop antenna element 1104 may comprise an electrically-conductive material (e.g., aluminum or copper foil, anodized aluminum, copper, stainless steel, other metals, other metal alloys, etc.) that is covered by or disposed within a cover material (e.g., silicone, plastic, self-adherent or naturally tacky material, other dielectric material, etc.), which may be the same material or a different material from which the housing 1113 is made.

In some exemplary embodiments, the tapered loop antenna element 1104 has sufficient flexibility to be rolled up into a cylindrical or tubular shape and then placed into a tube, e.g., to reduce shipping costs and decrease shelf space requirements, etc. In an exemplary embodiment, the tapered loop antenna element 1104 is adhered to a sticky silicone mat or substrate, which, in turn, could adhere to glass. In some exemplary embodiments, extremely thin flexible antenna elements were made from thin electrically-conductive material (e.g., metals, silver, gold, aluminum, copper, etc.) sputtered on flexible polymer substrates (e.g., stretched polyester film, etc.). In other exemplary embodiments, thin electrically-conductive (e.g., metals, silver, gold, aluminum, copper, etc.) elements were bonded to silicone. In still further exemplary embodiments, electrically-conductive ink (e.g., silver, etc.) may be applied via a screen printing process onto a polyester substrate.

Other methods and means may be used for attaching the antenna assembly 1100 to a window. In other exemplary embodiments, hook and loop fasteners (e.g., hook and loop fasteners, etc.) and/or suction cups may be used for attaching or mounting the antenna assembly 1100 to a window.

In some exemplary embodiments, the antenna assembly 1100 may include an amplifier such that the antenna assembly 1100 is amplified. In other exemplary embodiments, the antenna assembly 1100 may be passive and not include any amplifiers for amplification.

As shown in FIG. 64, the tapered loop antenna element 1104 has a generally annular shape cooperatively defined by an outer periphery or perimeter portion 1140 and an inner periphery or perimeter portion 1144. The outer periphery or perimeter portion 1140 is generally circular. The inner periphery or perimeter portion 1144 is also generally circular, such that the tapered loop antenna element 1104 has a generally circular opening or thru-hole 1148. The opening 1148 does not include any material therein. The inner diameter is offset from the outer diameter such that the center of the circle defined generally by the inner perimeter portion 144 (the inner diameter's midpoint) is below (e.g., about twenty millimeters, etc.) the center of the circle defined generally by the outer perimeter portion 140 (the outer diameter's midpoint). The offsetting of the diameters thus provides a taper to the tapered loop antenna element 1104 such that it has at least one portion (a top portion 1126 shown in FIG. 64) wider than another portion, e.g., the end portions covered by or disposed under the housing 1113.

The tapered loop antenna element 1104 includes first and second halves or curved portions 1150, 1152 that are generally symmetric such that the first half or curved portion 1150 is a mirror-image of the second half or curved portion 1152. Each curved portion 1150, 1152 extends generally between a corresponding end portion and then tapers or gradually increases in width until the middle or top portion 1126 of the tapered loop antenna element 1104. The tapered loop antenna element 1104 may be positioned against a vertical window in an orientation such that the wider portion 1126 of the tapered loop antenna element 1104 is at the top and the narrower end portions are at the bottom, to produce or receive horizontal polarization. The vertical polarization can be received with 90 degree rotation about a center axis perpendicular to the plane of the loop of the antenna element 1104.

The tapered loop antenna element 1104 may have the same, similar, or different dimensions than the dimensions disclosed above for the tapered loop antenna element 104.

As disclosed above for the tapered loop antenna element 104, the spaced-apart end portions of the tapered loop antenna element 1104 may define an open slot therebetween that is operable to provide a gap feed for use with a balanced transmission line. The end portions may include fastener holes in a pattern corresponding to fastener holes of the PCB balun of the antenna assembly 1100. Accordingly, mechanical fasteners (e.g., screws, etc.) may be inserted through the fastener holes of the tapered loop antenna element 1104 and PCB balun after they are aligned, for attaching the PCB balun to the tapered loop antenna element 1104. Alternative embodiments may include other attachment methods (e.g., soldering, etc.).

As shown in FIGS. 58, 60, and 64, the antenna assembly 1100 includes a connector 1197 for connecting a coaxial cable (e.g., a 75-ohm RG6 coaxial cable fitted with an F-Type connector, etc.) to the antenna assembly 1100. Alternative embodiments may include different types of connectors. In operation, the antenna assembly 1100 may be used for receiving digital television signals (of which high definition television (HDTV) signals are a subset) and communicating the received signals to an external device, such as a television. In the illustrated embodiment of FIG. 66, a coaxial cable 1124 is used for transmitting signals received by the antenna assembly 100 to a television. Alternative embodiments may include other coaxial cables or other suitable communication links.

FIG. 67 illustrates another exemplary embodiment of an antenna assembly 1200 embodying one or more aspects of the present disclosure. As shown, the antenna assembly 1200 includes a single tapered loop antenna element 1204 that is coupled and/or supported to a support or housing 1213 (e.g., plastic cover, etc.). The antenna assembly 1200 may also include a balun (e.g., PCB balun 112 (FIG. 3), etc.) within the housing 1213, such that the balun is not visible and is obscured by the housing 1213.

The antenna assembly 1200 may be similar in structure and operation as the antenna assembly 1100 shown in FIGS. 58-66 and described above. In this exemplary embodiment, the area 1215 defined by the tapered loop antenna element 1204 is not an opening or thru-hole 1148 as in the tapered loop antenna element 1104. Instead, the area 1215 comprises a portion of substrate (e.g., silicone substrate, etc.) that is attached to the back surface of the antenna assembly 1200. In an exemplary embodiment, the substrate comprises silicone. When the antenna assembly 1200 is shipped and/or prior to use, the silicone substrate is covered or provided with a relatively stiff layer of plastic to prevent or inhibit dust and debris from adhering to the silicone substrate, which is relatively sticky. When the antenna assembly 1200 is ready to be used and placed against a window, the plastic covering is removed from the silicone substrate. Then, the silicone substrate is placed against the window to adhere the antenna assembly 1200 to the window. In this example, the silicone substrate is preferably naturally tacky, self-adherent, and/or sufficiently sticky such that the antenna assembly 1200 may be adhered to the window or other glass surface solely by the silicone substrate without any adhesives or other attachment means.

As shown in FIG. 67, a coaxial cable 1224 (e.g., a 75-ohm RG6 coaxial cable fitted with an F-Type connector, etc.) may be used for transmitting signals received by the antenna assembly 1200 to a television, etc. Alternative embodiments may include other coaxial cables or other suitable communication links.

In exemplary embodiments in which an antenna assembly (e.g., 1100, 1200, etc.) includes a substrate for adherence to a window or other glass surface, the substrate may comprise polyurethane rubber material that is relatively soft and sticky. In an exemplary embodiment, the substrate comprises an adhesive polyurethane soft rubber. The substrate may initially include top and bottom outermost, removable liners made of polyethylene terephthalate (PET) film. The top liner may be disposed directly on the adhesive polyurethane soft rubber in order to prevent dust and debris from adhering to the adhesive polyurethane soft rubber. The top liner may be removed when the antenna assembly is to be adhered to a window via the adhesive polyurethane soft rubber. The bottom liner may be removed to expose an acrylic adhesive for adhering the substrate to the back of the antenna assembly. The substrate also includes a carrier (e.g., PET film, etc.) on the bottom of the adhesive polyurethane soft rubber. The acrylic adhesive may be coated on the opposing surfaces of the bottom liner and carrier, respectively. The substrate in this example may be transparent in color, have a total thickness of about 3 millimeters, and/or have a temperature range between 20 to 80 degrees Celsius.

Accordingly, embodiments of the present disclosure include antenna assemblies that may be scalable to any number of (one or more) antenna elements depending, for example, on the particular end-use, signals to be received or transmitted by the antenna assembly, and/or desired operating range for the antenna assembly. By way of example only, another exemplary embodiment of an antenna assembly includes four tapered loop antenna elements, which are collectively operable for improving the overall range of the antenna assembly.

Other embodiments relate to methods of making and/or using antenna assemblies. Various embodiments relate to methods of receiving digital television signals, such as high definition television signals within a frequency range of about 174 megahertz to about 216 megahertz and/or a frequency range of about 470 megahertz to about 690 megahertz. In one example embodiment, a method generally includes connecting at least one communication link from an antenna assembly to a television for communicating signals to the television that are received by the antenna assembly. In this method embodiment, the antenna assembly (e.g., 100, 200, 300, 400, 500, 600, 700, 800, 900, 1000, 1100, 1200, etc.) may include at least one antenna element (e.g., 104, 204, 304, 504, 604, 704, 804, 904, 1004, 1104, 1204, etc.). The antenna assembly may include at least one reflector element (e.g., 108, 208, 508, 608, 708, 908, 1008, etc.). In some embodiments, there may be a free-standing antenna element without any reflector element, where the free-standing antenna element may provide good impedance bandwidth, but low directivity for very compact solutions that work in high signal areas. In another example, a method may include rotating a portion of a support (e.g., support 888, 988, etc.) to a first or a second configuration, where the support in the first configuration allows an antenna assembly to be supported on a horizontal surface and the support in the second configuration allows the antenna assembly to be supported on a vertical surface.

The antenna assembly may be operable for receiving high definition television signals having a frequency range of about 470 megahertz and about 690 megahertz. The antenna element may have a generally annular shape with an opening (e.g., 148, 1148, etc.). The antenna element (along with reflector size, baffle, and spacing) may be tuned to at least one electrical resonant frequency for operating within a bandwidth ranging from about 470 megahertz to about 690 megahertz. The reflector element may be spaced-apart from the antenna element for reflecting electromagnetic waves generally towards the antenna element and generally affecting impedance bandwidth and directionality. The antenna element may include spaced-apart first and second end portions (e.g., 128, etc.), a middle portion (e.g., 126, etc.), first and second curved portions (e.g., 150, 152, etc.) extending from the respective first and second end portions to the middle portion such that the antenna element's annular shape and opening are generally circular. The first and second curved portions may gradually increase in width from the respective first and second end portions to the middle portion such that the middle portion is wider than the first and second end portions and such that an outer diameter of the antenna element is offset from a diameter of the generally circular opening. The first curved portion may be a mirror image of the second curved portion. A center of the generally circular opening may be offset from a center of the generally circular annular shape of the antenna element. The reflector element may include a baffle (e.g., 164, etc.) for deflecting electromagnetic waves. The baffle may be located at least partially along at least one perimeter edge portion of the reflector element. The reflector element may include a substantially planar surface (e.g., 160, etc.) that is substantially parallel with the antenna element, and at least one sidewall portion (e.g., 164, etc.) extending outwardly relative to the substantially planar surface generally towards the tapered loop antenna element. In some embodiments, the reflector element includes sidewall portions along perimeter edge portions of the reflector element, which are substantially perpendicular to the substantially planar surface of the reflector element, whereby the sidewall portions are operable as a baffle for deflecting electromagnetic wave energy.

Embodiments of an antenna assembly disclosed herein may be configured to provide one or more of the following advantages. For example, embodiments disclosed herein may provide antenna assemblies that are physically and electrically small but still capable of operating and behaving similar to physically larger and electrically larger antenna assemblies. Exemplary embodiments disclosed may provide antenna assemblies that are relatively small and unobtrusive, which may be used indoors for receiving signals (e.g., signals associated with digital television (of which high definition television signals are a subset), etc.). By way of further example, exemplary embodiments disclosed herein may be specifically configured for reception (e.g., tuned and/or targeted, etc.) for use with the year 2009 digital television (DTV) spectrum of frequencies (e.g., HDTV signals within a first frequency range of about 174 megahertz and about 216 megahertz and signals within a second frequency range of about 470 megahertz and about 690 megahertz, etc.). Exemplary embodiments disclosed herein may thus be relatively highly efficient (e.g., about 90 percent, about 98 percent at 545 MHz, etc.) and have relatively good gain (e.g., about eight dBi maximum gain, excellent impedance curves, flat gain curves, relatively even gain across the 2009 DTV spectrum, relatively high gain with only about 25.4 centimeter by about 25.4 centimeter footprint, etc.). With such relatively good efficiency and gain, high quality television reception may be achieved without requiring or needing amplification of the signals received by some exemplary antenna embodiments. Additionally, or alternatively, exemplary embodiments may also be configured for receiving VHF and/or UHF signals.

Exemplary embodiments of antenna assemblies (e.g., 100, 200, 300, 400, 500, 600, 700, 800, 900, 1000, 1100, 1200, etc.) have been disclosed herein as being used for reception of digital television signals, such as HDTV signals. Alternative embodiments, however, may include antenna elements tuned for receiving non-television signals and/or signals having frequencies not associated with HDTV. Other embodiments may be used for receiving AM/FM radio signals, UHF signals, VHF signals, etc. Thus, embodiments of the present disclosure should not be limited to receiving only television signals having a frequency or within a frequency range associated with digital television or HDTV. Antenna assemblies disclosed herein may alternatively be used in conjunction with any of a wide range of electronic devices, such as radios, computers, etc. Therefore, the scope of the present disclosure should not be limited to use with only televisions and signals associated with television.

Numerical dimensions and specific materials disclosed herein are provided for illustrative purposes only. The particular dimensions and specific materials disclosed herein are not intended to limit the scope of the present disclosure, as other embodiments may be sized differently, shaped differently, and/or be formed from different materials and/or processes depending, for example, on the particular application and intended end use.

Certain terminology is used herein for purposes of reference only, and thus is not intended to be limiting. For example, terms such as "upper", "lower", "above", "below", "upward", "downward", "forward", and "rearward" refer to directions in the drawings to which reference is made. Terms such as "front", "back", "rear", "bottom" and "side", describe the orientation of portions of the component within a consistent, but arbitrary, frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Disclosure of values and ranges of values for specific parameters (such frequency ranges, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An antenna assembly configured to be operable for receiving high definition television signals, the antenna assembly comprising first and second antenna elements, wherein:

each said first and second antenna element includes first and second portions that are generally symmetric such that the first portion is a mirror image of the second portion;

the first and second antenna elements are in a mirror-image relationship and/or cooperatively define a generally figure eight configuration; and each said first and second antenna element includes one or more fastener holes, the one or more fastener holes of the first antenna element aligned with the one or more fastener holes of the second antenna element, whereby the first and second antenna elements are coupled by one or more mechanical fasteners inserted through corresponding aligned fastener holes of the first and second antenna elements.

2. The antenna assembly of claim 1, wherein the first and second antenna elements include at least two spaced-apart portions each including at least one of the one or more fastener holes.

3. The antenna assembly of claim 1, wherein each of the first and second portions of the first and second antenna elements that are generally symmetric extends from a bottom of the corresponding one of the first and second antenna elements to a top of the corresponding one of the first or second antenna elements.

4. The antenna assembly of claim 1, wherein each of the first and second antenna elements includes an opening, an inner periphery, and outer periphery that are generally rectangular.

5. The antenna assembly of claim 1, wherein each of the first and second antenna elements includes a generally annular shape with an opening having a substantially closed shape.

6. The antenna assembly of claim 1, wherein each said mechanical fastener is a single screw.

7. The antenna assembly of claim 1, wherein the first and second antenna elements include first and second tapered loop antenna elements, respectively.

8. The antenna assembly of claim 1, wherein the first and second antenna elements are generally rectangular.

9. The antenna assembly of claim 8, wherein the first and second antenna elements cooperatively define the generally figure eight configuration.

10. The antenna assembly of claim 8, wherein the first and second antenna elements are in the mirror-image relationship.

11. The antenna assembly of claim 8, wherein the first and second antenna elements are in the mirror-image relationship and cooperatively define the generally figure eight configuration.

12. The antenna assembly of claim 1, wherein the first and second antenna elements are in the mirror-image relationship and cooperatively define the generally figure eight configuration.

13. The antenna assembly of claim 1, wherein the one or more mechanical fasteners electrically couple the first antenna element with the second antenna element.

14. The antenna assembly of claim 1, wherein each said mechanical fastener is a single screw that electrically couples the first antenna element with the second antenna element.

15. The antenna assembly of claim 1, wherein a printed circuit board is coupled to the first and second antenna elements by the one or more mechanical fasteners.

16. The antenna assembly of claim 15, wherein each said mechanical fastener is inserted through corresponding aligned fastener holes of the first and second antenna elements to thereby attach the first and second antenna elements to each other and to couple the printed circuit board to the first and second antenna elements.

17. The antenna assembly of claim 15, wherein the printed circuit board includes one or more fastener holes aligned with the corresponding one or more fastener holes of the first and second antenna elements, such that each said mechanical fastener is inserted through corresponding aligned fastener holes of printed circuit board and the first and second antenna elements.

18. The antenna assembly of claim 15, wherein the printed circuit board includes one or more openings corresponding with the one or more fastener holes of the first and/or second antenna elements to accommodate the one or more mechanical fasteners.

19. The antenna assembly of claim 18, wherein:

the printed circuit board includes a balun; and the one or more mechanical fasteners at least partially define an electrically conductive path between the balun of the printed circuit board and the first and second antenna elements.

20. The antenna assembly of claim 19, wherein each said mechanical fastener is a single screw that at least partially defines at least a portion of the electrically conductive path between the balun of the printed circuit board and the first and second antenna elements.

21. The antenna assembly of claim 20, wherein the first and second antenna elements are in the mirror-image relationship and cooperatively define the generally figure eight configuration.

22. The antenna assembly of claim 15, wherein the printed circuit board includes a balun electrically coupled with the first and second antenna elements by the one or more mechanical fasteners.

23. The antenna assembly of claim 15, wherein each said mechanical fastener is a single screw that electrically couples the printed circuit board with the first and second antenna elements.

24. The antenna assembly of claim 15, wherein the one or more fasteners at least partially define an electrically conductive path between the printed circuit board and the first and second antenna elements.

25. The antenna assembly of claim 15, wherein each said mechanical fastener is a single screw that at least partially defines an electrically conductive path between the printed circuit board and the first and second antenna elements.

26. The antenna assembly of claim 1, wherein each of the first and second antenna elements includes an opening, an inner periphery, and outer periphery that are generally circular, ovular, or triangular.

27. The antenna assembly of claim 1, wherein the antenna assembly comprises a high definition television antenna assembly configured to be operable for receiving high definition television signals and for communicating the received high definition television signals to a television.

28. The antenna assembly of claim 1, wherein:

the first and second portions of the first antenna element respectively include first and second end portions spaced apart from each other and having at least one fastener hole of the one or more fastener holes of the first antenna element;

the first and second portions of the second antenna element respectively include first and second end portions spaced apart from each other and having at least one fastener hole of the one or more fastener holes of the second antenna element;

the fastener holes of the first and second end portions of the first antenna element are aligned respectively with the fastener holes of the first and second end portions of the second antenna element;

the first end portion of the first antenna element is coupled to the first end portion of the second antenna element by a mechanical fastener inserted through the aligned fastener holes of the first end portions of the first and second antenna elements; and the second end portion of the first antenna element is coupled to the second end portion of the second antenna element by a mechanical fastener inserted through the aligned fastener holes of the second end portions of the first and second antenna elements.

29. The antenna assembly of claim 28, wherein:

a printed circuit board is coupled to the first and second antenna elements by the mechanical fastener inserted through the aligned fastener holes of the first end portions of the first and second antenna elements and by the mechanical fastener inserted through the aligned fastener holes of the second end portions of the first and second antenna elements; and the printed board includes at least a portion disposed within a space separating the separating the first and second end portions of the first and second antenna elements.

* * * * *